(12) United States Patent
McCrossan et al.

(10) Patent No.: US 8,515,238 B2
(45) Date of Patent: Aug. 20, 2013

(54) REPRODUCTION DEVICE, RECORDING METHOD, PROGRAM, AND REPRODUCTION METHOD

(75) Inventors: Joseph McCrossan, Simi Valley, CA (US); Tomoyuki Okada, Nara (JP)

(73) Assignee: Panasonic Corporation, Osaka (JP)

( * ) Notice: Subject to any disclaimer, the term of this patent is extended or adjusted under 35 U.S.C. 154(b) by 353 days.

(21) Appl. No.: 13/005,128

(22) Filed: Jan. 12, 2011

(65) Prior Publication Data

US 2011/0103775 A1    May 5, 2011

Related U.S. Application Data

(62) Division of application No. 10/585,284, filed as application No. PCT/JP2005/000314 on Jan. 13, 2005.

(60) Provisional application No. 60/536,045, filed on Jan. 13, 2004.

(51) Int. Cl.
| | |
|---|---|
| *H04N 5/775* | (2006.01) |
| *H04N 5/92* | (2006.01) |
| *H04N 5/77* | (2006.01) |
| *H04N 9/82* | (2006.01) |
| *H04N 5/84* | (2006.01) |

(52) U.S. Cl.
USPC ........... 386/230; 386/225; 386/246; 386/248; 386/333; 386/244

(58) Field of Classification Search
USPC .................. 386/230, 225, 246, 248, 333
See application file for complete search history.

(56) References Cited

U.S. PATENT DOCUMENTS

| | | | |
|---|---|---|---|
| 5,907,658 A * | 5/1999 | Murase et al. | 386/248 |
| 5,937,138 A | 8/1999 | Fukuda et al. | |
| 6,067,400 A * | 5/2000 | Saeki et al. | 386/243 |
| 6,072,832 A | 6/2000 | Katto | |
| 6,246,402 B1 * | 6/2001 | Setogawa et al. | 715/723 |
| 6,349,203 B1 | 2/2002 | Asaoka et al. | |
| 6,393,574 B1 | 5/2002 | Kashiwagi et al. | |
| 6,434,326 B1 | 8/2002 | Kondo et al. | |

(Continued)

FOREIGN PATENT DOCUMENTS

| | | |
|---|---|---|
| EP | 0886276 A2 | 12/1998 |
| EP | 1085513 A2 | 3/2001 |

(Continued)

OTHER PUBLICATIONS

The extended European Search Report dated Nov. 7, 2012 for the related European Patent Application No. 10176960.2.

(Continued)

*Primary Examiner* — Helen Shibru
(74) *Attorney, Agent, or Firm* — Panasonic Patent Center

(57) ABSTRACT

A BD-ROM contains an AVClip in which a video stream is multiplexed with an interactive graphics stream. The video stream constitutes a moving picture. On the other hand, the graphics stream constitutes menu presentations to be combined with a moving picture. The graphics stream includes a plurality of display sets constituting the menu presentations. Each of the display sets has interactive control information (ICS). Among the display sets belonging to the graphics stream, the interactive control information (ICS) other than the one belonging to the head one include version information (page_version_number) indicating whether or not content of the menu presentation has changed with respect to the previous Display Set.

11 Claims, 48 Drawing Sheets

(56) References Cited

U.S. PATENT DOCUMENTS

| | | | |
|---|---|---|---|
| RE37,994 E | 2/2003 | Fukuda et al. | |
| 6,701,064 B1* | 3/2004 | De Haan et al. | 386/248 |
| 7,634,739 B2* | 12/2009 | McCrossan et al. | 715/810 |
| 7,660,516 B2 | 2/2010 | McCrossan et al. | |
| 2002/0180803 A1 | 12/2002 | Kaplan et al. | |
| 2004/0047588 A1* | 3/2004 | Okada et al. | 386/46 |
| 2004/0165865 A1* | 8/2004 | Seo et al. | 386/95 |
| 2005/0105888 A1 | 5/2005 | Hamada et al. | |
| 2005/0177863 A1* | 8/2005 | Jung et al. | 725/135 |
| 2005/0196143 A1 | 9/2005 | Kato et al. | |
| 2006/0045481 A1 | 3/2006 | Yahata et al. | |
| 2006/0050088 A1 | 3/2006 | Yahata et al. | |
| 2007/0098363 A1* | 5/2007 | McCrossan et al. | 386/95 |

FOREIGN PATENT DOCUMENTS

| | | |
|---|---|---|
| EP | 1 605 696 | 12/2005 |
| EP | 1 608 165 | 12/2005 |
| EP | 1 713 269 | 10/2006 |
| EP | 1 715 686 | 10/2006 |
| EP | 1 718 073 | 11/2006 |
| JP | 10-136259 A | 5/1998 |
| JP | 10271450 | 10/1998 |
| JP | 11-120487 | 4/1999 |
| JP | 2001-160945 | 6/2001 |
| JP | 2002-533000 | 10/2002 |
| JP | 2004-304767 | 10/2004 |
| JP | 2004-343254 | 12/2004 |
| WO | 97/07504 | 2/1997 |
| WO | 97/13363 | 4/1997 |
| WO | 97/13367 | 4/1997 |
| WO | 00/36600 | 6/2000 |
| WO | 02/079902 A2 | 10/2002 |
| WO | 2004/068854 | 8/2004 |
| WO | 2004/077826 | 9/2004 |
| WO | 2004/102570 | 11/2004 |
| WO | 2005/004478 | 1/2005 |
| WO | 2005/048261 | 5/2005 |
| WO | 2005/048592 | 5/2005 |

OTHER PUBLICATIONS

The Supplementary European Search Report dated May 18, 2010 for the related European Patent Application No. 05710339.2.

"Digital Video Broadcasting (DVB); Subtitling systems; ETSI EN 300 743" ETSI Standards, LIS, Sophia Antipolis Cedex, France, vol. 1. BC, No. V1.2.1, Oct. 1, 2002.

The Supplementary European Search Report dated Dec. 29, 2009 for the related EP Application No. 05703553.7.

\* cited by examiner

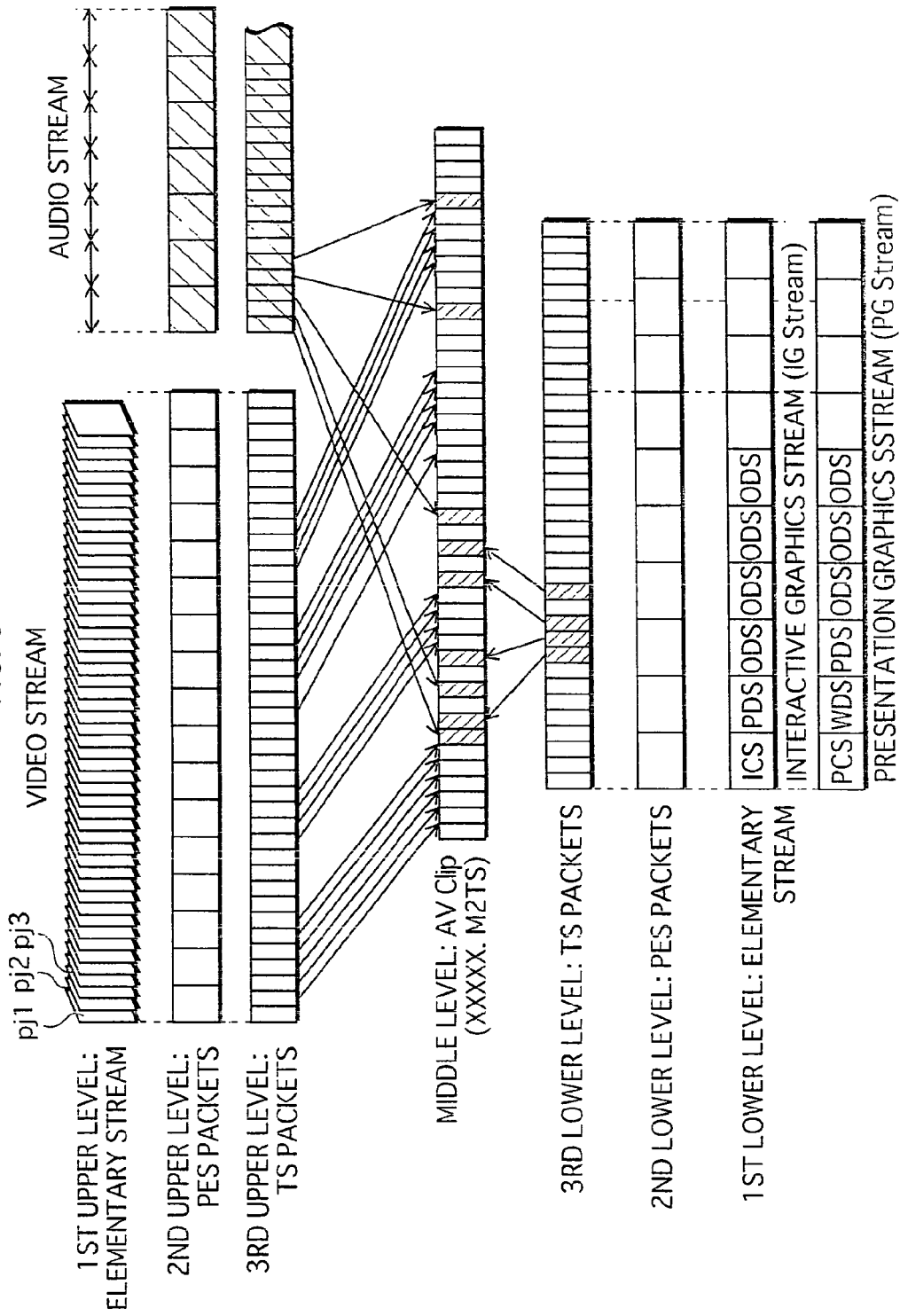

FIG. 7A  ONE-TO-ONE CORRESPONDENCE
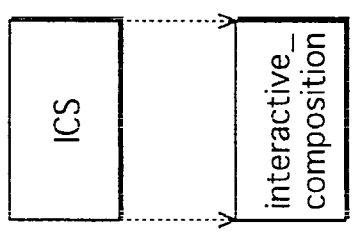
FIG. 7B  ONE-TO-MANY CORRESPONDENCE
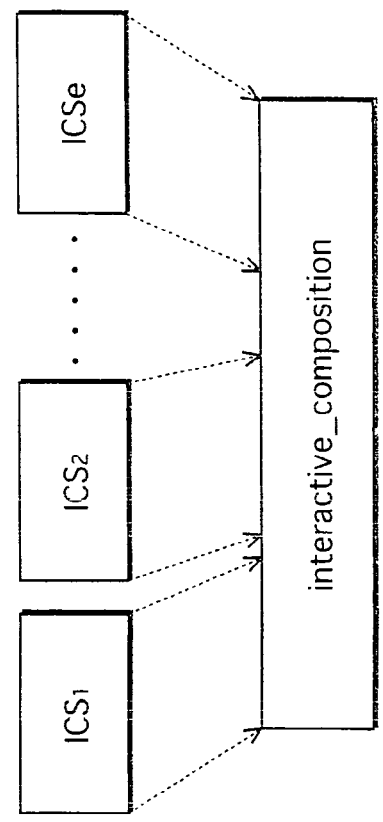

Page(2) : Audio Selection Page

FIG. 25 page()
| page_id |
| --- |
| page_version_number |
| UO_mask_table() |
| in_effects() { |
|     effect_sequence() |
| } |
| out_effects() { |
|     effect_sequence() |
| } |
| animation_frame_rate_code |
| default_selected_button_id_ref |
| default_activated_button_id_ref |
| palette_id_ref |
| button information (0) |
| button information (1) |
| button information (2) |
| ⋮ |
| button (number_of_buttons−1) | cx1

| button_id |
| --- |
| button_numeric_select_value |
| auto_action_flag |
| |
| button_horizontal_position |
| button_vertical_position |
| neighbor_info() { |
|     upper_button_id_ref |
|     lower_button_id_ref |
|     left_button_id_ref |
|     right_button_id_ref |
| } |
| normal_state_info() { |
|     normal_start_object_id_ref |
|     normal_end_object_id_ref |
|     normal_repeat_flag |
| |
| } |
| selected_state_info() { |
|     selected_state_sound_id_ref |
|     selected_start_object_id_ref |
|     selected_end_object_id_ref |
|     selected_repeat_flag |
| |
| } |
| activated_state_info() { |
|     activated_state_sound_id_ref |
|     activated_start_object_id_ref |
|     activated_end_object_id_ref |
| } |
| navigation_command(0) |
| navigation_command(1) |
| navigation_command(2) |
| ⋮ |

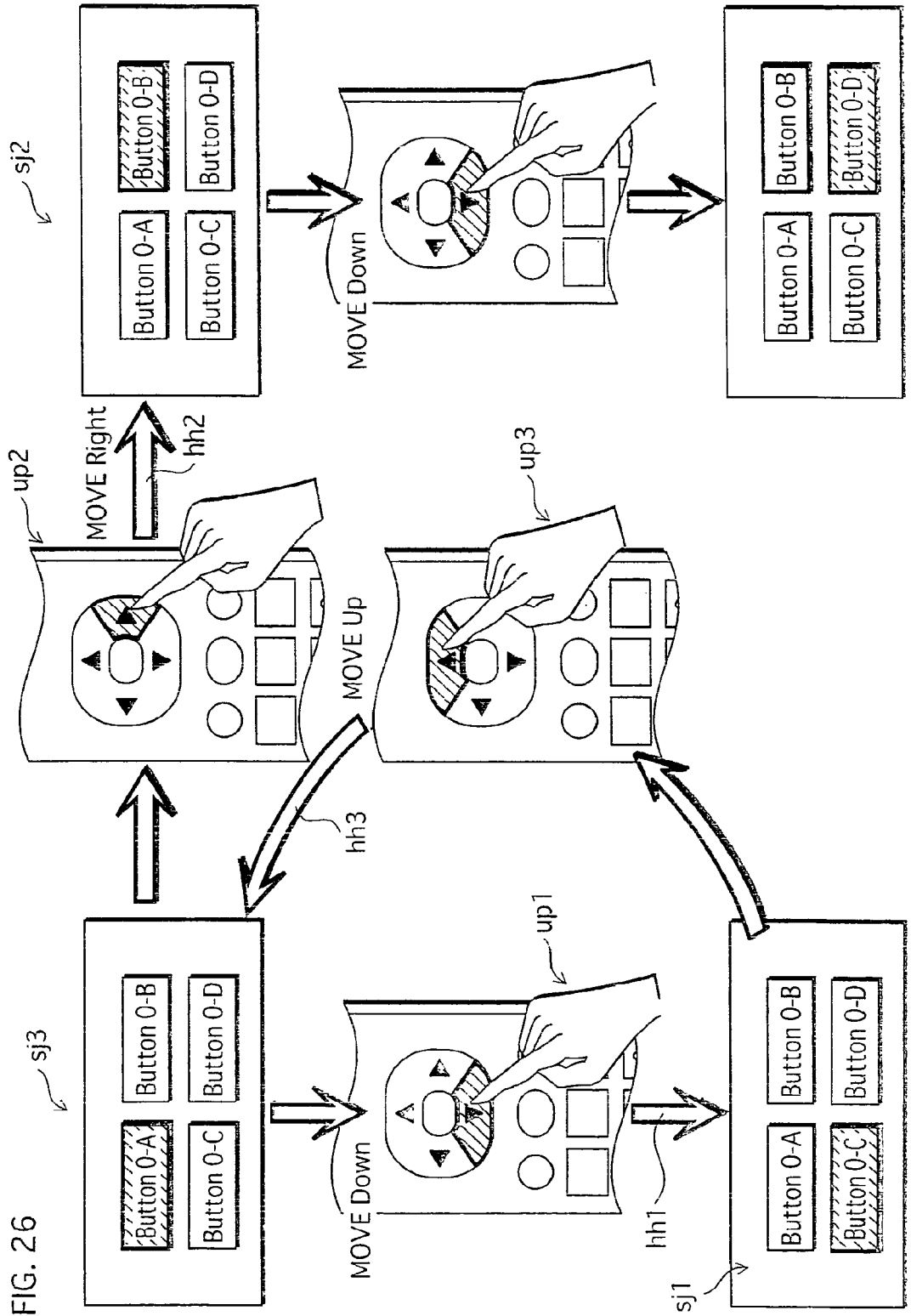

Composition Object(1) Setting

Composition Object(2) Setting

Composition Object(3) Setting

REPRODUCTION DEVICE, RECORDING METHOD, PROGRAM, AND REPRODUCTION METHOD

TECHNICAL FIELD

The present invention belongs to a technical field relating to GUI (Graphical User Interface) technology in digitized movie works, and relates to an improvement when such GUI technology is applied to recording media such as BD-ROM (Blu-Ray Disc Read Only Memory) and DVD-Video, and commercial playback apparatuses.

BACKGROUND ART

GUIs are indispensable in digitized movie works when it comes to receiving various operations from a user such as selecting a playback position or selecting a language. In addition to these options, other user-selectable options that may be incorporated in the movie work include commentary by the director of the movie work, profiles of extras in the movie work, and anecdotes relating to the movie work, and the trend in recent years is for more and more of such selectable options to be incorporated in a movie work. Interactive control information recorded on the recording medium enables selections of such numerous options to be received conveniently. This interactive control information is for displaying multiple pages such as an audio selection page, a subtitle selection page, a chapter selection page, and a title selection page, and control for displaying a Multi-Page Menu is realized using this interactive control information. GUI techniques used in digitized movie works include the techniques in the following Patent Documents 1 and 2.

Patent Document 1: International Publication No. WO 2004/068854 A1
Patent Document 2: International Publication No. WO 2004/077826 A1

DISCLOSURE OF THE INVENTION

Problem to be Solved by the Invention

However, the selectable options in the pages in the Multi-Page Menu are not necessarily the same throughout the entire movie work. For instance, a commentary option regarding a specific scene in the movie should only be selectable during the period for which that scene is being played, and should not be selectable during scenes other than that specific scene. It would be undesirable for a button material for selecting such commentary to be displayed during a scene other than the specific scene because this would cause confusion for the user. However, control for changing some of the plurality of pages of a Multi-Page Menu in accordance with progression of playback of the movie work puts a great processing load on the playback apparatus, and leads to interruption of graphics presentation.

The reason for this is as follows. In the prior art taught by the aforementioned Patent Document 1, in order to alter the contents of a page, the entire interactive control information in the memory of the playback apparatus is replaced. The amount of interactive control information for a menu consisting of one page is very small, and therefore a large processing load in not incurred to change the contents of the memory in the case of only one page. However, a great processing load is incurred in the playback apparatus when the interactive control information is for a multipage memory because the amount of the interactive control information may be as much as 0.5 Mbyte to 1.0 Mbyte. When the amount interactive control information is large, an interruption in presentation of the Multi-Page Menu is caused when the entire contents of the memory is replaced. This is also the case when the graphics decoder must be reset.

With the prior art there is a danger that presentation of the Multi-Page Menu will be interrupted due to the necessity to reset the graphics decoder and completely replace the interactive control information each time there is a change in the Multi-Page Menu. Therefore, the prior art is unsuitable for control to only slightly change the Multi-Page Menu in accordance with progression of playback of a moving picture.

The present invention has an object of providing a recording medium with which the contents of a specific page can be changed slightly without interrupting Multi-Page Menu presentation.

Means to Solve the Problem

In order to achieve the stated object, the present invention is a recording medium having recorded thereon a video stream and a graphics stream, wherein the video stream constitutes a moving picture, and the graphics stream constitutes a plurality of menu presentations to be composited with the moving picture, and includes a plurality of Display Sets that constitute respective menu presentations, each menu presentation being composed of one or more pages, and each Display Set including version information that shows whether or not content of each of the pages in the Display Set has changed with respect to a previous Display Set.

Effects of the Invention

According to the stated structure, the page information shows that a page or pages that have changed with respect to a previous Display Set. This means that even if information has a large overall size, such as with interactive control information, only the page information that has changed needs to be replaced in the buffer. This makes it possible to make only slight changes in the Multi-Page Menu. Since the only page information that is replaced in the buffer is that of pages having a higher version number, the processing load for re-rendering graphics can be kept to a minimum.

Keeping the processing load to a minimum enables interruptions in display to be suppressed, and also enables presentation control for making slight changes to some pages in the Multi-Page Menu. Implementing such presentation control enables slight alterations in a Multi-Page Menu, and therefore makes it possible for movie creators to send forth into the world movie works with various features to entertain users.

BRIEF DESCRIPTION OF THE DRAWINGS

FIG. 3 shows schematically the structure of an AV Clip;

FIGS. 7A and 7B show the correspondence between interactive_composition structures and ICSs;

FIG. 25 shows the internal structure of page information associated with an arbitrary one of multiple pages (x-th page) of the Multi-Page Menu;

FIG. 26 shows the state transition of buttons O-A, O-B, O-C, and O-D;

BEST MODE FOR CARRYING OUT THE INVENTION

First Embodiment

Figure 1:
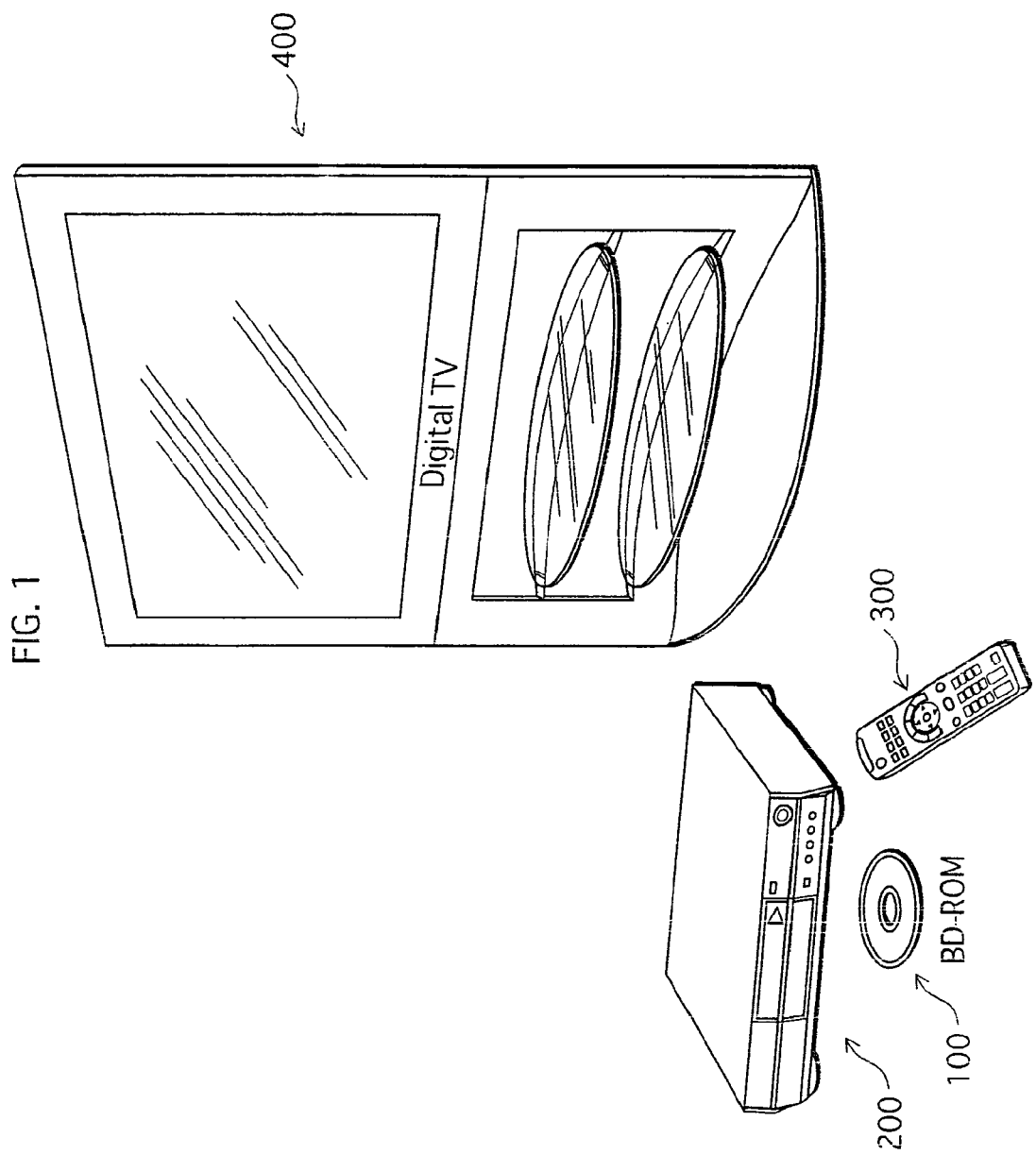
FIG. 1 is shows a usage act of a recording medium according to the present invention.

An embodiment of a recording medium pertaining to the present invention is described below. Firstly, a usage act is described in relation to the present invention. FIG. 1 shows a usage act of a recording medium pertaining to the present invention. A BD-ROM 100 in FIG. 1 is a recording medium pertaining to the present invention. The BD-ROM 100 is used to supply movie works in a home theater system formed from a playback apparatus 200, a remote controller 300, and a television 400.

Figure 2:
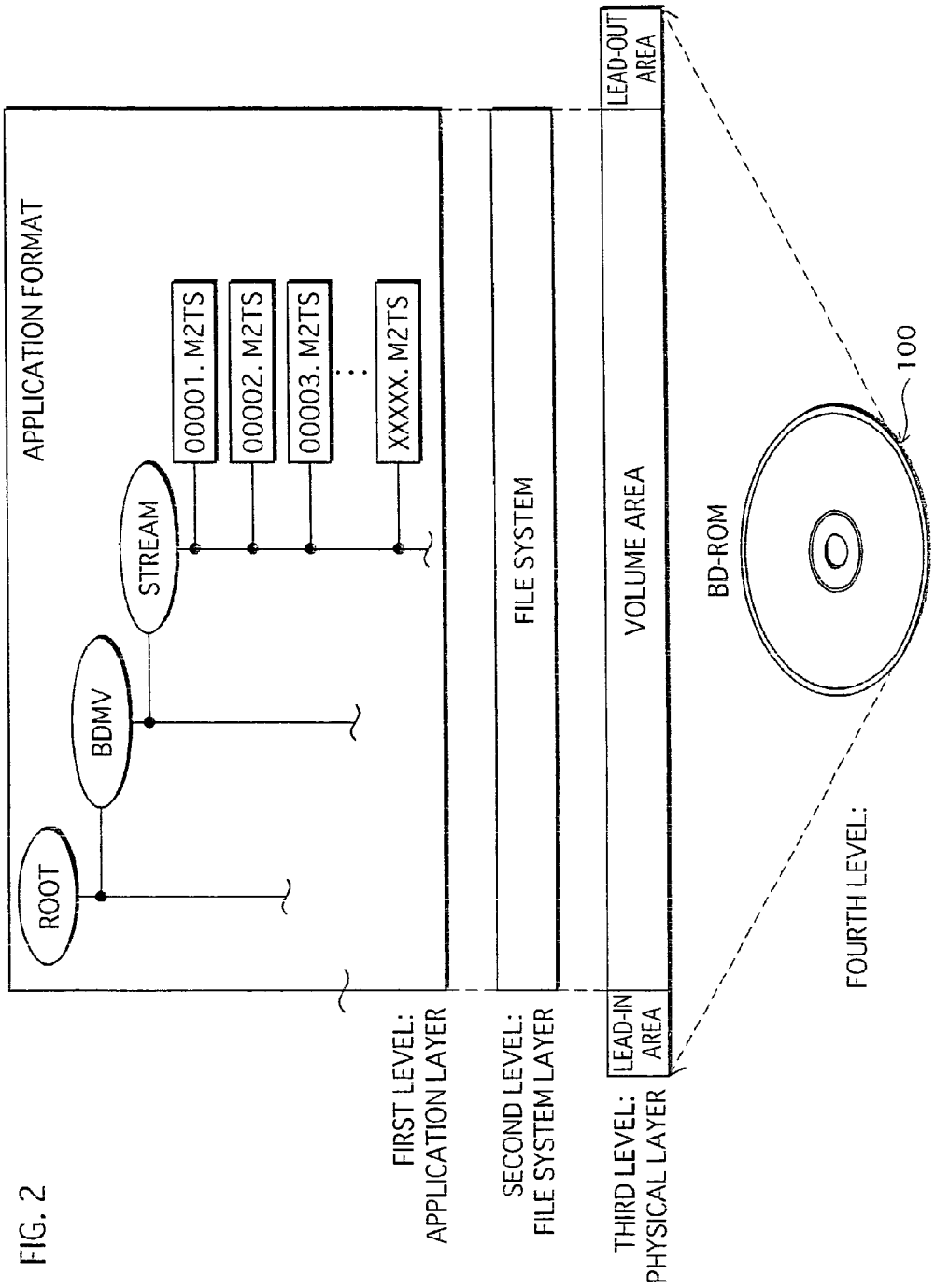
FIG. 2 shows the internal structure of a BD-ROM.

This completes the description of the usage act of the recording medium pertaining to the present invention. Next, a production act is described in relation to the implementation of a recording medium pertaining to the present invention. A recording medium pertaining to the present invention can be implemented as a result of enhancements in the application layer of BD-ROMs. FIG. 2 shows the structure of a BD-ROM.

A fourth level in FIG. 2 shows a BD-ROM, and a third level shows a track on the BD-ROM. The track on the third level depicts, in a laterally drawn-out form, the tracks spiraling from the inside to the outside of the BD-ROM. These tracks are formed from a lead-in area, a volume area, and a lead-out area. The volume area in FIG. 2 has a layer model consisting of a physical layer, a file system layer, and an application layer. If the application layer format (hereinafter, simply "application format") of the BD-ROM is expressed using a directory structure, it would be as shown in a first level.

The first level expresses the application layer format (hereinafter, simply "application format") of the BD-ROM. As shown in FIG. 2, below a ROOT directory a sub-directory called BDMV is formed, and below the BDMV directory is a STREAM directory.

The STREAM directory stores AVClips. In the STREAM directory, "00001.m2ts", "00002.m2ts", "00003.m2ts" are files storing AVClips. These files are assigned file names of a unified format "xxxxx.mt2s (x being an arbitrary integer)".

<AVClip Structure>

The following describes an AVClip. FIG. 3 illustrates how an AVClip is structured.

An AVClip (middle level) is formed by converting a video stream comprising a plurality of video frames (pictures pj1, pj2, pj3) and an audio stream comprising a plurality of audio frames (first upper level) into a PES packet string (second upper level), which is then converted to the TS packets (third upper level). Likewise, a subtitle-related presentation graphics stream (PG stream) and an interaction-presentation-related interactive graphics stream (IG stream) (first lower level) are converted to a PES packet string (second lower level), which is converted to TS packets (third lower level), and the TS packets are then multiplexed.

The presentation graphics stream and the interactive graphics stream are data in a stream format for realizing a screen composition obtained by compositing graphics with pictures in the video stream. An entity of data carried by the PG and IG streams for composition with a picture is referred to as a "graphics object".

The presentation graphics stream is a graphics stream used for presentation of subtitles using graphics objects.

The interactive graphics stream is a graphics stream used for interactive presentation of graphics objects. This completes the description of the AVClip structure. In addition to AVClips that consist of a plurality of elementary streams, as described, there are also AVClips that consist of a single elementary stream. An AVClip consisting of a single elementary stream is called a SubClip. A SubClip is a file that stores only an interactive graphics stream, only an audio stream, or only text data. An interactive graphics stream stored as a SubClip is loaded to the memory in advance for synchronous playback with another AVClip. This operation of loading a SubClip to the memory in advance is called "preloading".

Figure 4A:
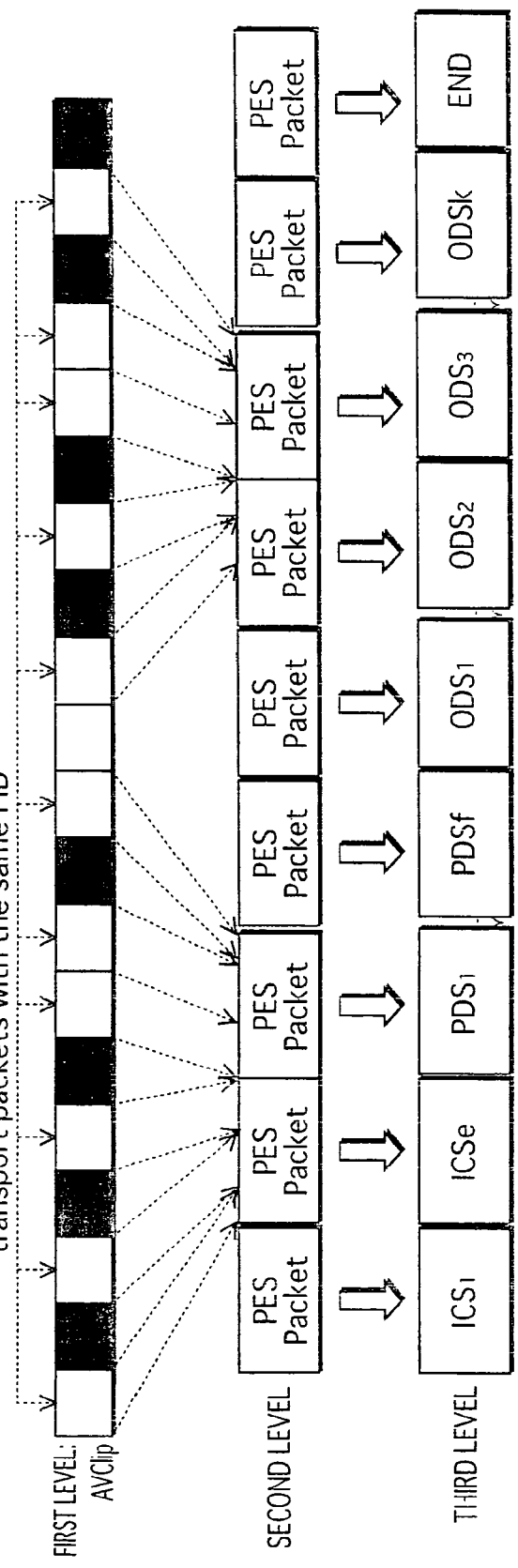
FIG. 4A shows the structure of an interactive graphics stream.

The following describes an interactive graphics stream. FIG. 4A shows the structure of an interactive graphics stream. A first level shows a TS packet string that constitutes an AVClip. A second level shows a PES packet string that constitutes a graphics stream. The PES packet string in the second level is formed by concatenating payloads of TS packets having a predetermined PID within the TS packet string shown on the first level. Note that since the presentation graphics stream is not the focus of the present invention, a description thereof is omitted.

A third level shows the structure of the graphics stream. The graphics stream is composed of functional segments that include an ICS (Interactive Composition Segment), a PDS (Palette Definition Segment), an ODS (Object_Definition_Segment), and an END (END of Display Set Segment). The ICS is a screen composition segment, and the PDS, ODS and END are definition segments. Each functional segment is either in one-to-one or one-to-many correspondence with PES packets. In other words, each one functional segment is recorded on the BD-ROM after having been converted to a single PES packet, or fragmented and converted to a plurality of PES packets.

The following describes each functional segment.

The Interactive Composition Segment (ICS) is a functional segment for controlling interactive screen composition of graphics. One example of an interactive screen composition is a Multi-Page Menu.

The Object_Definition_Segment (ODS) is a run-length encoded graphics object composed of a plurality of pieces of run-length data. The run-length data expresses a pixel string using a Pixel Code which shows a pixel value and a continuous length of the pixel value. Each Pixel Code is an 8-bit value from 0 to 255. Through use of this Pixel Code, the run-length data sets arbitrary 256 pixel colors from among 16,777,216 colors of full color.

The Palette Definition Segment (PDS) is a functional segment storing palette data. Palette data is data shows combinations of Pixel Codes of 0 to 255 and pixel values. The pixel value used herein is made up of a red difference component (Cr value), a blue difference component (Cb value), a luminance component (Y value), and a transparency (T value). Substituting the Pixel Code of each run-length data into a pixel value shown by the palette data produces a color.

The END of Display Set Segment (END) provides an explicit indication that the end of transfer of the functional segments is complete. The END is located directly after the last ODS. This completes the description of the functional segments.

Figure 4B:
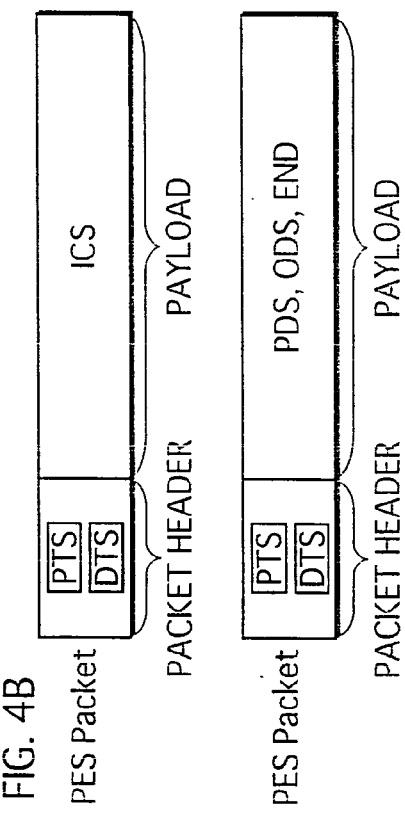
FIG. 4B shows PES packets obtained by converting functional segments.

FIG. 4B shows PES packets obtained by converting functional segments. Each PES packet shown in FIG. 4B is composed of a packet header and a payload. The payload is an entity carrying a functional segment, and the packet header carries a DTS and a PTS associated with the functional segment. Note that hereinafter a DTS and a PTS in a packet header of a PES packet carrying a functional segment are simply described as a DTS and a PTS of that functional segment.

Figure 5:
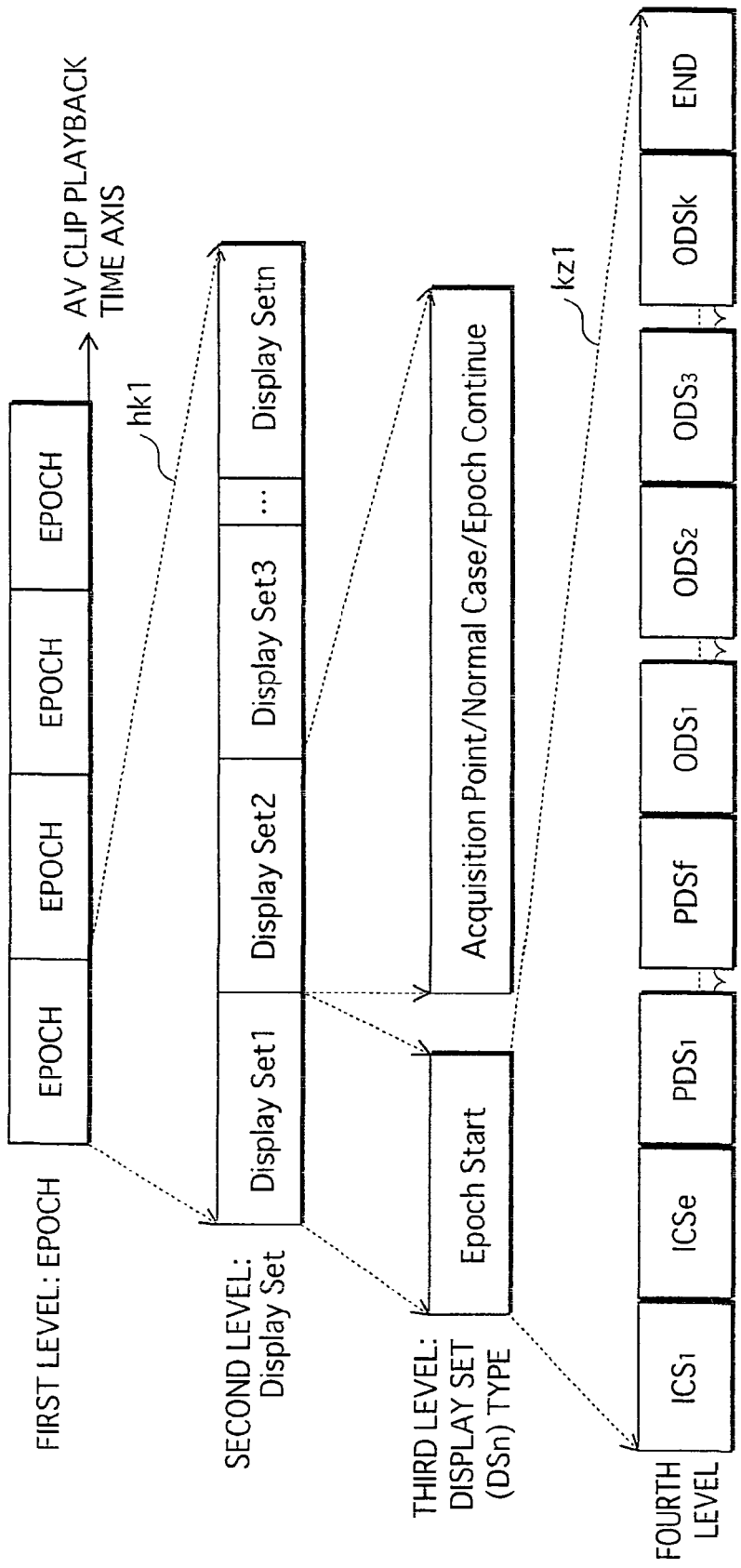
FIG. 5 shows the logical structure defined by various types of functional segments.

These various types of functional segments define a logical structure such as that shown in FIG. 5. FIG. 5 shows a logical structured from various types of functional segments. In FIG. 5, a first level shows Epochs, a second level shows Display Sets, and a third level shows types of the Display Sets. The functional segments shown on the third level of FIG. 4A are illustrated in a fourth level in FIG. 5.

An Epoch on the first level refers to one time unit of continuous memory management on a time axis of the AVClip playback, and also refers to a group of data assigned to that time unit. Memory mentioned herein includes a graphics plane for storing one screen of graphics objects and an object buffer for storing uncompressed graphics data. Continuous memory management means that neither the graphics plane nor the object buffer is flushed throughout the Epoch, and that deleting and rendering of graphics are performed only within a predetermined rectangular area on the graphics plane. (Flush denotes clearing the entire graphics plane or the entire graphics buffer.) The size and position of this rectangular area are fixed throughout the Epoch. As long as clearing and rendering of graphics are performed within this fixed rectangular area on the graphics plane, seamless playback is guaranteed. In other words, an Epoch is a time unit of seamless playback on the time axis of the AVClip playback. To change the graphics clearing/rendering area on the graphics plane, it is necessary to define a point on the playback time axis at which the change is effected and to set a new Epoch from the point onwards. In this case, the boundary between two Epochs is not guaranteed to be seamless.

The seamless playback mentioned herein means that clearing and rendering of graphics are each completed with a predetermined number of video frames. In the case of an interactive graphics stream, this number of video frames is four to five. The number of video frames is determined based on the ratio of the fixed rectangular area to the entire graphics plane and the transfer rate between the object buffer and the graphics plane.

A Display Set (hereinafter abbreviated to "DS") on a second level is a group of functional segments for realizing one screen composition. A broken line hk1 in FIG. 5 shows which Display Sets on the second level belong to which Epoch. The DS1, DS2, DS3, . . . DSn are shown to belong to the first Epoch on the first level.

A third level shows the types of the DSs. The first DS in an Epoch is an "Epoch Start" DS. Each DS other than the first one in the Epoch is either an "Acquisition Point" DS, a "Normal Case" DS, or an "Epoch Continue" DS. Although the DSs are shown in the order of Acquisition Point, Normal Case, and Epoch Continue, this order is merely an example and the DSs may be arranged in a different order.

The Epoch Start DS indicates a start of a new Epoch. Thus, the Epoch Start DS contains all functional segments necessary for the next screen composition. The Epoch Start DS is provided at a point to which a skip operation is likely to be made, such as a start of a chapter in a movie.

The Acquisition Point is a DS that is not at the start the Epoch but includes all functional segments necessary for the next screen composition. Therefore, graphics can be displayed reliably when playback is started from the Acquisition Point DS. That is to say, the Acquisition Point DS enables a display composition to be made partway through the Epoch.

The Acquisition Point DS provided at a point to which a skip operation may be made, such as a point that may be designated by a time search. The time search is an operation of locating a playback point corresponding to a time input by a user in minutes/seconds. The time input is made in a relatively large unit such as ten minutes or and ten seconds. Accordingly, the Acquisition Point DS is provided at a point that can be designated by a time search made in units of ten minutes and ten seconds. By providing the Acquisition Point DS at such a point that can be designated by a time search, playback of the graphics stream can be smoothly carried out when a time search is conducted.

The Normal Case DS provides a display effect "display update", and contains only a difference from the immediately preceding display composition. For example, if a DSv is identical in content to an immediately preceding DSu but different in display composition, the DSv is a Normal Case DS which contains only an ICS or an ODS. This eliminates the need to provide duplicate ODSs in DSs, and assists in reducing the amount of data stored on the BD-ROM. Since the Normal Case DS contains the only the difference from the immediately preceding display composition, no display composition can be displayed with the Normal Case DS alone.

The Epoch Continue DS indicates at the start of an AV clip that one Epoch continues from a different AV clip. For example, a DSn contains a composition state field having a value indicating "Epoch Continue". In this case, the DSn belongs to the same Epoch as an immediately preceding DSn−1 even if the two DSs are on different AV clips. Since the DSs and DSn−1 belong to the same Epoch, there will be no flushing of the graphics plane and of the object buffer even if there is a boundary of AV clips between the two DSs.

In FIG. 5, dashed lines kz1 show to which DS the functional segments on the fourth level belong. Given that the functional segments shown in FIGS. 4A and 5 are the same, FIG. 5 shows that the functional segments shown in FIG. 4A belong to the Epoch Start DS. Functional segments belonging to the Acquisition Point DS are identical to those belonging to the Epoch Start DS. In addition, functional segments belonging to the Normal Case DS are identical to those belonging to the Epoch Start DS, except that some of the functional segments are omitted in the Normal Case DS.

This completes the description of the logical structure defined by the functional segments. The following describes the allocation of DSs having such an ICS and ODSs, to the time axis of AV clip playback. Since the Epoch is a time unit of continuous memory management and includes one or more DSs, it is important how those DSs are allocated to the time axis of the AV clip playback. Note that the "time axis of the AV clip playback" refers to the time axis used for defining the decode timing and playback timing of individual pictures multiplexed in the AV clip. The decode timing and playback timing are expressed in the time accuracy of 90 KHz. The DTS and PTS of an ICS or of an ODS within a DS show the timing based on which the synchronous control is realized. DSs are allocated to the time axis of the AV clip playback by carrying out the synchronous control in accordance with each DTS and PTS attached to an ICS and to an ODS.

Figure 6:
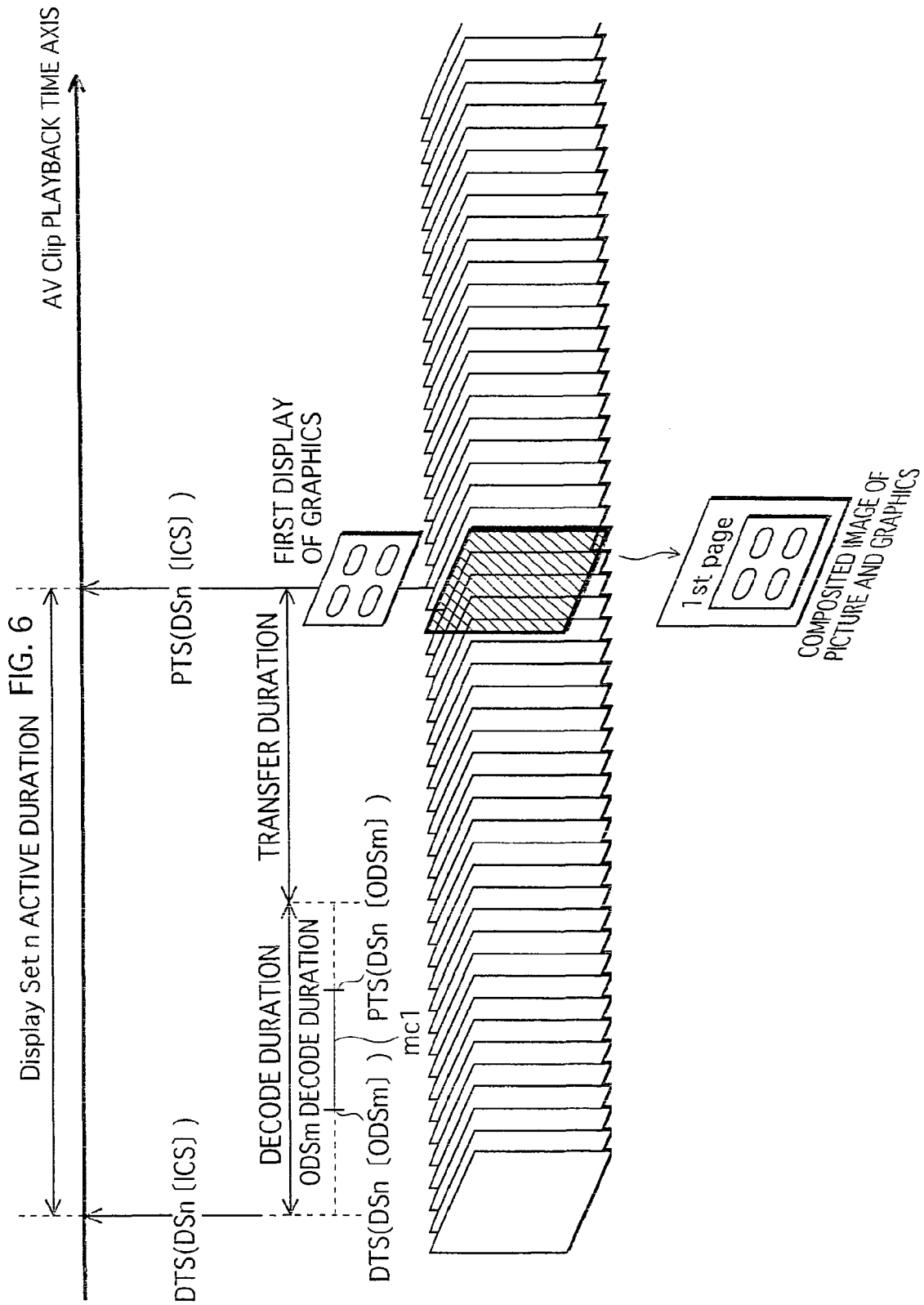
FIG. 6 shows the time axis of AV clip playback to which a DSn is allocated.

Suppose an arbitrary one of DSs within an Epoch is denoted as a DSn, and that the DSn is allocated to the time axis of the AV clip playback based on the DTS and PTS set as shown in FIG. 6. FIG. 6 shows the time axis of playback of AV clip playback to which the DSn is allocated. In FIG. 6, the duration of the DSn starts at the time shown by the value of DTS of the ICS belonging to the DSn (DTS(DSn[ICS])), and ends at the time shown by the value of PTS of the END belonging to the DSn (PTS(DSn[ICS])). The display timing for the first presentation of the DSn is shown by the value of PTS of the ICS(PTS(DSn[ICS])). By adjusting the PTS(DSn [ICS]) value to correspond to the display timing of a desired picture within the video stream, the first presentation of the DSn will be synchronized with the video stream.

The PTS (DSn[ICS]) value is the sum of the time taken for decoding the ODS (DECODEDURATION) and the time taken for transferring the graphics object obtained as a result of the decoding (TRANSFERDURATION).

The decoding of ODS needed for the first presentation is completed within the DECODEDURATION. The duration mc1 shown in FIG. 6 is the time required for decoding an arbitrary one of ODSs within the DSn (ODSm). The start of the decode duration mc1 is shown by the value of DTS(ODSn [ODSm]), and the end of the decode duration mc1 is shown by the value of PTS (ODSn[ODSm]).

An Epoch is defined by allocating every ODS within the Epoch to the time axis AV playback as described above. This completes the description of the allocation to the time axis of AV playback.

One feature of the first embodiment is to control the behavior of a Multi-Page Menu in accordance with the progression of AV playback. The novel structure realizing the feature resides in an interactive_composition structure provided in the ICS. The following describes the interactive_composition structure.

FIGS. 7A and 7B are views showing the relations between the interactive_composition structures and the ICSs. The interactive_composition structure and the ICS may be in one-to-one correspondence as shown in FIG. 7A, or one-to-many correspondence as shown in FIG. 7B.

The one-to-one correspondence is applicable to the case where the interactive_composition structure is small enough to be contained in one ICS.

The one-to-many correspondence is applicable to the case where the interactive_composition structure is too large in size to be carried by one ICS and thus fragmented to be stored in multiple ICSs. Since the interactive_composition structure can be fragmented to be stored in multiple ICSs, there is no restriction imposed on the size of interactive_composition structure. The interactive_composition structure may be as large as 512 Kbytes, 1 Mbyte, or any number of bytes. Although one interactive_composition structure may correspond to multiple ICSs, for the simplicity sake, a description hereinafter is given on the basis of the ICS and interactive_ composition structure being in one-to-one correspondence.

Figure 8:
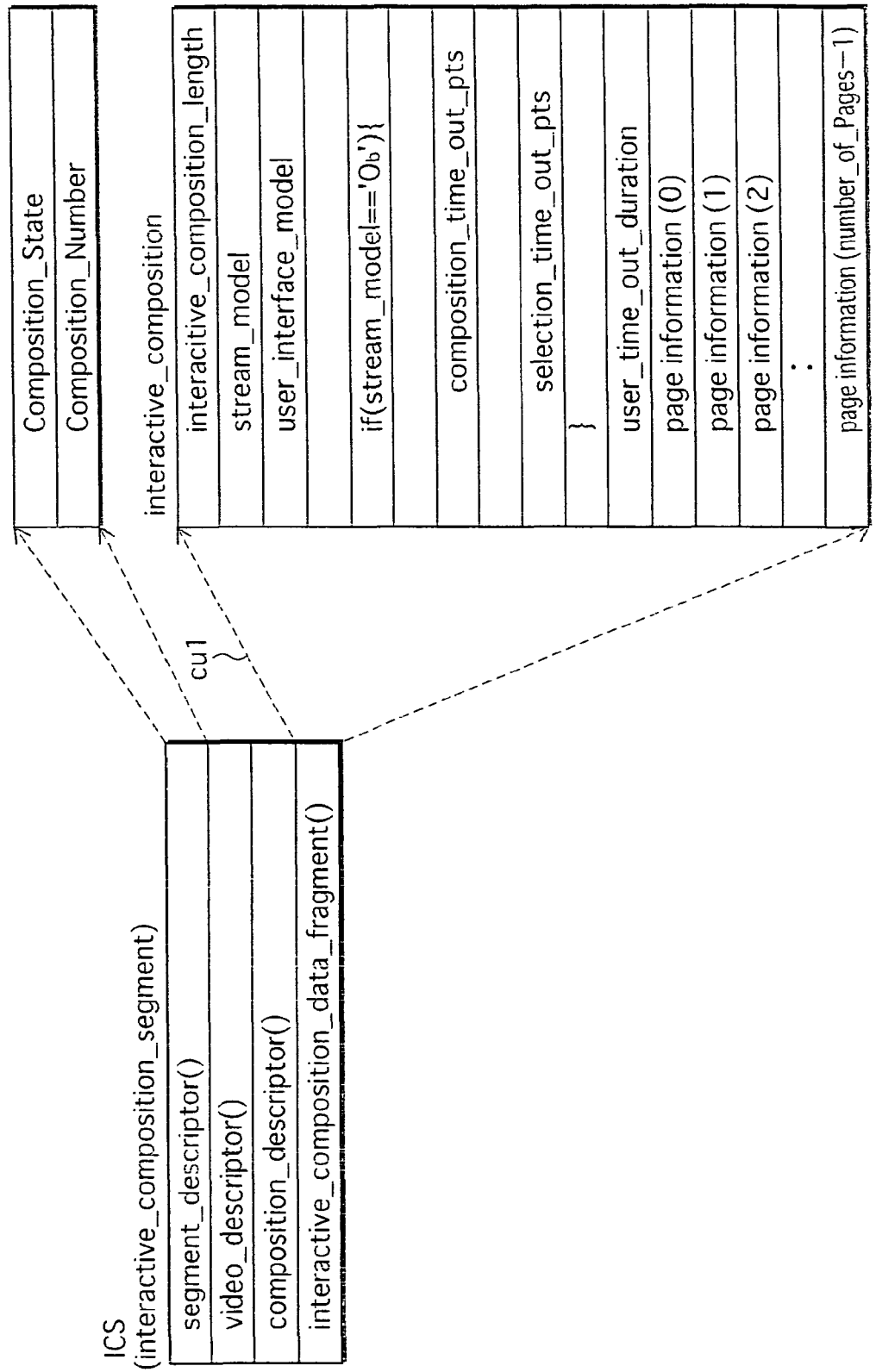
FIG. 8 shows the internal structure of an ICS.

FIG. 8 is a view showing the internal structure of an ICS. The ICS contains one interactive_composition structure or a fragment of one interactive_composition structure. As shown in the left part of FIG. 8, the ICS is composed of the following fields: "segment descriptor" showing that the ICS is an ICS; "video_descriptor" showing the width and height of the video plane in pixels and the frame rate of the associated video stream; "composition_descriptor" showing (i) composition_state, which is information showing whether the type of DS to which the ICS belongs is a Normal Case DS, an Acquisition Point DS, an Epoch Start DS, or an effect_sequence, and (ii) composition_number showing how many composition have been perform with respect to a screen; "interactive_composition_data_fragment" showing that whether the ICS is carrying an entire interactive_composition structure or a fragment of interactive_composition structure.

An arrow cu1 in FIG. 8 shows the internal structure of an interactive_composition structure in detail. The interactive_composition structure is composed of the following fields: "interactive_composition_length", "stream_model", "user_interface_model", "composition_time_out_pts", "selection_time_out_pts", "user_time_out_duration", and "page_information (1), (2) . . . (i) . . . (number_of_page−1)" corresponding respectively to pages in the Multi-Page Menu available for presentation.

The interactive_composition_length field shows the length of the interactive_composition structure.

The stream_model field shows the type of stream model of the associated interactive_composition structure. The stream model shows how the interactive_composition structure is stored on the BD-ROM and how the data is to be processed by a buffer (referred to as a "composition buffer") on a playback apparatus. Specifically, the stream model shows whether (i) the graphics stream is multiplexed with an AV clip and separated to be loaded to the composition buffer or (ii) a graphics stream is stored as a Sub clip in a separate file from the AV clip and preloaded to the composition buffer.

The user_interface_model field shows the type of user interface model to be used for the interactive_composition structure. The user_interface_model shows either "Always-On U/I" or "Pop-Up U/I". Always-On U/I is a user interface by which a menu appears on screen and disappears in accordance with the progression of AV clip playback. Pop-Up U/I is a user interface by which a menu appears on screen and disappears in response to a user operation.

The composition_time_out_pts field shows the end time of an Epoch (Epoch END) to which the ICS belongs. The interactive control defined by the ICS is no longer valid at the Epoch END. That is, a point of time shown by the composition_time_out_pts field is the end of valid interactive control period.

The selection_time_out_pts field shows the button selection termination time. At the time shown by the selection_time_out_pts value, the button that is currently in the selected is automatically activated. Note that buttons are elements representing options in the Multi-Page Menu. The selection_time_out_pts field defines the valid interaction period for user interaction to activate the buttons.

The IF statement (if (stream_model=='0b')) shown in the figure means that the above described composition_time_out_pts and selection_time_out_pts fields are optional information that are provided only when the stream_model field shows "Multiplexed" type. In the case of ICS of which stream model is "Preloaded" type, neither of the composition_time_out_pts and selection_time_out_pts fields is provided.

The user_time_out_duration field shows the timeout at which on-screen pages presented in response to a user operation are removed. When the Always-On U/I is used, pages from the second page onward (referred to as sub pages) are presented in response to user operations. Thus, after the timeout defined by the user_time_out_duration, all sub pages are removed from the screen leaving the first page on-screen. When the Pop-Up I/O is used, not only the sub pages but also every page of the Multi-Page Menu is presented in response to user operations. Thus, after the user_time_out_duration, all on-screen pages are removed leaving no page remain presented (No Menu Display).

Figure 9:
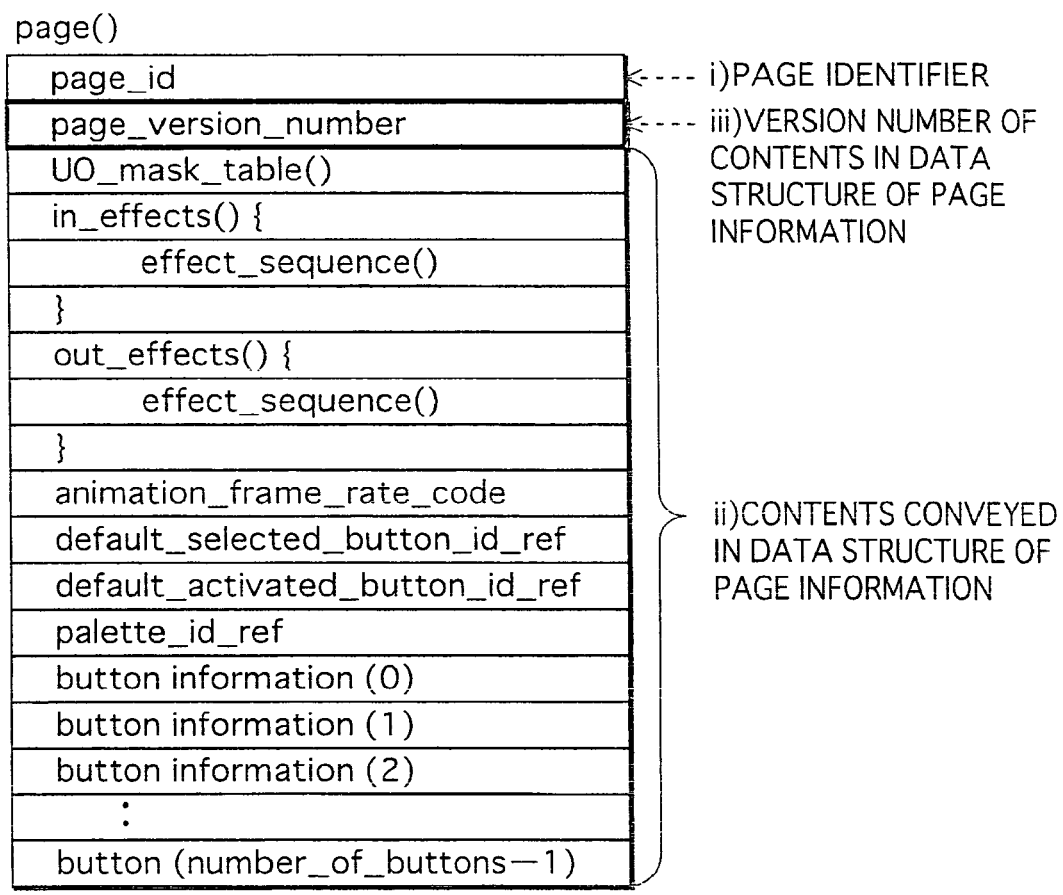
FIG. 9 shows the internal structure of page information associated with an arbitrary one of multiple pages (y-th page) in an x-th display set in one Display Set.

FIG. 9 shows the internal structure on page information of an arbitrary page (page y) among a plurality of pages in an x-th Display Set in one Display Set. As shown on the right in FIG. 9, page information (y) is composed of:

i) a "page_id" field that uniquely identifies a page(y);

ii) the contents of the data structure that is conveyed by page information (y), which are specifically the following fields: "UO_Mask_Table", "in_effect", "out_effect", "animation_frame_rate_code", "default_selected_button_id_ref", "default_activated_button_id_ref", "pallet_id_ref", and "button_information (1) (2) . . . (number_of_buttons−1)"; and iii) a page_version_number field that shows the version of the contents of the page information(y).

The following describes the fields that constitute the data structure conveyed by the page information(y).

The UO_Mask_Table field is a table showing permission/prohibition of user operations with respect to the page(y).

The in_effect field indicates a display effect to be reproduced at the start of presentation of page(y). The out_effect shows a display effect to be reproduced when ending presentation of page (y).

The animation_frame_rate_code field describes a frame rate to be applied when presenting animation effects in page (y).

The default_selected_button_id field shows whether a button to be put in the selected state by default upon starting the presentation of the page(y) is determined dynamically or statically. When this field is set to "0xFF", the default selected button is determined dynamically. In such a case, the value in the Player Status Register (PSR) in the playback apparatus is interpreted with priority, and the button shown by the PSR is put into the selected state. When the field is set to a value other than 0xFF, the default selected button is determined statically. In such a case, the PSR is overwritten with the default_selected_button_id_ref field value, and the button specified by this field is put into the selected state.

The default_activated_button_id_ref field shows a button to be automatically put into the actioned state at the time defined by the selection_time_out_pts field value. When the default_activated_button_id_ref field value is set to "FF", the button that is in the selected state at the time of the timeout is automatically put into the actioned state. When this field is set to "00", no button is automatically put into the actioned state. When this field is set to a value that is neither "00" or "FF", the value is interpreted as a valid button number statically specifying the button to be automatically put into the actioned state.

The pallet_id_ref field shows the ID of a pallet to be set in the CLUT unit.

Each button_info field is information defining a button to be presented on page(y). With the above fields, each page in the Multi-Page Menu is defined.

The page_version_number field shows a version of the content conveyed by the data structure of the page information(y) in an Epoch. Since this page_version_number is a main feature of the present invention, a detailed description is given in the following. The version of the page information(y) shows how many times the content of the data structure conveyed by the page information has been updated. The data structure of the page information(y) is considered to have been updated if there has been a change in the value contained in one or more of the fields after the page_version_number field.

The version shown by the page_version_number field is expressed as serial number in a single Epoch. For this reason, the value contained in the page_version_number varies according to which Display Set the page information belongs to in the Epoch. In page information belonging to the Epoch Start Display Set in the Epoch, the page_version_number field is set to an initial value of 0. On the other hand, from the second Display Set onwards in the Epoch, the page_version_number field in each Display Set that permit updates (Acquisition Point and Normal Case Display Sets) is set to a value of 1 to 255. This value shows the number of updates.

Figure 10:
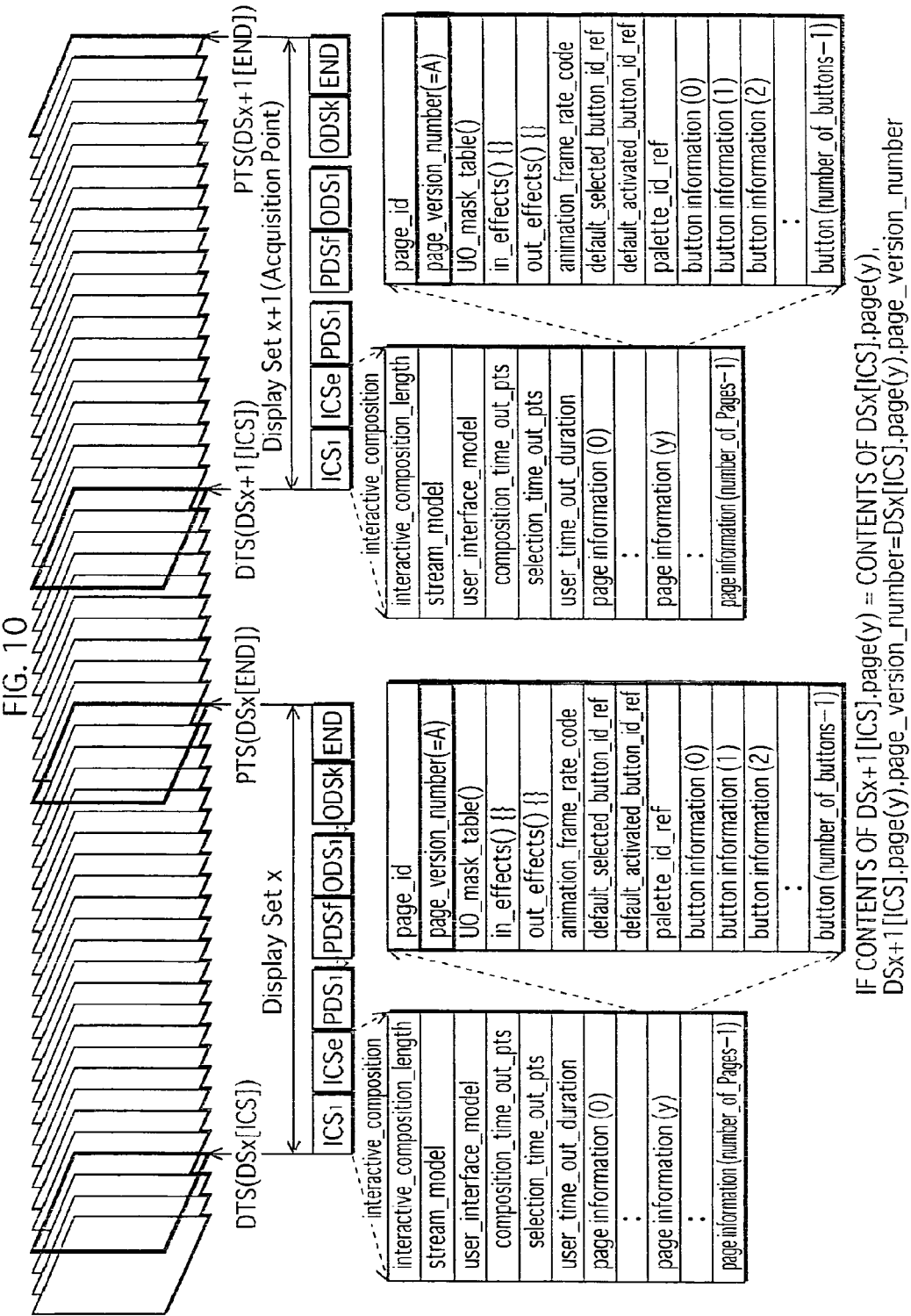
FIG. 10 shows settings of the page_version_number field in two consecutive Display Sets (DSx+1, DSx)

The following describes the page_version_number in detail with use of a specific example shown in FIG. 10.

Figure 11:
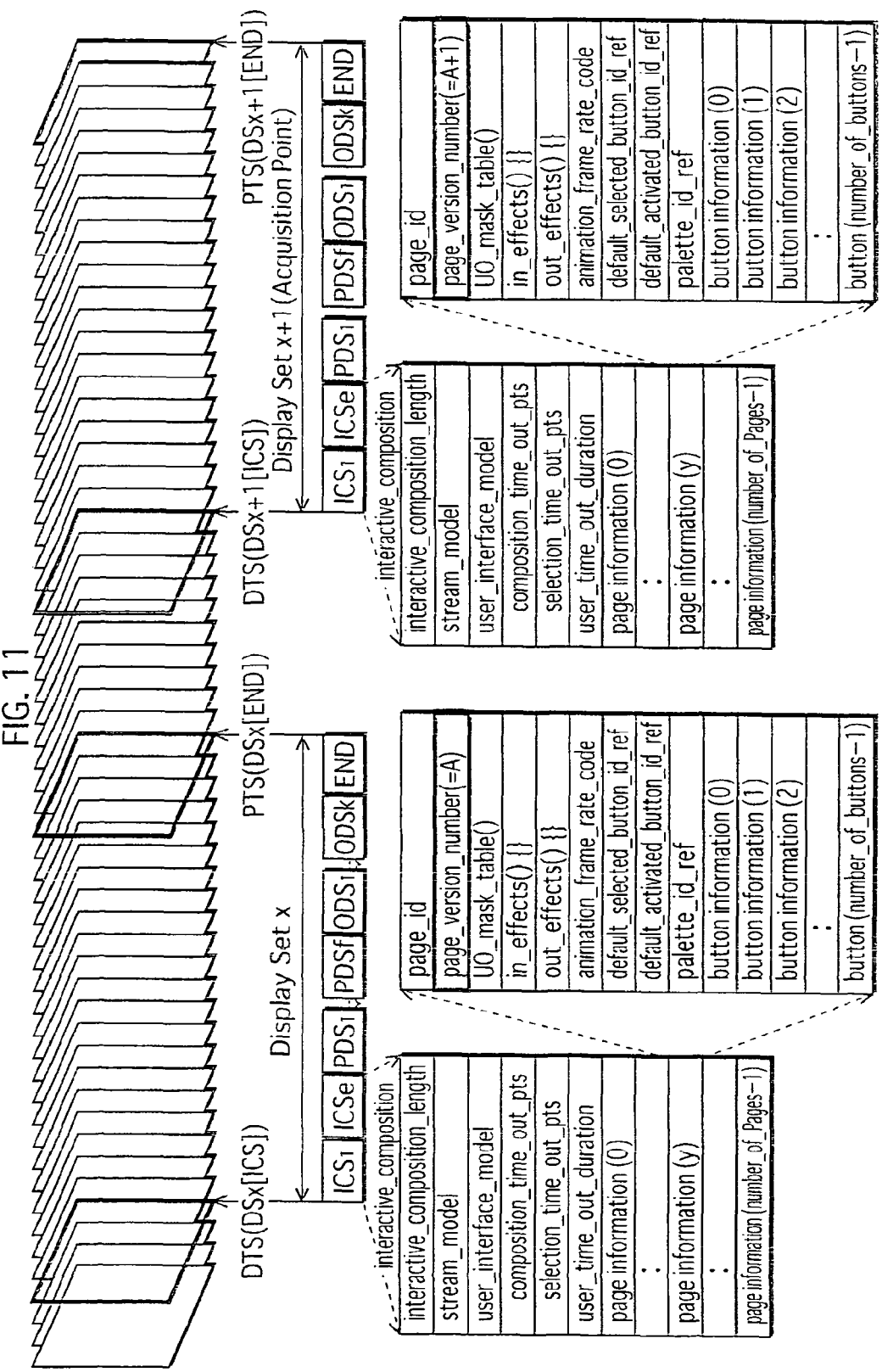
FIG. 11 shows a comparison of a page composed from DSx.page information(y) and a page composed from DSx+1.page information(y)

FIG. 10 shows settings of the page_version_number field in two consecutive Display Sets (DSx+1, DSx). DSx+1 is an Acquisition Point Display Set, and FIG. 10 shows arbitrary page information(y) in this Display Set. When the content of the page information(y) in DSx+1 is identical to that of DSx, the page_version_number field of the page information(y) in DSx+1 is set to the same value as the page_version_number field in the page information(y) in DSx. By referring to these page_version_number fields, the playback apparatus is able to judge that the content of the page information(y) has not changed between DSx and DSx+1. In contrast, in FIG. 11 the content of the page information(y) in DSx+1 differs to that in the page information(y) in DSx. In this case, the value set in the page_version_number field in the page information(y) in DSx+1 is a value A+1 obtained by adding "1" to the value of the page information(y) in DSx. By referring to the value of the page_version_number field in the page information(y) in DSx+1, the playback apparatus is able to know that the page information(y) in DSx+1 has changed from the page information(y) in DSx.

Figure 12:
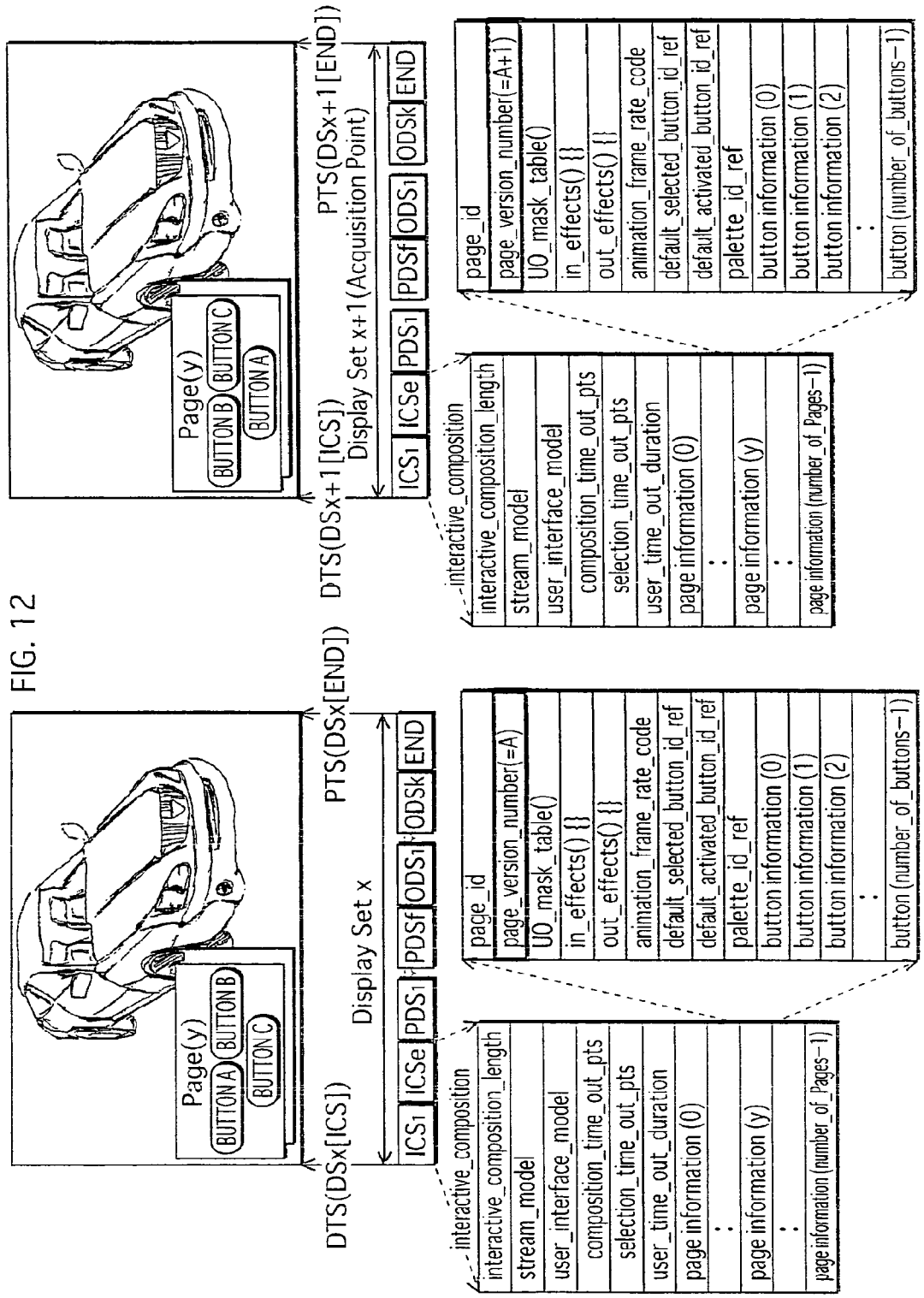
FIG. 12 shows a comparison of a page composed from DSx.page information(y) and a page composed from DSx+1.page information(y)

FIG. 12 shows a comparison of a page constituted from the page information(y) in DSx and a page constituted from the Page information(y) in DSx.

The page constituted from the page information(y) in DSx+1 has three buttons: Button A, Button B, Button C, which are arranged in the stated order.

On the other hand, the page constituted from the page information(y) in DSx+1 has three buttons (Button A, Button B, Button C) arranged in the following order: Button B, Button C, Button A. The only difference between the two pages is that the buttons change from being arranged in order of Button A, Button B, Button C to being arranged in order of Button B, Button C, Button A. Even if there is only a slight change between the two pages, the value set in the page_version_number field in the page information(y) in DSx+1 is a greater value than that in DSx. Setting the page_version_number is this way enables even a slight change in the page information(y) to be signaled to the playback apparatus.

Although the above description gives an example of updating an Acquisition Point Display Set in the interactive_composition structure, a page_version_number field also exists in each page information in each Normal Case Display Set in the interactive_composition structure, and this page_version_number field can also be used to show that content of page information has changed between page information.

This completes the description of the recording medium. The following describes a playback apparatus pertaining to the present invention.

Figure 13:
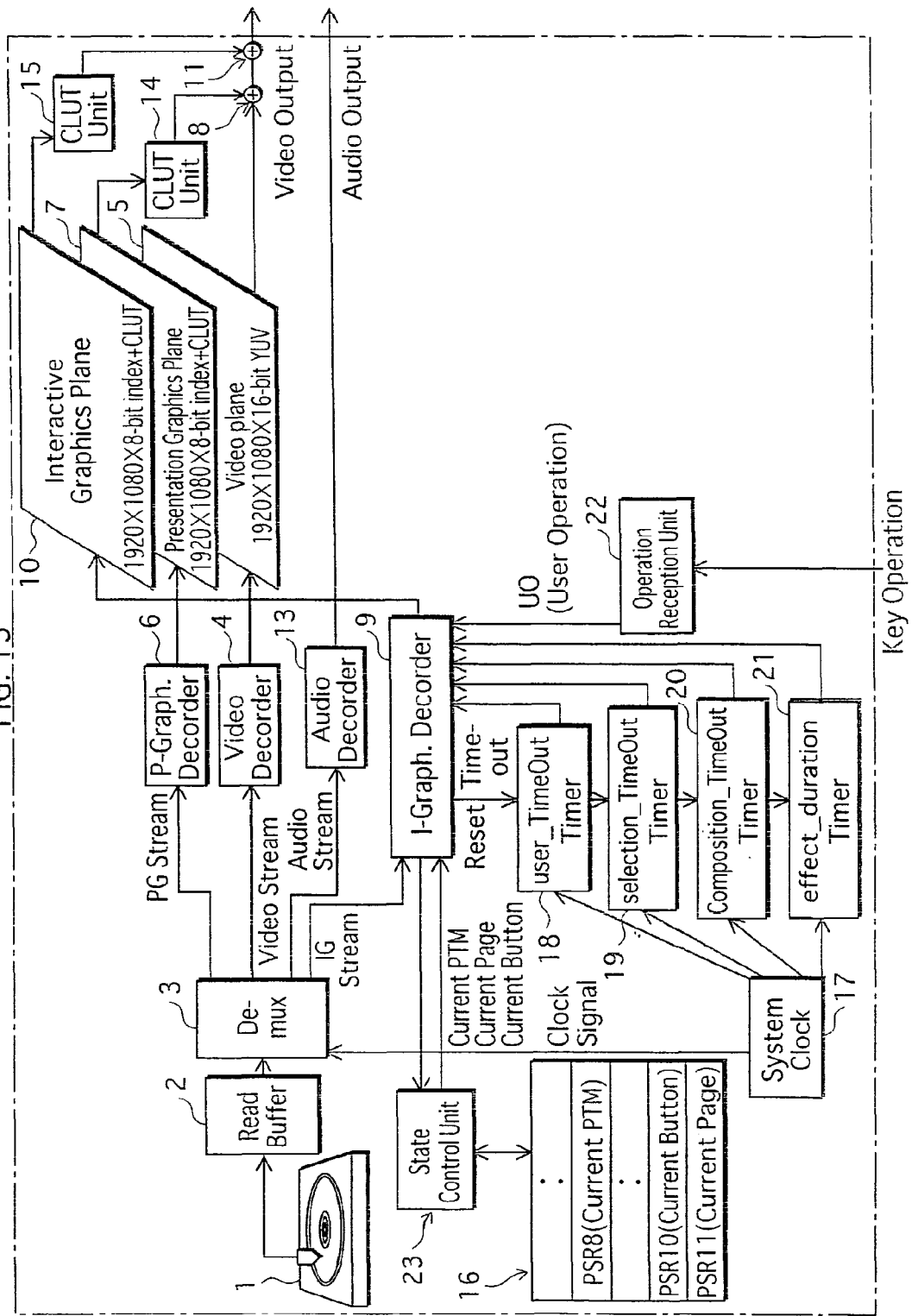
FIG. 13 shows the internal structure of a playback apparatus of the present invention.

FIG. 13 shows the internal structure of a playback apparatus pertaining to the present invention. The playback apparatus of the present invention is industrially manufactured based on the internal structure shown in FIG. 13. The playback apparatus of the present invention is mainly composed of two parts: a system LSI; and a drive apparatus. The industrial manufacturing is achieved by mounting the parts into the cabinet and on the board of the apparatus. The system LSI is an integrated circuit that includes various processing units for performing the functions of the playback apparatus. The playback apparatus manufactured in this way is mainly composed of two parts: a system LSI; and a drive apparatus. The industrial manufacturing is achieved by mounting the parts into the cabinet and on the board of the apparatus. The system LSI is an integrated circuit that includes various processing units for performing the functions of the playback apparatus.

The playback apparatus manufactured in such a manner includes a BD drive 1, a read buffer 2, a demultiplexer (De-MUX) 3, a video decoder 4, a video plane 5, a P-graphics decoder 6, a presentation graphics plane 7, a combining unit 8, an I-graphics decoder 9, an interactive graphics plane 10, a combining unit 11, an audio decoder 13, a CLUT unit 14, a CLUT unit 15, a PSR set 16, a system clock 17, a user_timeout timer 18, a selection_timeout timer 19, a composition_timeout timer 20, an effect_duration timer 21, an operation reception unit 22, and a state control unit 23.

The BD-ROM drive 1 performs loading and ejecting of a BD-ROM, and accesses the BD-ROM.

The read buffer 2 is a FIFO memory in which TS packets read from the BD-ROM are stored in the First-In-First-Out manner.

The demultiplexer (De-mux) 3 extracts TS packets from the read buffer 2, and converts the TS packets into PES packets. The demultiplexer 3 outputs PES packets, out of the PES packets obtained by the conversion, that have predetermined PIDs, to any of the video decoder 4, the audio decoder 13, the P-graphics decoder 6, and the I-graphics decoder 9.

The video decoder 4 decodes PES packets received from the demultiplexer 3, and writes the resulting uncompressed picture data to the video plane 5.

The video plane 11 is a plane for storing uncompressed picture data. The term "plane" refers to a memory area in the playback apparatus for storing pixel data of one screen. If a plurality of planes are provided in the playback apparatus, the playback apparatus can add the data stored in each plane pixel by pixel to produce one video output, whereby a plurality of graphics images are overlaid as one composite image. The resolution of the video plane 5 is 1920×1080. Picture data is stored in the video plane 5 as 16-bit pixel data expressed in YUV values.

The P-Graphics decoder 6 decodes a graphics stream read from the BD-ROM or HD, and writes the resulting uncompressed graphics to the presentation graphics plane 7. The decoding of the graphics stream results in subtitles appearing on the screen.

The presentation graphics plane 18 is a memory having an area for storing one screen of uncompressed graphics. The resolution of this plane is 1920×1080, and uncompressed graphics are stored in the presentation graphics plane 7 as 8-bit pixel data expressed in index color. The uncompressed graphics stored in the presentation graphics plane 7 are displayed after the index color is converted using a CLUT (Color Lookup Table).

The combining unit 8 combines (i) the uncompressed picture data with the data stored in the presentation graphics plane 7.

The I-graphics decoder 9 decodes an interactive graphics stream read from the BD-ROM or HD, and writes the resulting uncompressed graphics in the interactive graphics plane 7.

The interactive graphics plane 10 stores the uncompressed graphics that are obtained as a result of the decoding by the I-graphics decoder 9. An instruction from the I-graphics decoder 9 turns the interactive graphics plane 10 into a turned-on state if it has been in a normal turned-off state. The turned-off state denotes a state in which the playback apparatus controls the interactive graphics plane 10 such that no uncompressed graphics data stored in the interactive graphics plane 10 is composited with a moving picture and no page is presented. On the other hand, the turned-on state denotes a state in which the playback apparatus controls the interactive graphics plane 10 such that uncompressed graphics data stored in the interactive graphics plane 10 is output to the CLUT unit 15 and composited with a moving picture.

The combining unit 11 combines the data stored in the interactive graphics plane 10 with a composite image (a combination of the uncompressed picture data and the data stored in the presentation graphics plane 7) output form the combining unit 8.

The audio decoder 13 decodes PES packets received from the demultiplexer 3 to output uncompressed audio data.

The CLUT unit 14 converts index colors of the uncompressed graphics stored in the presentation graphics plane 7 to Y, Cr, and Cb values.

The CLUT unit 15 converts index colors of the uncompressed graphics stored in the interactive graphics plane 10 to the Y, CR, and Cb values.

The PSR set 16 is a set of registers in the playback apparatus. The set of registers includes 64 player status registers (PSRs) and 4,096 general purpose registers (GPRs). The 64 player status registers represent the current status of the playback apparatus. Specifically, PSR5 to PSR8 represent the current playback position. PSR8 takes on a value ranging from 0 to 0xFFFFFFFF representing the current playback position (current PTM) using the time accuracy of 45 KHz. The PSR 11 represents the page_id of a current page in the Multi-Page Menu, and the PSR10 represents the button in the selected state (current button) on the current page.

The system clock 17 generates a clock signal. The De-MUX 3 converts the PES packets in synchronization with this clock signal.

The user_timeout timer 18 is set to the value of the user_time_out_duration field at the time specified by the PTS(DSn[ICS]). Upon the user_time_out_duration field value being set, the user_timeout timer 18 starts counting down in accordance with the system clock. The user_timeout timer 18 is reset to the user_time_out_duration field value each time a user operation is performed. If no user operation is received before the user_timeout timer 18 reaches zero, the user_timeout timer 18 times out.

The selection_timeout timer 19 is set to the value of the selection_time_out_pts field at the time specified by the PTS (DSn[ICS]). Upon the selection_time_out_pts field value being set, the selection_timeout timer 19 starts counting down in accordance with the system clock. The selection_timeout timer 19 is reset to the selection_time_out_pts field value each time a user operation is performed. If no user operation is received before the selection_timeout timer 19 reaches zero, the selection_timeout timer 19 times out. The selection_timeout timer 19 timing out indicates that the valid interactive period shown in FIG. 9 has ended.

The composition_timeout timer 20 is set to the value of the composition_time_out_pts field at the time specified by DTS (DSn[ICS]). Upon the composition_time_out_pts field value being set, the timer 20 starts counting down in accordance with the system clock. The composition_timeout timer 20 is not reset even if a user operation is received. The composition_timeout timer 20 timing out, i.e. reaching zero, indicates that the Epoch END has been reached.

The effect_duration timer 21 is set to the value of the effect_duration field at the time specified by DTS (DSn[ICS]) if the DSn is an Epoch Start DS. The effect_duration field shows a duration for which effect video reproduced. Upon the effect_duration field value being set, the effect_duration timer 21 starts counting down in accordance with the system clock. The effect_duration timer 21 is not reset even if a user operation is performed. The effect_duration timer 21 timing out, i.e. reaching zero, indicates that the next display composition of the animation effect needs to be presented.

The operation reception unit 22 receives a key operation performed with respect to a remote controller or a front panel of the playback apparatus, and outputs information representing the user operation (UO) to the I-Graphics decoder 9.

The state control unit 23 sets desired values in the PSRs in accordance with setting instructions from the I-Graphics decoder 9.

<Internal Structure of the I-Graphics Decoder 9>

Figure 14:
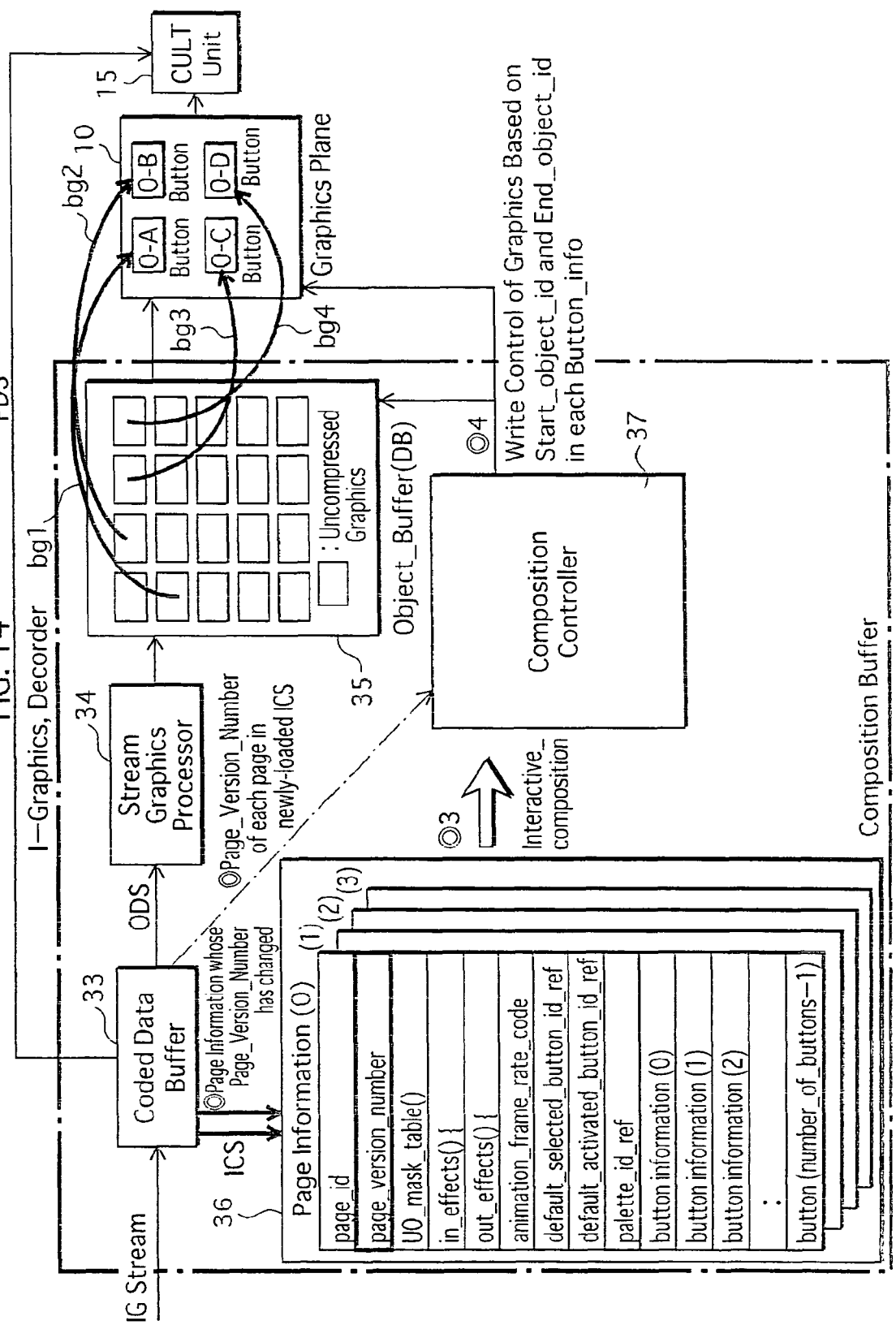
FIG. 14 shows the internal structure of an I-Graphics decoder 9.

The following describes the internal structure of the I-Graphics decoder 9 with reference to FIG. 14. As shown in FIG. 14, the I-Graphics decoder 9 is composed of a coded data buffer 33, a stream graphics processor 34, an object buffer 35, a composition buffer 36, and a graphics controller 37.

The coded data buffer 33 is a buffer for temporarily storing an ICS, a PDS and an ODS together with their DTS and PTS.

The stream graphics processor 34 decodes an ODS, and writes the resulting uncompressed graphics to the object buffer 35.

The object buffer 35 is a buffer for storing a plurality of graphics objects (indicated by boxes in FIG. 14) obtained by the decoding by the stream graphics processor 34. Each rectangular area occupied by one of graphics objects in the Object Buffer 35 is identified by an object_id. Consequently, if a request is made to permit a graphics object that has a same object_id as a particular graphics object that already exists in the Object Buffer 35, the area occupied by the particular graphics object in the object buffer 35 will overwritten with graphics object that has the same object_id.

The composition buffer 36 is a buffer for storing a conveyed interactive_composition structure corresponding to one or more ICSs. The composition buffer 36 provides the stored interactive_composition structure to the Graphics controller 37 for decoding.

The graphics controller 37 judges, each time the current playback position reaches a new Display Set, which of an Epoch Start, and Acquisition Point and a Normal Case the composition_state field of the ICS in the Display Set is. If the composition_state field is an Epoch Start, the graphics controller 37 transfers the new interactive_composition structure in the coded data buffer 33 from the coded data buffer 33 to the composition buffer 36.

Each time an ICS in an Acquisition Point type Display Set is read by the coded data buffer 33, the graphics controller 37 compares the page_version_number field in each page information belonging to the ICS with the page_version_number field of each page information in the interactive_composition structure already stored in the composition buffer 36. If page information with a higher page_version_number field value exists in the coded data buffer 33, that page information is transferred from the coded data buffer 33 to the composition buffer 36, thereby updating the desired page information in the composition buffer 36. The graphics controller 37 judges whether or not a page corresponding to the page information updated in this way is currently being presented, and if so, re-renders the corresponding page. In FIG. 14, ⊚1, 2, 3 and 4 illustrate referencing the page_version_number field in the interactive_composition structure read to the coded data buffer 33 (⊚ 1), transferring page information that has a higher page_version_number field value (⊚2), referencing updated page information (⊚3), and re-rendering based on the updated page information (⊚4). Arrows bg1, bg2, bg3 and bg4 in FIG. 14 further symbolize re-rendering by the graphics controller 37. This rendering causes a page on which buttons O-A to O-D are arranged to appear in the interactive graphics plane 10 and be composited with a moving picture.

Figure 15:
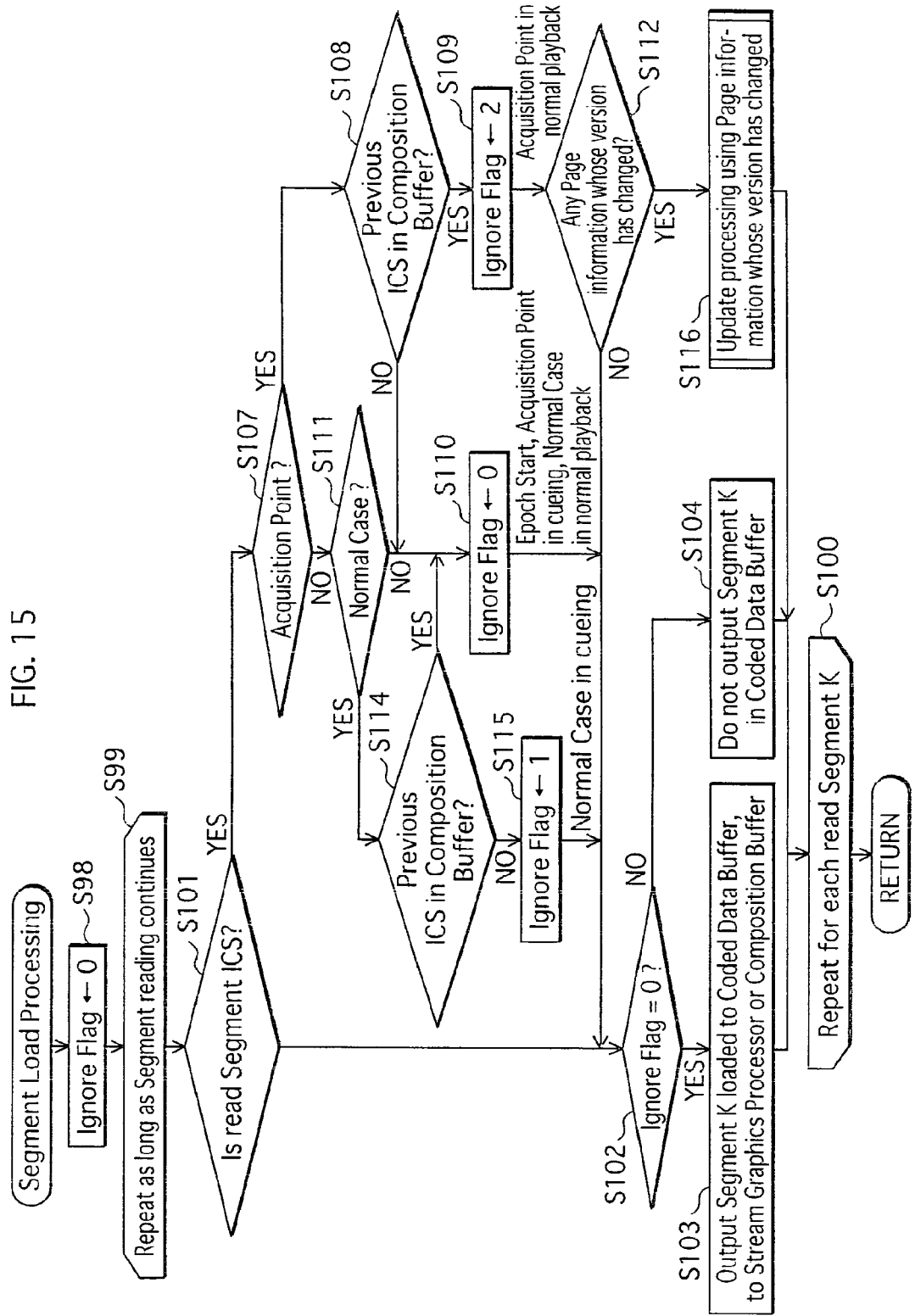
FIG. 15 is a flowchart showing the procedure for function segment load processing.

FIG. 15 is a flowchart showing a procedure for load processing of a functional segment. In this flowchart, SegmentK is a variable expressing each of segments (ICS, PDS, ODS) read when playing an AVClip, and an ignore flag is a flag for switching between whether to ignore or load this SegmentK. The flowchart has a step for initializing the ignore flag to "0" (step S98), which is followed by a loop structure (step S99, step S100) for repeating the processing of steps S101 to S116 for all segments.

The processing in step S101 to step S116 having the loop structure repeats the following as long as reading of functional segments continues: judging whether the ignore flag is set to "1" or not (step S102), if the ignore flag is set to "1", transferring the target functional segment from the coded data buffer 33 to either the composition buffer 36 or the stream graphics processor 34 (step S103), and if the ignore flag is set to "0", deleting the target functional segment from the coded data buffer 33 without transferring (step S104).

The value of the ignore flag is used as a reference to determine whether or not to ignore or load SegmentK. Steps S107 to S111, S114 and S115 are processing for setting the ignore flag.

In step S107, a judgment is made as to whether or not the composition_state field in the ICS is an Acquisition Point. If SegmentK is in an Acquisition Point DS, the processing moves to step S108, and if SegmentK is in an Epoch Start DS or a Normal Case DS, the processing moves to step S111.

In step S108, a judgment is made as to whether or not a previous ICS exists in the composition buffer 36, if the result of step S107 is "Yes". If an ICS does not exist in the composition buffer 36, this means that cueing is being performed. In this case, display must start from a DS that is an Acquisition Point, and therefore the processing moves to step S110 ("No" in step S108).

If a previous ICS exists in the composition buffer 36 ("Yes" in step S108), the ignore flag is set to "2" (step S112), and the processing moves to step S112.

In step S112 a judgment is made as to whether or not page information that has an increased page_version_number field value exists in the ICS newly read to the coded data buffer 33 (the ICS belonging to the new functional segment).

If such page information exists ("Yes" in step S112), from the new ICS in the coded data buffer 33, only the page information having the increased page_version_number field value is transferred to the composition buffer 36, and page information other than this is ignored (step S116).

If page information having an increased page_version_number field value does not exist, the processing moves to step S102. This means that the ICS showing the Acquisition Point DS is ignored (step S104).

In step S111, a judgment is made as to whether or not the composition_state field in the ICS indicates a Normal Case. If SegmentK is in a Normal Case, the processing moves to step S114. In step S114, a judgment is made as to whether or not a previous ICS exists in the composition buffer 36. If such an ICS exists, the processing moves to step S110, and the ignore flag is set to "0". If such an ICS does not exist, the ignore flag is set to "1" because sufficient functional segments to compose an interactive screen were not able to be obtained (step S115). With such a setting, functional segments composing a Normal Case DS are ignored if a previous DS does not exist in the graphics decoder 12.

When the target functional segment belongs to (i) an Epoch Start DS, (ii) an Acquisition Point DS in cueing, or (iii) a Normal Case DS in ordinary playback, step S111 is "No", step S108 is "No" and step S114 is "Yes", and the ignore flag is set to "0" (step S110). Accordingly, when the target functional segment belongs to (i) an Epoch Start DS, (ii) an Acquisition Point DS in cueing, or (iii) a Normal Case DS in ordinary playback, the functional segments belonging to the Display Set are transferred to either the stream graphics processor 34 or the composition buffer 36.

Figure 16:
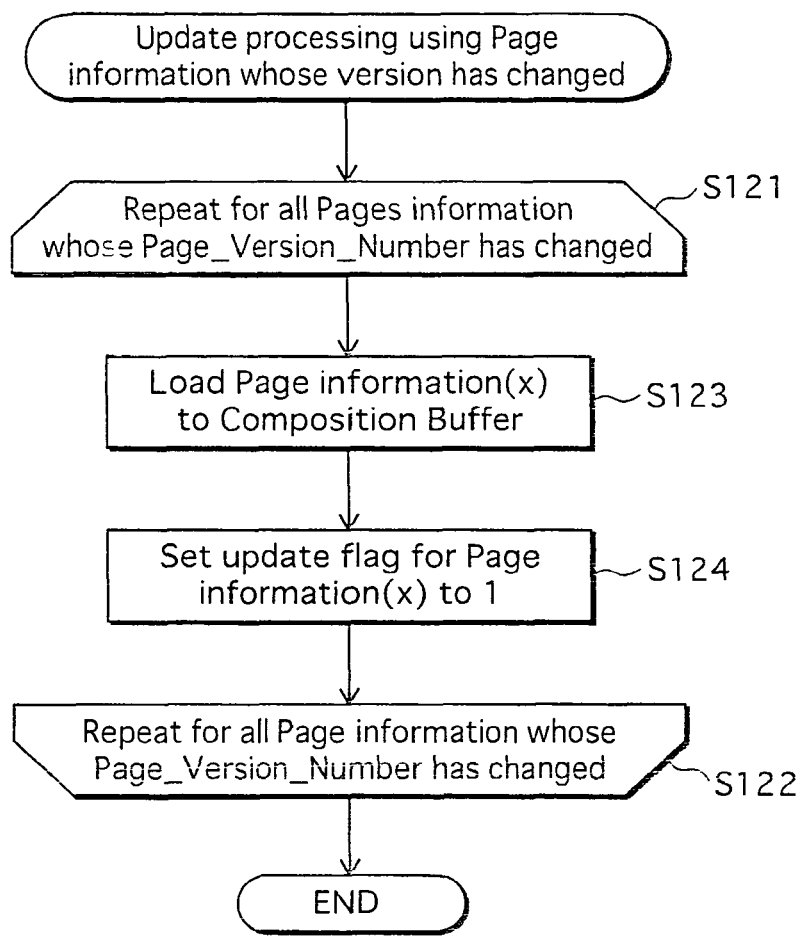
FIG. 16 is a flowchart showing the procedure for update processing using page information whose page_version_number has changed.

FIG. 16 is a flowchart showing a procedure for update processing using page information whose page_version_number field has changed. The flowchart has a loop structure (step S121, step S122) for repeating a procedure in step S123 to step S124 with respect to each page information whose page_version_number field has changed. Supposing that page information (x) is each page information that is a target of loop processing, the loop processing first loads the target page information from the coded data buffer 33 to the composition buffer 36 (step S123), and then sets an update flag to "1" to show that the page information has been updated, (step S124). Note that use of this update flag is described in the second embodiment.

Figure 17:
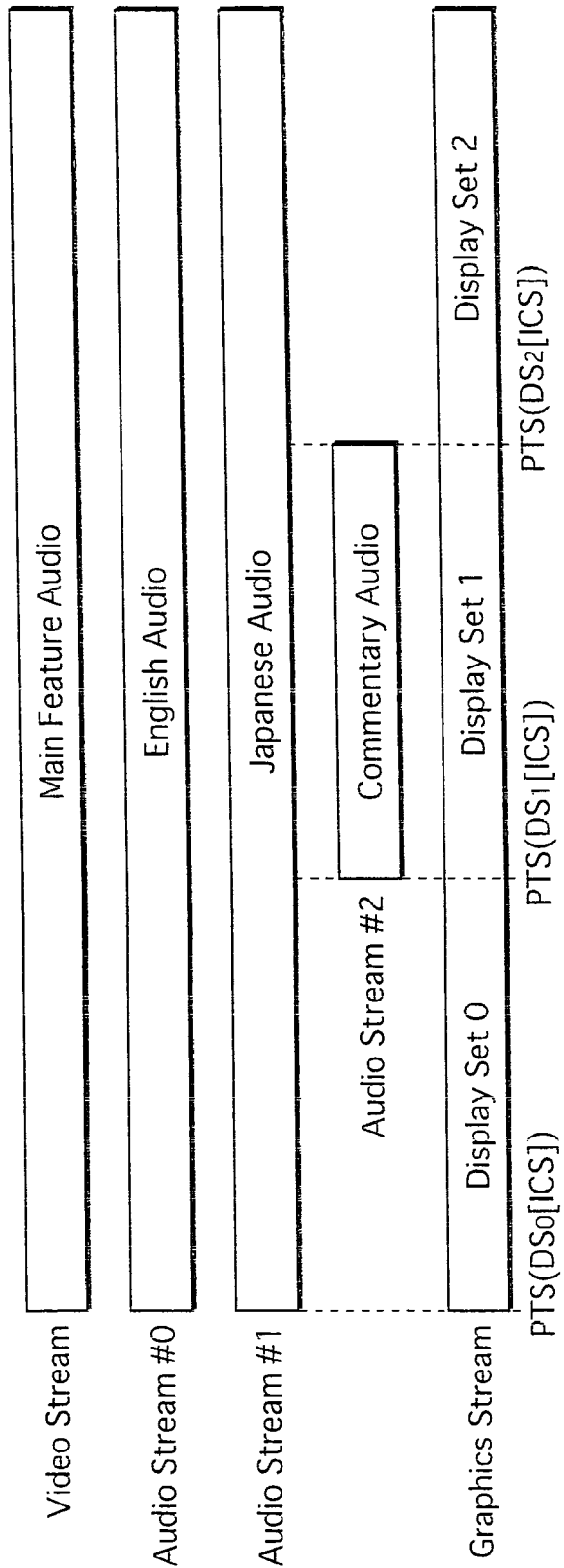
FIG. 17 shows the internal structure of an AVClip that is a target of the present specific example.

The following describes the control shown in FIG. 15 and FIG. 16 with use of a specific example. FIG. 17 shows the internal structure of an AVClip used in the present specific example. The AVClip used in the present specific example is composed of a "video stream" that is a main feature video, an "audio stream#0" that expresses English audio, an "audio stream#1" that expresses Japanese audio, an "audio stream#2" that shows commentary audio, and a "graphics stream".

The Japanese audio and the English audio exist throughout the entire movie work, while the commentary audio exists in only part of the movie work. The graphics stream is composed of three Display Sets (DS0, DS1, DS2). DS0 corresponds to the period from the start of the movie work up to when the commentary audio starts, DS1 corresponds to the period for which the commentary audio is available, and DS2 corresponds to the period from when the commentary audio ends to the end of the movie work.

With DS1 and DS2 having the described correspondences, the PTS (DS1[ICS]) in an ICS in DS1 is set to show the starting point of the period for which the audio commentary is available, and the PTS(DS2[ICS]) in an ICS in DS2 is set to show the ending point of the period for which the audio commentary is available.

Figure 18:
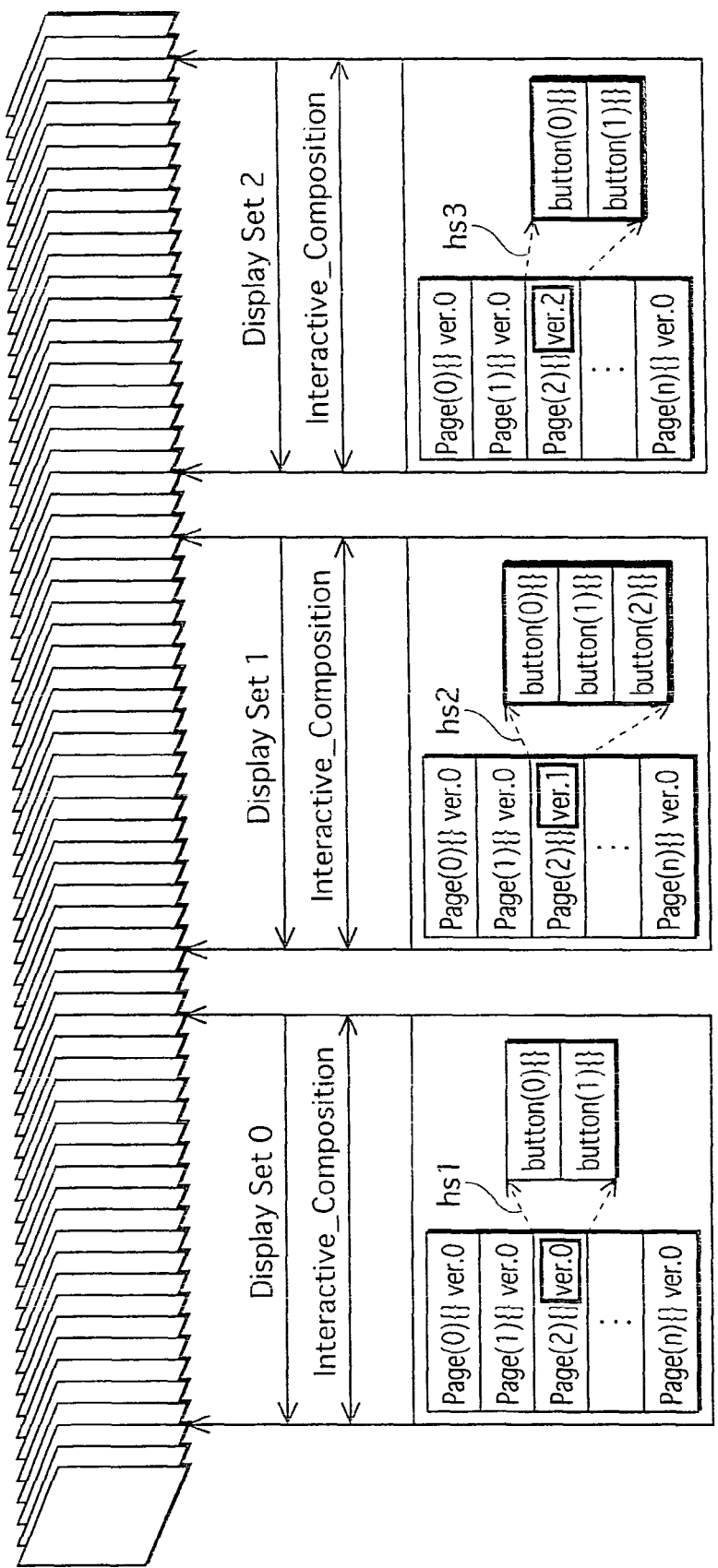
FIG. 18 shows the internal structure of an AVClip shown with the same notation as FIG. 11.

Next, a description is given of reading page information when the page_version_number field value of page information(2) belonging to each of three Display Sets are respectively different. FIG. 18 shows the internal structure of an AVClip using the same notation as FIG. 11. As shown in FIG. 18, each of the three Display Sets (DS0, DS1, DS2) has n pieces of page information. Broken lines hs1, hs2 and hs3 in FIG. 18 show close-ups of the contents of the page information. As shown by the broken lines, the page information in each of DS0 and DS2 includes two pieces of button information, while DS1 has an additional piece of button information. Since the contents of the page information differs, the page_version_number field is each of DS0, DS1 and DS2 is set to version 0, version 1, and version 2, respectively.

Figure 19:
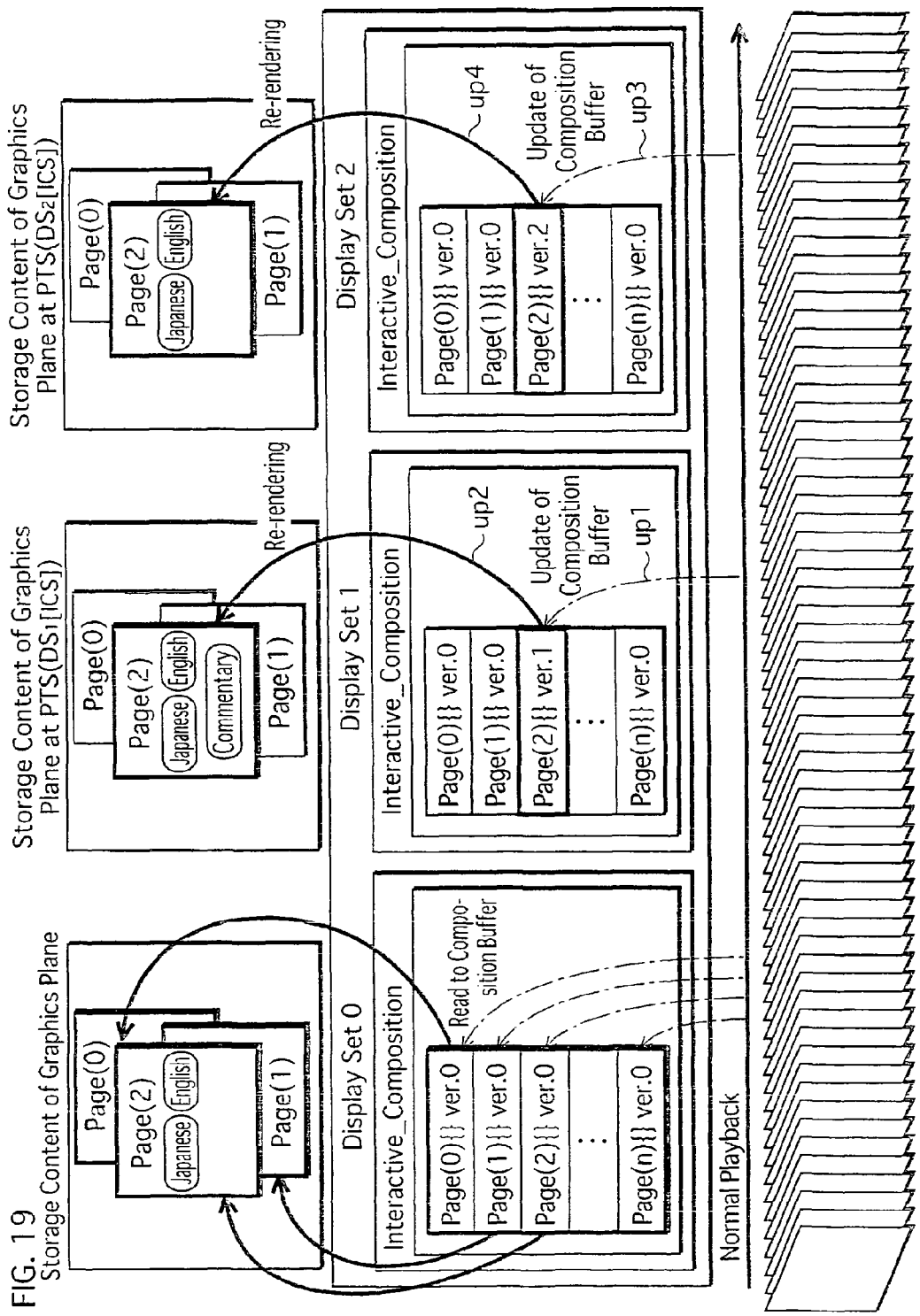
FIG. 19 shows schematically page rendition in normal playback.

FIG. 19 illustrates page rendition in normal playback. In DS0, since the page information(0), the page information(1) and the page information(2) are loaded to the composition buffer 36, a menu composed of the page information(0), the page information(1) and the page information(2) can be rendered. On the other hand, when DS1 is reached, the playback apparatus is able to recognize that the contents of the page information(2) have changed by referring to the page_version_number of the page information. Accordingly, the playback apparatus transfers only the page information(2) from the coded data buffer 33 to the composition data buffer 36, and using this to re-render, updates the storage contents of the graphics plane. Arrows up1 and up2 illustrate updating when DS1 is reached, and re-rendering. According to this updating, the contents of the page information(2) stored in the composition buffer 36 change from including two pieces of button information to including three pieces of button information. When re-rendering of the graphics plane is performed based on the storage contents of the composition buffer 36, the buttons on the page corresponding to the page information (2) will change from being two in number to being three.

Arrows up3 and up4 in FIG. 19 illustrate updating when DS2 is reached, and re-rendering. According to this updating, the contents of the page information(2) stored in the composition buffer 36 change from including three pieces of button information to including two pieces of button information. When re-rendering of the graphics plane is performed based on the storage contents of the composition buffer 36, the buttons on the page corresponding to the page information (2) will change from being three in number to being two.

Figure 20:
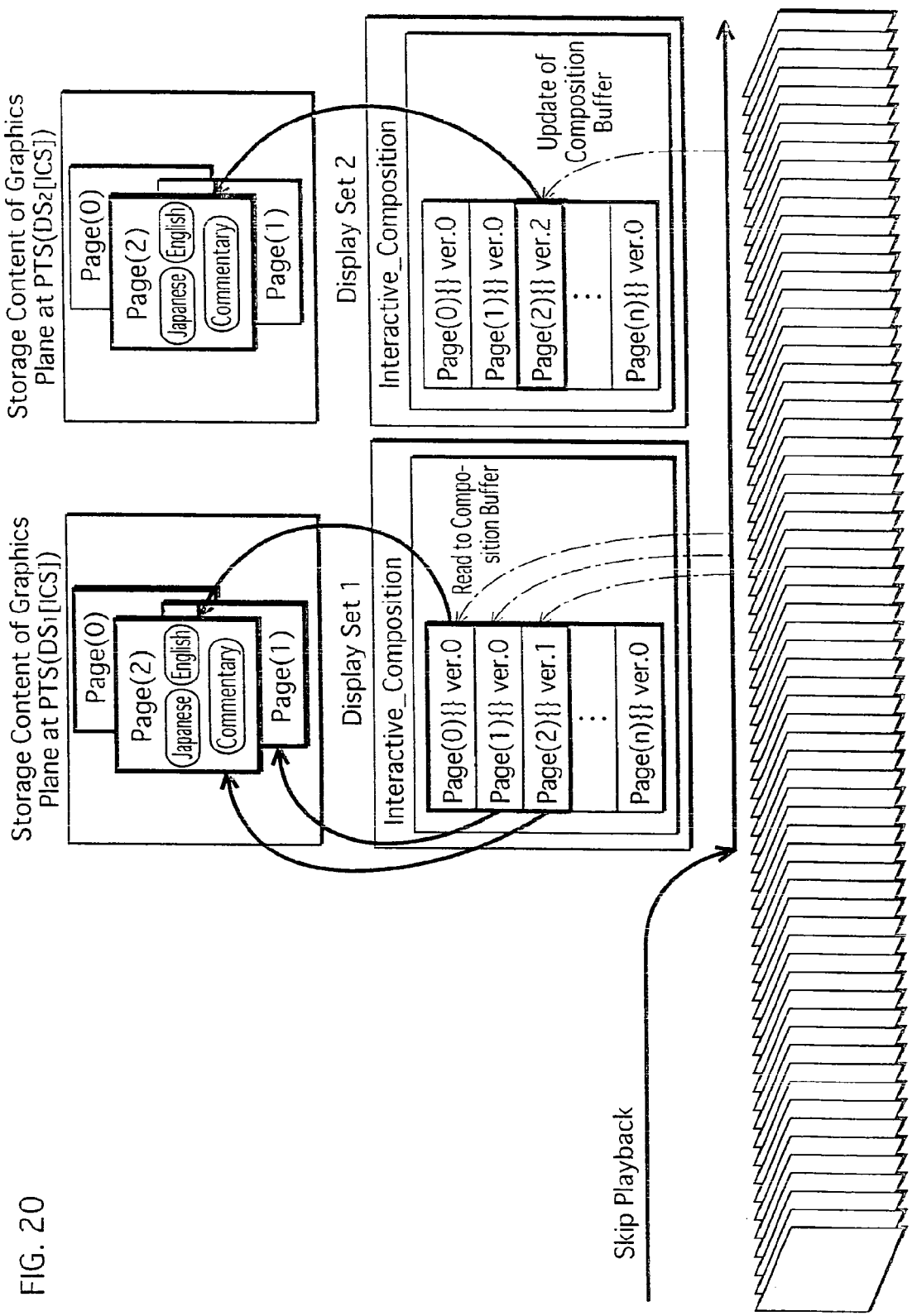
FIG. 20 shows rendition processing in skip playback.
Figure 21:
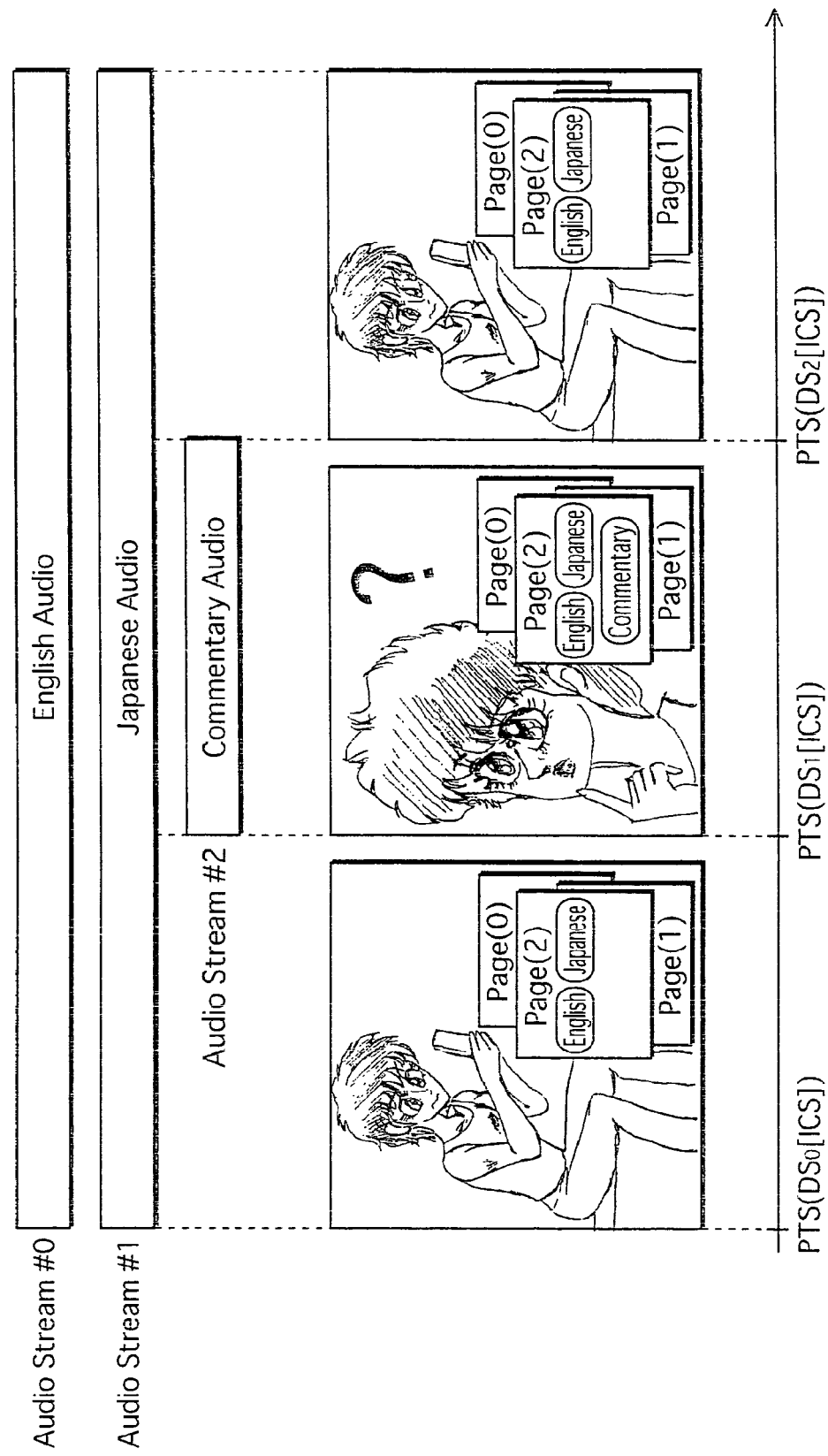
FIG. 21 shows what kind of composite image is obtained according to the rendition shown in FIG. 20.

FIG. 20 shows rendition processing in skip playback. If the position skipped to is just before DS1, the pages are rendered based on the page information(0) to the page information(2) of the interactive_composition structure belonging to DS1. When the current playback position reaches DS2 after the skip, the playback apparatus performs processing to re-render the page(2) because the page_version_number field has changed. Accordingly, of the three pages being displayed, the page(2) is re-rendered. FIG. 21 shows what kind of composite image is obtained according to the rendering shown in FIG. 20. As shown in FIG. 21, when the current playback position reaches PTS(DS0[ICS]), the page(2) composed of two buttons is composited with a moving picture, and a resultant screen is presented. As playback of the moving picture proceeds and the current playback position reaches PTS (DS1 [ICS]), the page(2) composed of three buttons is composited with a moving picture, and a resultant screen is presented. As playback of the moving picture proceeds and the current playback position reaches PTS(DS2[ICS]), the numbers of buttons returns to being two.

In the present specific example, settings of the page_version_number field were changed in a scene in which commentary audio is available. However, such settings are only one example, and the described updating of each page has wide-ranging applications. For instance, screen rendition may be performed such that the number of buttons on a same page gradually decreases as playback of the moving picture proceeds, to narrow the range of selection. This kind of thrilling rendition may be applied to a game.

A button for purchasing a particular product may displayed while the product appears in the moving picture. This application is of particular value in creating commercial movie works for commercial purposes such as online shopping.

Figure 22:
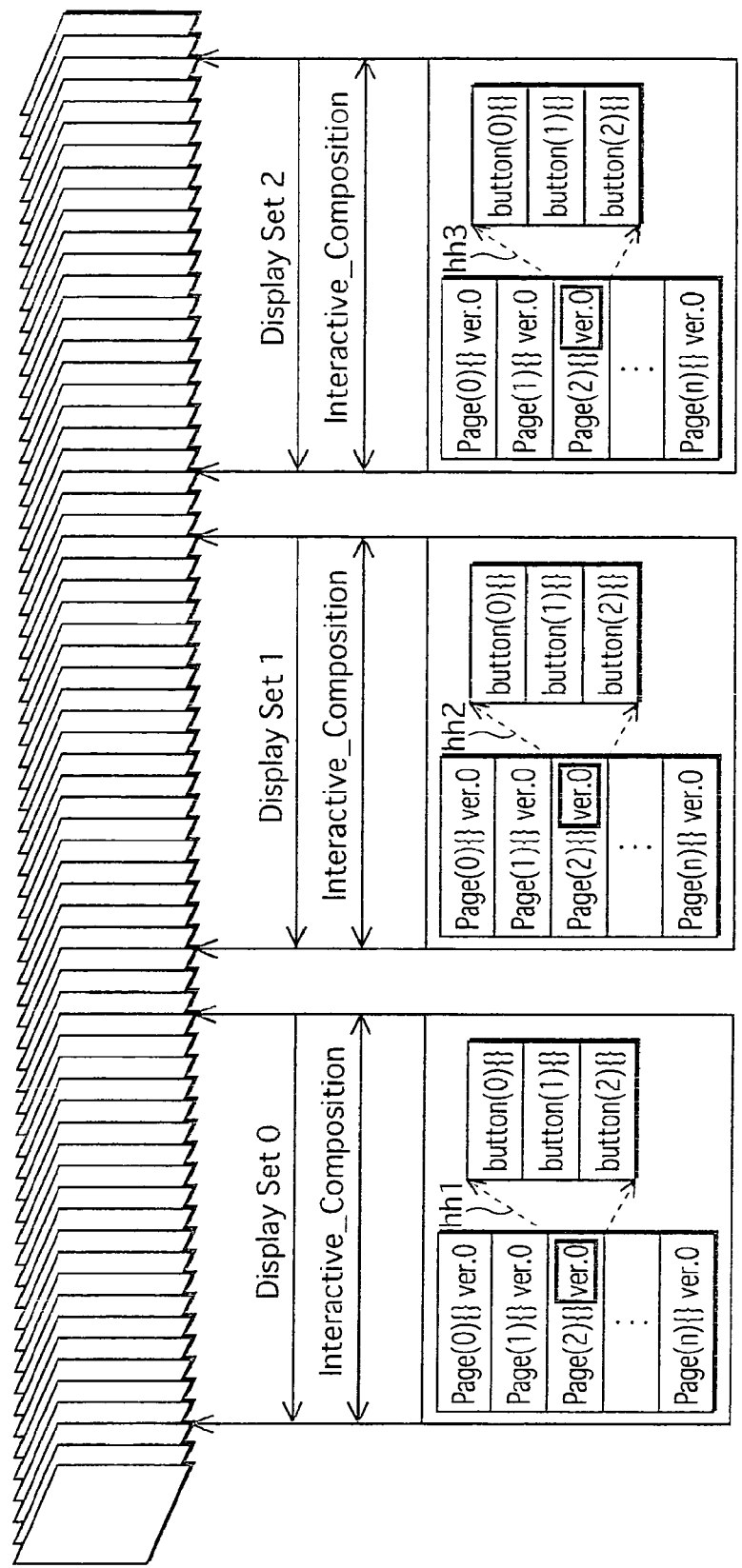
FIG. 22 shows page information(2) in three consecutive Display Sets (DS1, DS2, DS3)

Next a description is given of when the page_version_number field of the page information(2) is the same in each of the three Display Sets (DS0, DS1, DS2). This specific example uses the page information(2) of three consecutive Display Sets (DS1, DS2, DS3) as shown in FIG. 22. Broken-line arrows hh1, hh2 and hh3 show close-ups of the contents of the page information(2) in each of the three Display Sets. As shown by these broken lines, the page information(2) in each of the three Display Sets has three pieces of button information (button_information (0), (1), (2)).

Figure 23:
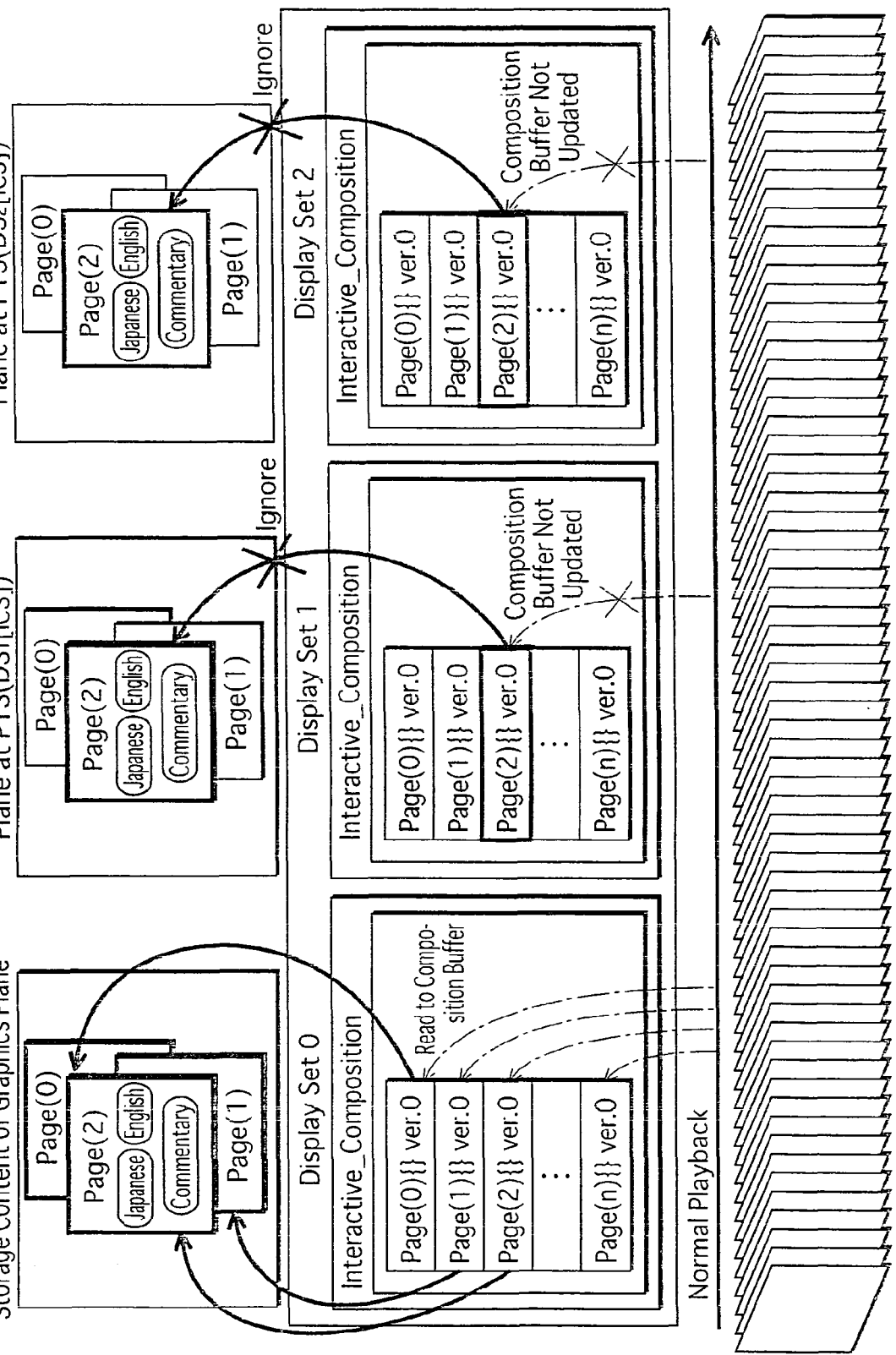
FIG. 23 shows temporal change in the storage contents of a graphics plane that accompanies progression of playback of an AVClip.

FIG. 23 shows temporal transition of the storage content of the graphics plane as AVClip playback progresses. The AVClip that includes the three Display Sets is read by the playback apparatus, and played. Of the three Display Sets, DS0 is located at the start of the AVClip, and therefore the page is rendered based on the page information(2) of DS0. Arrows in FIG. 23 schematically shows rendition by the playback apparatus based on the page information(1), the page information(2) and the page information(3).

Figure 24:
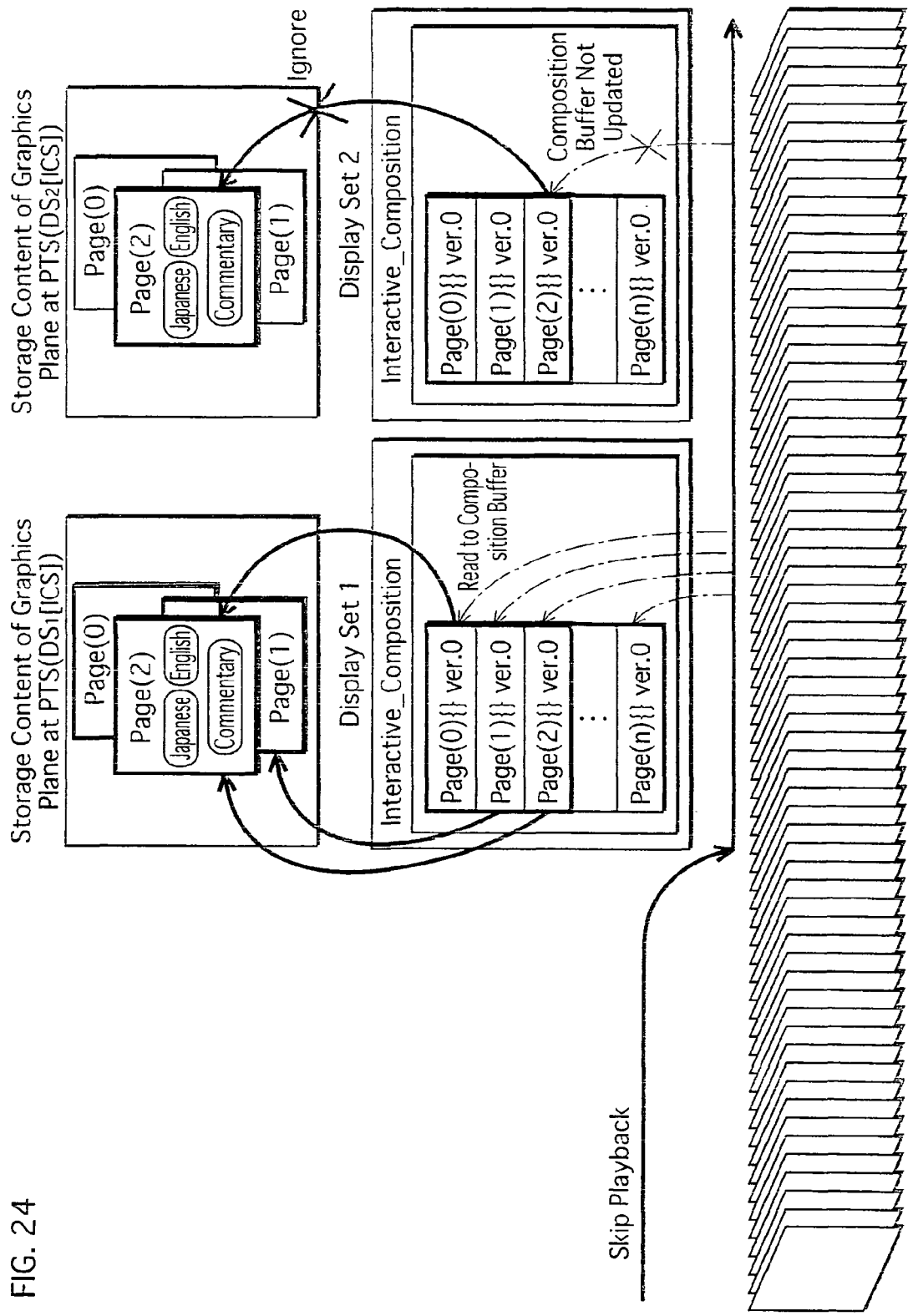
FIG. 24 shows how graphics are rendered when a skip is performed to the AVClip shown in FIG. 22.

When DS1 and DS2 are subsequently read, re-rendition is not performed using the page information in DS1 and DS2 because the value of the page_version_number field in the page information(2) therein is the same as the value of the page_version_number in the page information(2) in the Display Set. The arrows with crosses (X) indicate that the graphics controller 37 ignores the page information(2) in these two Display Sets. FIG. 24 shows how graphics rendition is performed when a skip is made to the AVClip shown in FIG. 22. The destination of the skip in FIG. 24 is just before DS1, and therefore page rendition is performed based on the page information(0) and the page information(1) in DS1. Rendition processing by the playback apparatus when each page_version_number field is the same is as has been described.

As has been described, according to the present embodiment, the contents of a Multi-Page Menu can be changed without replacing the entire interactive_composition structure stored in the composition buffer, but by changing only a specific page or pages in the interactive_composition structure in the composition buffer. Since it is unnecessary to completely replace the interactive_composition structure, the state of the interactive_composition structure pre- and post-replacement can be treated as one Epoch. As a result, unnecessary interruptions in playback can be avoided, and consequently changes can be made in a Multi-Page Menu without interrupting presentation.

Second Embodiment

The second embodiment discloses the page information of the first embodiment in further detail.

First a description of the button information is given. The buttons presented on a page can be in any of three states: a normal state, a selected state, and an actioned state. The normal state is simply a state of being presented. In contrast, the selected state is a state of being focused on as a result of a user operation, but selection of the button not having been confirmed. The actioned state is a state of the selection having been confirmed. Given that each button has these three states, the following elements of information are provided in button information (button information(i)) that specifies an arbitrary button in the page information(y). FIG. 25 shows the internal structure of button information(i) in the page information(y).

A "button_id" field shows a value that uniquely identifies button(i) in the interactive_composition structure.

A "button_numeric_select_value" field shows a flag indicating whether or not numeric selection of button(i) is permitted.

An "auto_action_flag" field shows whether the button(i) should be automatically put into the actioned state. If the auto_action_flag field is set to ON (bit value of "1"), button(i) is put not into the selected state but into the actioned state when selected. If the auto_action_flag field is set to OFF (bit value of "0"), the button(i) is simply put into the selected state when selected.

A "button_horizontal_position" field and a "button_vertical_position" field respectively specify the horizontal and vertical positions of the top left pixel of button(i) on an interactive screen.

A "neighbor_info" structure shows which buttons are to receive the selected state in response to user operations made to move a focus in an up, down, right, and left direction when the button(i) is in the selected state. The neighbor_info structure is composed of "upper_button_id_ref", "lower_button_id_ref", "left_button_id_ref" field, and "right_button_id_ref" fields.

The upper_button_id_ref field shows the number of the button to receive the selected state in place of the button(i) if a key instructing a focus move in an upward direction (MOVEUP key) is pressed when the button(i) is in the selected state. The press of the MOVEUP key is ignored if the number of button(i) is set in this field. The lower_button_id_ref field, left_button_id_ref field and right_button_id_ref field show the number of the button to receive the selected state in place of the button(i) if a key instructing a focus move in a downward direction (MOVE Down key), a key instructing a focus move in a leftward direction (MOVE Left key), or a key instructing a focus move in a rightward direction (MOVE Right key), respectively, is pressed when button(i) is in the selected state. The press of the key is ignored if the number of button(i) is set in the field.

A "normal_state_info" structure defines the normal state of button(i), and is composed of "normal_start_object_id_ref", "normal_end_object_id_ref", and "normal_repeat_flag" fields.

The normal_start_object_id_ref field has written therein the first of serial numbers assigned to the sequence of ODSs used to present the normal state of the button(i) in animation.

The normal_end_object_id_ref field specifies the last one of serial numbers assigned to the sequence of ODSs used to present the normal state of button(i) in animation. If the normal_end_object_id_ref field specifies the same ID value as that of the normal_start_object_id_ref, the static image of a graphics object identified by that ID is presented as the button(i).

The normal_repeat_flag field specifies whether the animation of the button(i) in the normal state is to be continuously repeated.

A "selected_state_info" structure defines the selected state of the button(i). The selected_state_info structure is composed of "selected_state_sound_id_ref", "selected_start_object_id_ref", "selected_end_object_id_ref", and "selected_repeat_flag" fields.

The selected_state_sound_id_ref field specifies sound data to be reproduced as a click sound when the button(i) is put to the selected state. The sound data is specified by the sound_id of a piece of sound data contained in the file called sound.bdmv. When this field is set to "0xFF", no sound data is associated with the selected state of the button(i) and thus no click sound is reproduced when the button(i) is changed to the selected state.

The selected_start_object_id_ref field specifies the first one of the serial numbers assigned to a sequence of ODSs used to present the selected state of the button(i) in animation.

The selected_end_object_id_ref field specifies the last one of serial numbers assigned to the sequence of ODSs used to present the selected state of button(i) in animation. If the selected_end_object_id_ref field specifies the same ID value as that of the selected_start_object_id_ref, the static image of a graphics object identified by the ID is presented as the button(i).

The selected_repeat_flag field specifies whether the animation of the button(i) in the selected state is to be continuously repeated. If the selected_start_object_id_ref and selected_end_object_id_ref fields have the same value, the selected_repeat_flag field is set to the value of "00".

The activated_state_info structure defines the actioned state of the button(i), and is composed of the activated_state_sound_id_ref, activated_start_object_id_ref, and activated_end_object_id_ref fields.

The activated_state_sound_id_ref field specifies sound data to be reproduced as a click sound when the button(i) is put to the actioned state. The sound data is specified by the sound_id of a piece of sound data contained in the sound.bdmv file. When this field is set to "0xFF", no sound data is associated with the actioned state of the button(i) and thus no click sound is reproduced when the button(i) is changed to the actioned state.

The activated_start_object_id_ref field specifies the first one of the serial numbers assigned to a sequence of ODSs used to present the actioned state of the button(i) in animation.

The activated_end_object_id_ref field specifies the last one of serial numbers assigned to the sequence of ODSs used to present the actioned state of the button(i) in animation.

A "navigation_command" structure shows a navigation command to be executed when the button(i) is in the actioned state. A representative example of the navigation command is a SetButtonPage command. The SetButtonPage command instructs the playback apparatus to display a desired page of the Multi-Page menu with a desired one of buttons on the page in the selected state. With the use of such navigation commands, content creators can readily describe page transitions at the time of authoring.

Patent Documents 1 and 2 referred to above teach updating of a flag when a navigation command in the button information is updated. The role of the flag in the present invention is carried out by the page_version_number in the page information. In other words, when the navigation command for a button in a page changes, the page_version_number in the page information to which the button information of the button belongs is incremented.

Figure 27:
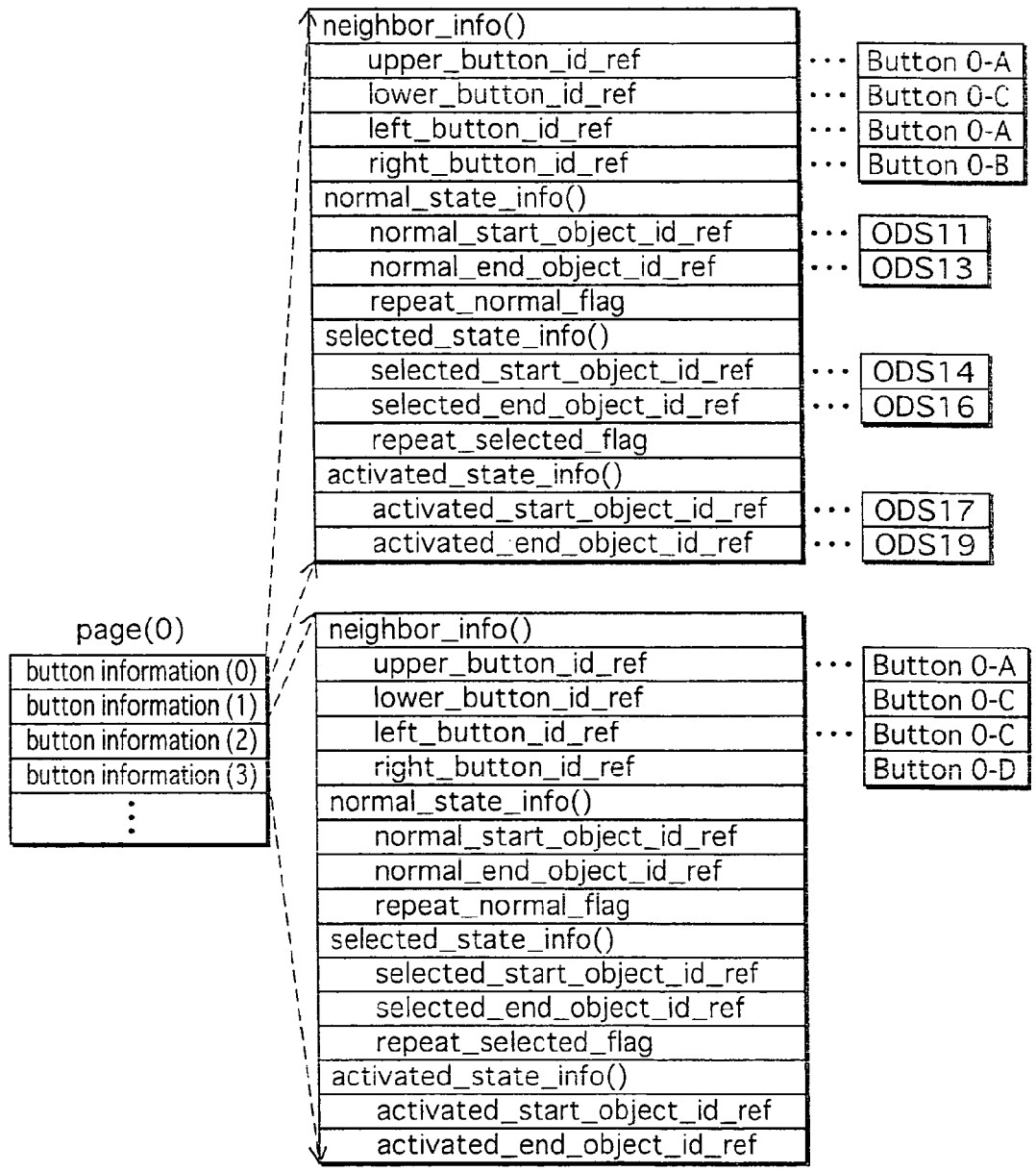
FIG. 27 shows an example of the button_info description defining the button state transition shown in FIG. 26.

This completes the description of the button information. FIG. 27 shows a specific example of how button information is written in the case of the state transition of buttons O-A to O-D shown in FIG. 26. Arrows hh1 and hh2 in FIG. 26 represent a state transition defined by according to the neighbor_info( ) structure of button info(1). In the button info(1), the lower_button_id_ref field is set to the value specifying the button O-C. Thus, if a user operation is made to the Move Down key (FIG. 26, up1) while the button O-A is in the selected state, the button O-C receives the selected state (sj1). The right_button_id_ref field in the button info(1) is set to the value specifying the button O-B. Thus, if a user operation is made to the Move Right key (up2) while the button O-A is in the selected state, the button O-B receives the selected state (sj2).

An arrow hh3 in FIG. 26 represents the button state transition defined by the neighbor_info( ) structure in the button_info(2), which is associated with the button O-C. In the button_info(2), the upper_button_id_ref field is set to the value specifying the button O-A. Thus, if a user operation is made to the Move Up key (up3) while the button O-C is in the selected state, the button O-A is put back into the selected state (sj3). The following describes the graphical images of the buttons O-A, O-B, O-C, and O-D. A DSn provided with the ICS shown in FIG. 27 includes ODSs 11-19 corresponding to the graphical images shown in FIG. 28. The normal_start_object_id_ref and normal_end_object_id_ref fields in the button_info(0) specify the ODSs 11 and 13, respectively. Thus, the normal state of the button O-A is presented in animation using the sequence of the ODSs 11-13. Similarly, the selected_start_object_id_ref and selected_end_object_id_ref fields in the button_info(0) specify the ODSs 14 and 16, respectively. Thus, the selected state of the button O-A is presented in animation using the sequence of the ODSs 14-16. With this setting, when a user operation is made to put the button O-A to the selected state, the graphical image serving as the button O-A is changed from the one presented using the ODSs 11-13 to the one presented using the ODSs 14-16. Here, if the normal_repeat_flag field in the normal_state_info( ) structure is set to the value "1", the animated presentation of the ODSs 11-13 is repeated as indicated by "→(A)" and "→(A)" in FIG. 28. Similarly, if the selected_repeat_flag field in the selected_state_info( ) structure is set to the value "1", the animated presentation of the ODSs 14-16 is repeated as indicated by "→(B)" and "→(B)" in FIG. 28.

A plurality of sets of ODSs that can be presented in animation are associated with the buttons O-A, O-B, O-C, and O-D. Thus, with the ICS referencing the ODSs, such a control is defined that a character image serving as a button changes its facial expression in response to user operations.

With the described button structure, when the number of pieces of button information in one page changes, or when the contents of a graphics object or navigation command used in displaying button animation changes, "1" is added to the value of the page_version_number to indicate that there has been a change.

Figure 29:
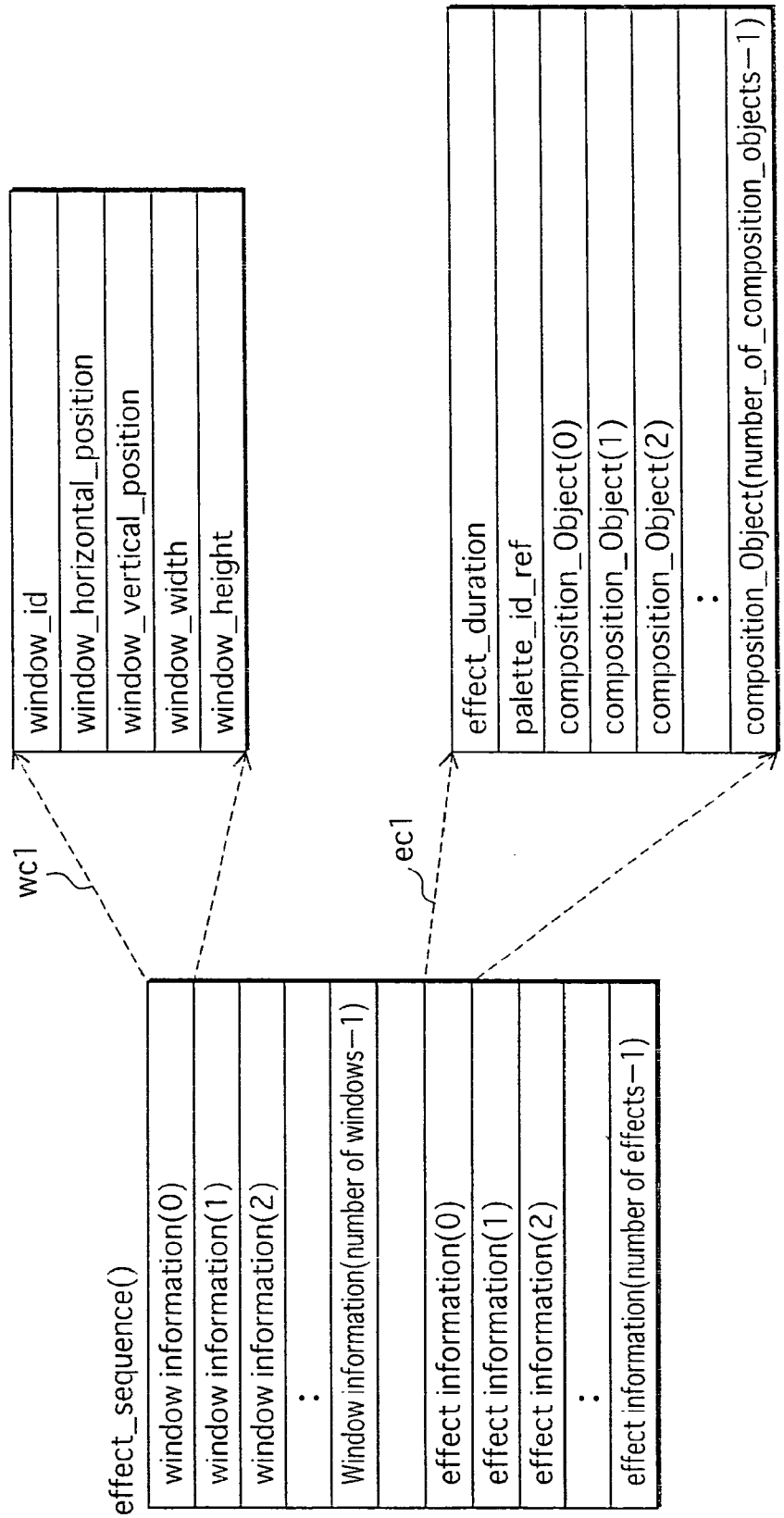
FIG. 29 shows the internal structure of an effect_sequence.

This completes the description of the button_info structure. Next, a description is given of animation effects. The in_effects field and the out_effects field each specify an effect_sequence structure. FIG. 29 is a view showing an effect_sequence structure. As shown in the left half of the figure, the effect_sequence structure is composed of: window_info(0), (1), (2) . . . (number_of_windows−1) equivalent in number to the number_of_windows; and the effect_info(0), (1), (2) . . . (number_of_effects−1) equal in number to the number_of_effects.

The animation effect is presented by updating display compositions at fixed intervals. Each effect_info structure is a piece of information defining one display composition. Arrows ec1 indicate that the internal structure of effect_info is excerpted to be shown in detail. As shown in FIG. 29, the effect_info structure is composed of: the effect_duration field showing the above-mentioned fixed interval, i.e. a time period for which the associated display composition is to be presented; the pallet_id_ref field specifying a pallet used for the associated display composition; and the composition_object (0), (1), (2) . . . (number_of_composition_object−1) specifying the details of the display composition.

Each window_info structure defines a window or an area on the graphics plane within which the display compositions are rendered. As indicated by arrows wc1, the window_info is excerpted to be shown in detail. As shown in the figure, the window_info is composed of the following fields: "window_id" uniquely identifying a widow on the graphics plane; "window_horizontal_position" specifying the horizontal position of the top left pixel of the window; "window_vertical_position" specifying the vertical position of the top left pixel of the window; "window_width" specifying the width of the window; and "window_height" specifying the height of the window.

Now, a description is given of values that may be set in each of the window_horizontal_position, window_vertical_position, window_width, and window_height fields. These fields are set to the value corresponding to the coordinates within the two-dimensional graphics plane having the height and width defined by the video_height and video_width fields.

Since the window_horizontal_position field shows the horizontal address of the pixel on the graphics plane, this field takes on a value from "1" to the video_width value. Similarly, since the window_vertical_position shows the vertical address of the pixel on the graphics plane, this field takes on a value from "1" to the video_height value.

Since the window_width field shows the width of a window on the graphics plane, this field takes on a value from "1" to the value calculated by subtracting the window_horizontal_position value from the video_width value. Similarly, since the window_height field shows the height of window on the graphics plane, this field takes on a value from "1" to the value calculated by subtracting the window_vertical_position value from the video height value.

As above, the window_info is provided with window_horizontal_position, window_vertical_position, window_width, window_height fields defining the size and position of a window on the graphics plane.

Figure 30:
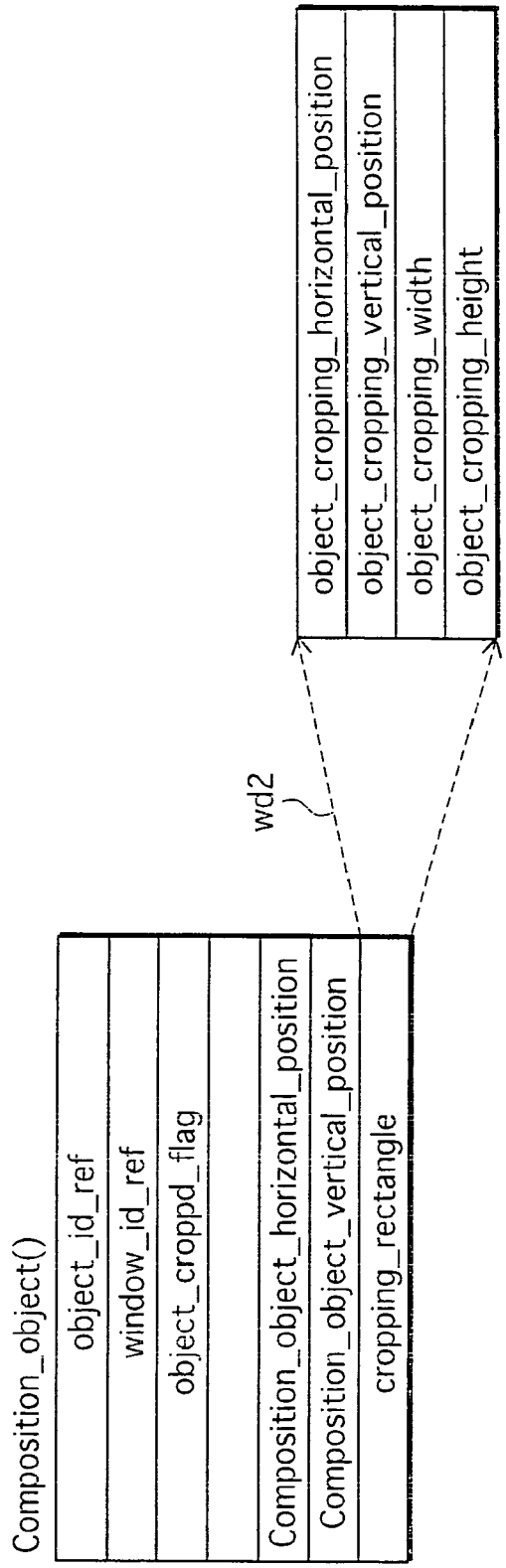
FIG. 30 shows the internal structure of an arbitrary composition_object(i) in detail.

The following describes the Composition_Object. FIG. 30 is a closeup of the internal structure of an arbitrary composition_object(i). As shown in FIG. 30, the composition_object (i) is composed of the following fields: "object_id_ref"; "window_id_ref", "object_cropped_flag"; "composition_object_horizontal_position"; "composition_object_vertical_position", and "cropping_rectangle".

The object_id_ref field shows a reference value for a graphics object identifier (object_id). The reference value corresponds to the object_id identifying the graphics object that is used for generating a display composition according to the composition_object(i).

The window_id_ref field shows a reference value for a window identifier (window_id). The reference value corresponds to the window_id identifying the window in which the display composition according to the composition_object(i) is rendered.

The object_cropped_flag field shows a flag indicating whether the graphics object cropped on the object buffer is to be presented or not to be presented. When this field is set to "1", the graphics object cropped on the object buffer is presented. On the other hand, when this field is set to "0", the cropped graphics object is not presented.

The composition_object_horizontal_position field shows the horizontal position of the top left pixel of the graphics object on the graphics plane.

The composition_object_vertical_position field shows the vertical position of the top left pixel of the graphics object on the graphics plane.

The cropping_rectangle structure is valid when the object_cropped_flag field is set to "1". In FIG. 30, arrows wd2 indicate that the internal structure of cropping_rectangle is excerpted to be shown in detail. As shown in the figure, the cropping_rectangle structure is composed of the following fields: "object_cropping_horizontal_position"; "object_cropping_vertical_position"; "object_cropping_width"; and "object_cropping_height".

The object_cropping_horizontal_position field shows the horizontal position of the top left corner of the cropping rectangle. The cropping rectangle defines the region of the graphics object to be cropped.

The object_cropping_vertical_position field shows the vertical position of the top left corner of the cropping rectangle.

The object_cropping_width field shows the width of the cropping rectangle.

The object_cropping_height field shows the height of the cropping rectangle.

This completes the description of the structure of composition_object. Next, a description is given of a specific example of the composition_object structure.

Figure 31:
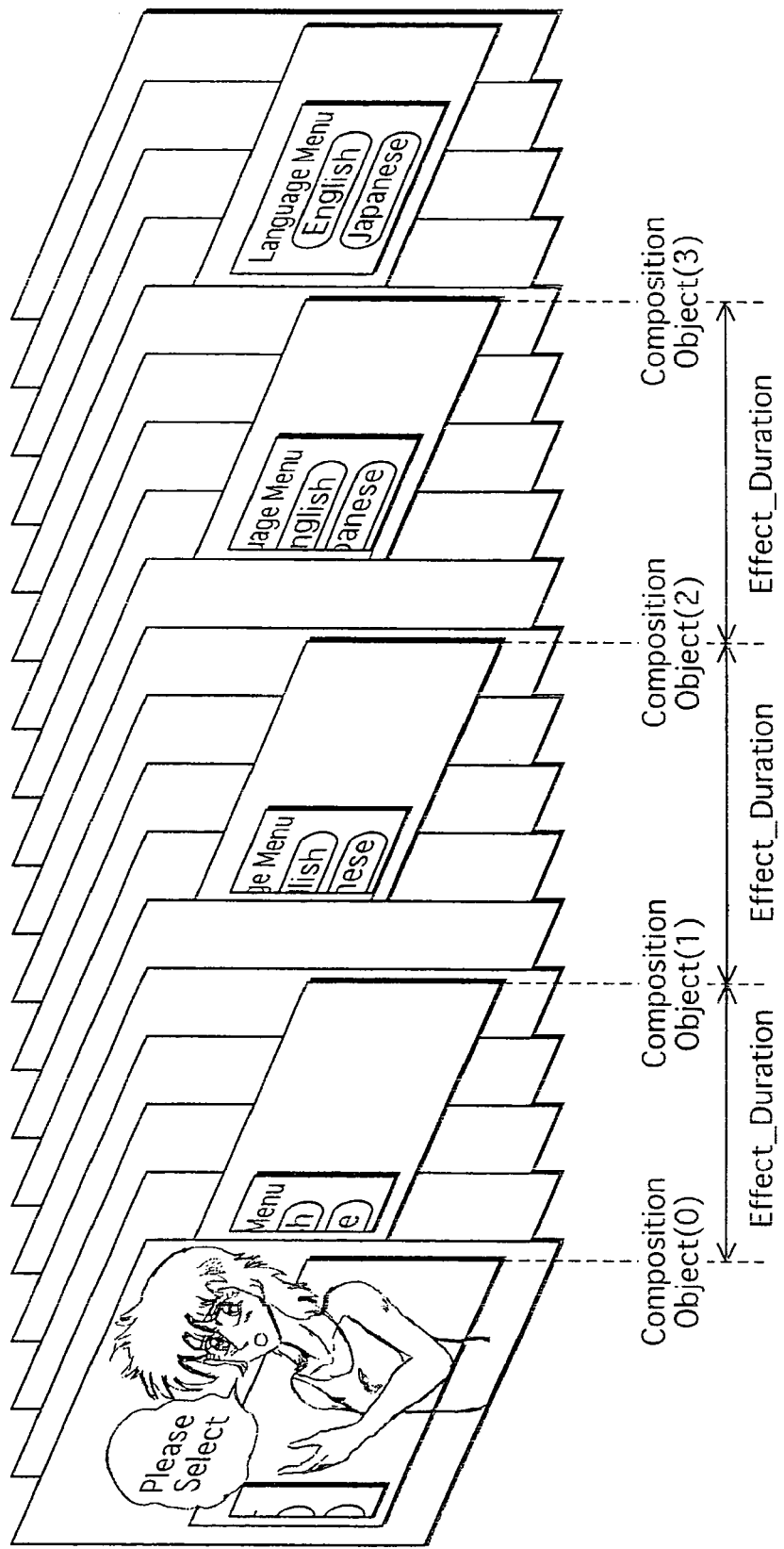
FIG. 31 shows a specific example of an in_effect presenting a Right-Scroll animation effect.

FIG. 31 is a view showing a specific example of an in_effect presenting a Right-Scroll animation effect. The in_effect animation of this example presents an image such that a language selection menu gradually appears from the right edge of the screen. For this in_effect animation, composition_object(0), composition_object(1), composition_object(2), and composition_object(3) are allocated to points t0, t1, t2, and t3, respectively. Furthermore, the ICS and the effect_info structure associated with each of the DSs are defined to include the following window_info structures and composition_object structures.

Figure 32:
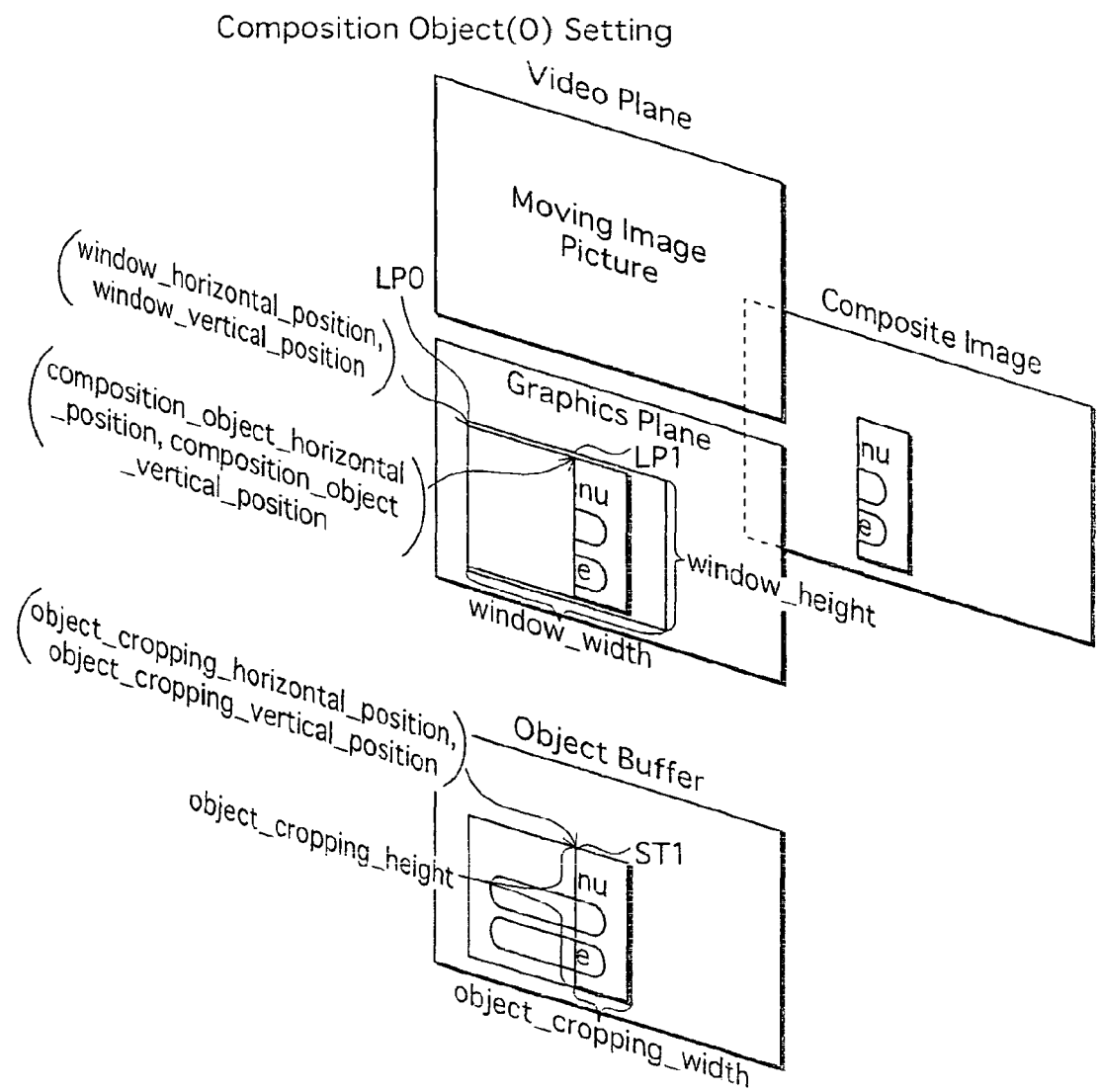
FIG. 32 shows an example of a composition_object(0) structure.

Now, a description is given of the setting of each composition_object structure. FIGS. 32-35 each illustrate an example setting of the composition_object structure. FIG. 32 is a view showing an example of the composition_object(0) structure.

As shown in FIG. 32, the object_cropping_horizontal_position and object_cropping_vertical_position fields specify a reference point ST1 used for determining a region of the graphics object to be cropped.

The reference point ST1 is addressed based on the coordinate system which has an origin at the top left corner of the graphics object on the object buffer. The region having the length and width specified by the object_cropping_width and object_cropping_height fields from the reference point ST1 is determined as the cropping rectangle (solid-line box in the FIG. 32). The cropped part of the graphics object is rendered on the graphics plane at the position having the top left pixel LPO specified by the composition_object_horizontal_position and composition_object_vertical_position fields. In this example, about ¼ of the language selection menu from the right is rendered within the window on the graphics plane. As a result, the right one-quarter of the language selection menu is presented as a composite image overlaid on the video.

Figure 33:
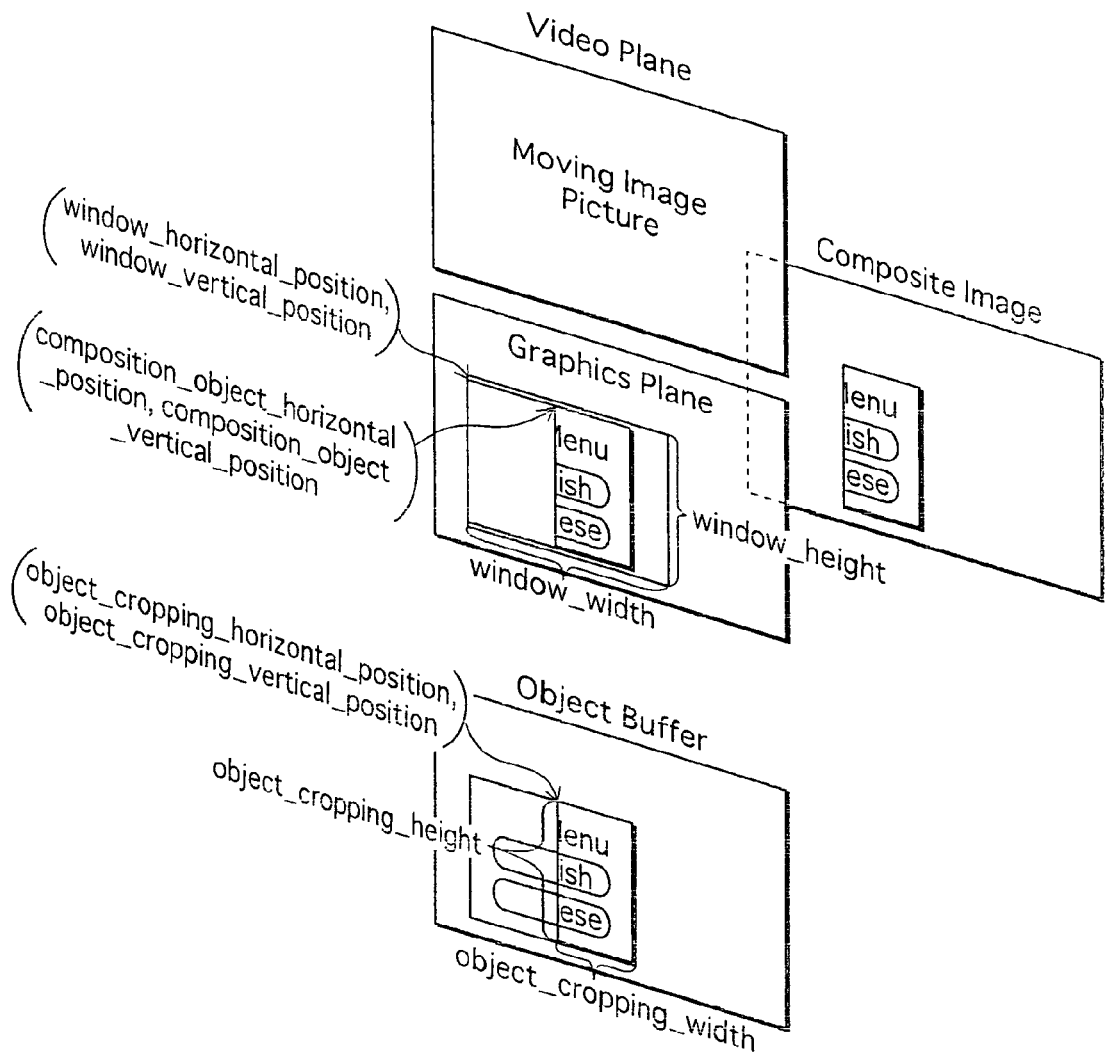
FIG. 33 shows an example of a composition_object(1) structure.
Figure 34:
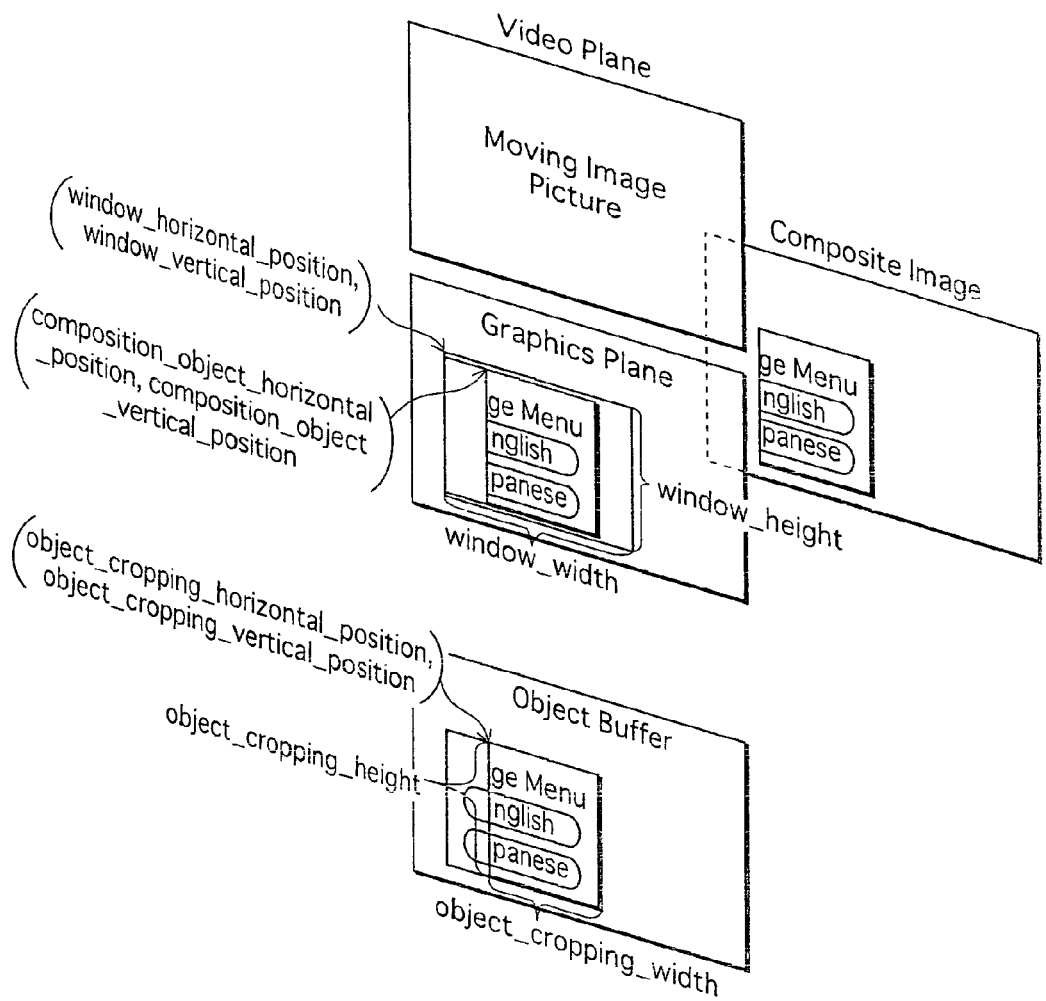
FIG. 34 shows an example of a composition_object(2) structure.
Figure 35:
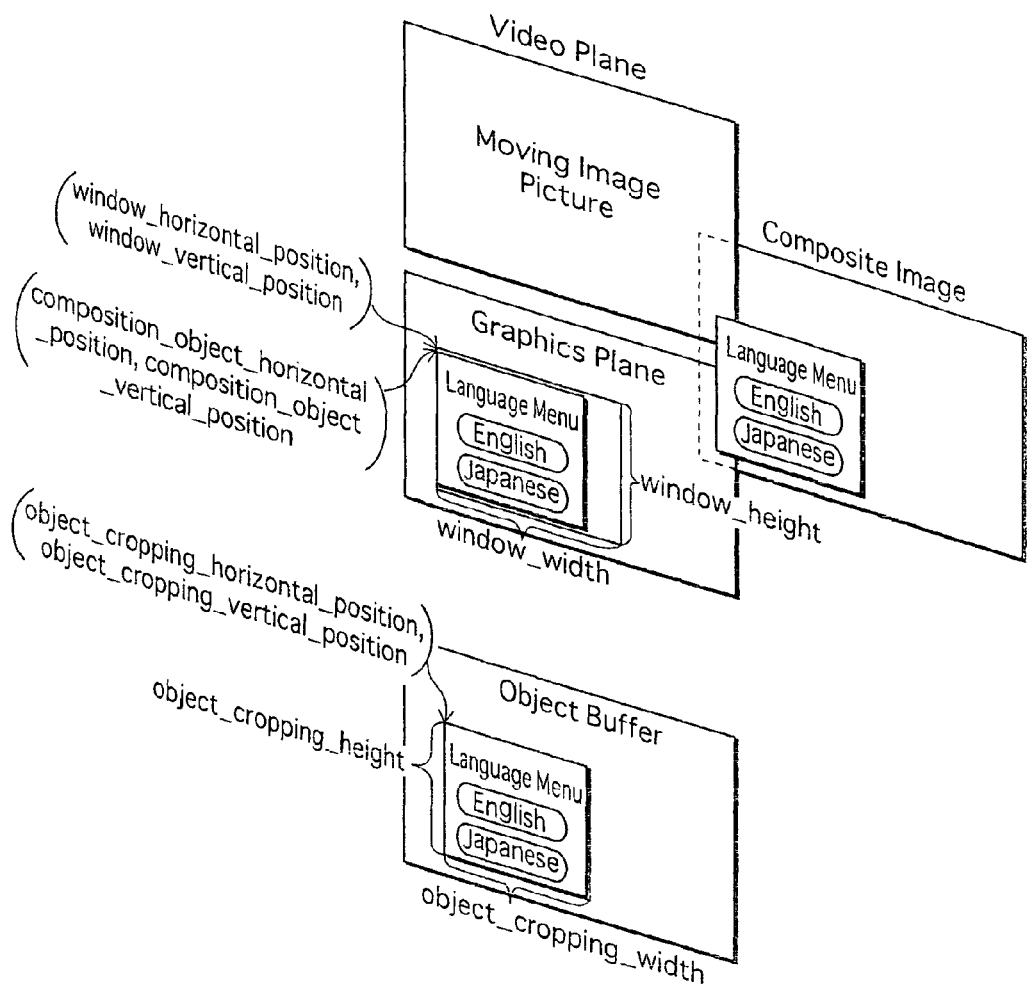
FIG. 35 shows an example of a composition_object(3) structure.

FIGS. 33, 34, and 35 are views showing examples of the composition_object structure(1), composition_object structure(2), and composition_object structure(3), respectively. The window_info structure shown in each of the figures is identical with the one shown in FIG. 32. Thus, the description is omitted. The composition_object (1) structure shown in FIG. 33, however, differs from the one shown in FIG. 32. In FIG. 33, the object_cropping_horizontal_position and object_cropping_vertical_position fields specify the coordinates of the top left pixel of about a right half, rather than ¼, of the language selection menu stored on the object buffer. The object_cropping_height and object_cropping_width fields specify the height and width of the right half of the language selection menu. Similarly, in FIG. 34, the respective fields of the composition_object(2) structure together specify about ¾ of the language selection menu from the right. In FIG. 35, the respective fields of the composition_object(3) structure together specify the entire part of the language selection menu. By rendering the cropped part of the graphics object as shown in FIGS. 33, 34, and 35 to the graphics plane, the right half of the language selection menu, the ¾ of the language selection menu from the right, and the entire language selection menu are overlaid on the video.

With the described structure, processing for making a graphics object that is in the buffer appear gradually on the screen and gradually disappear can be easily realized according to the writing of composition_objects.

With the described structure of the in_effect and the out_effect, when the graphical image of a graphics object used in displaying button animation of the in_effect and the out_effect changes, "1" is added to the value of the page_version_number to indicate that there has been a change.

This completes the description of the improvement in a BD-ROM pertaining to the second embodiment. The following describes an improvement in a playback apparatus pertaining to the second embodiment.

The state control unit 23 in the second embodiment sets a value in a PSR showing a current page (PSR 11) and a value to a PSR showing a current button (PSR 10) according to instructions from the I-Graphics decoder 9. Such instructions may be given by way of (i) direct addressing or (ii) indirect addressing. In the case of direct addressing, the I-Graphics decoder 9 outputs an immediate value to be set to the PSR set 16. In the case of indirect addressing, the status control unit 23 determines a setting value to be set in the PSR set 16 when there has been a change in the playback apparatus status or in the user preferences. The status controller 23 determines the value by performing a "procedure when playback condition is changed" or "procedure when change is requested". Hereinafter, a description is given of the procedures performed for setting the PSR 11 (current page) and the PSR 10 (current button).

Figure 36A:
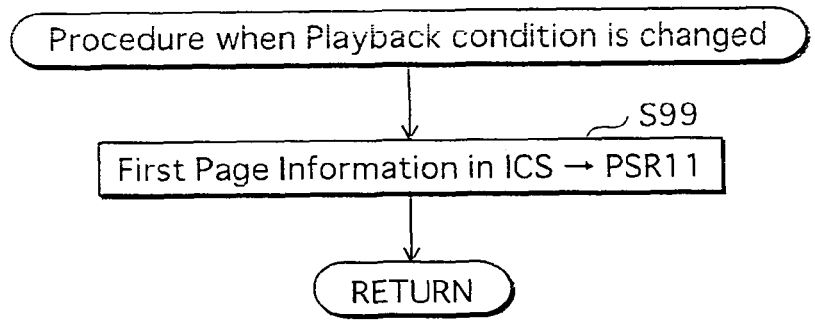
FIG. 36A is a flowchart of "procedure when playback condition is changed", preformed with respect to a PSR 11.

FIG. 36A is a flowchart of the "procedure when playback condition is changed", preformed with respect to the PSR 11. This procedure is performed to set the first page_info structure within an ICS to the PSR 11 (step S99).

Figure 36B:
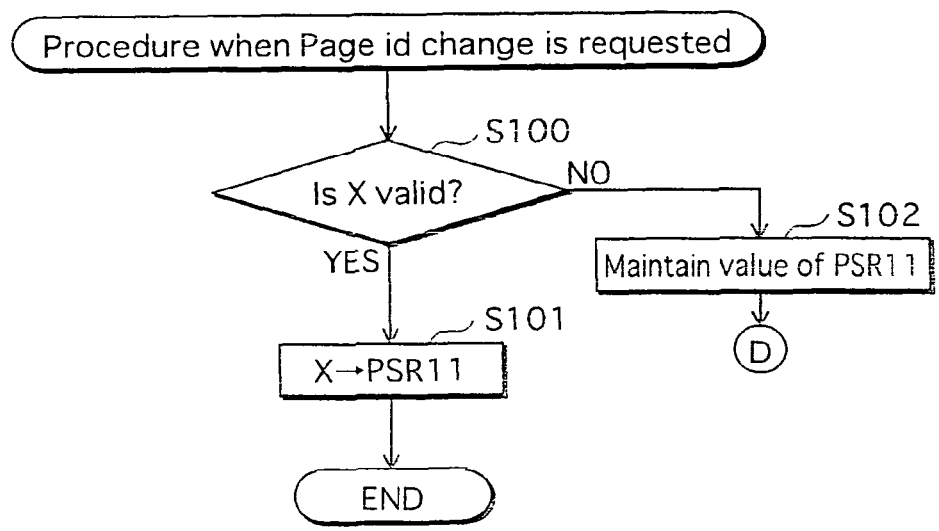
FIG. 36B is a flowchart of "procedure when change is requested", preformed with respect to a PSR 11.

FIG. 36B is a flowchart of the "procedure when change is requested", preformed with respect to the PSR 11. Suppose that a user operation is received and a page having the page number X is requested to be presented. In response to the user operation, a judgment is made as to whether X is a valid value (step S100). If X is a valid value, the PSR 11 is set to the value of X (step S101). If X is invalid, the PSR 11 remains unchanged (step S102).

The value of PSR 11 changes as described above. Turning now to the PSR 10, a description is given of the "procedure when playback condition is changed" and to the "procedure when change is requested".

Figure 37A:
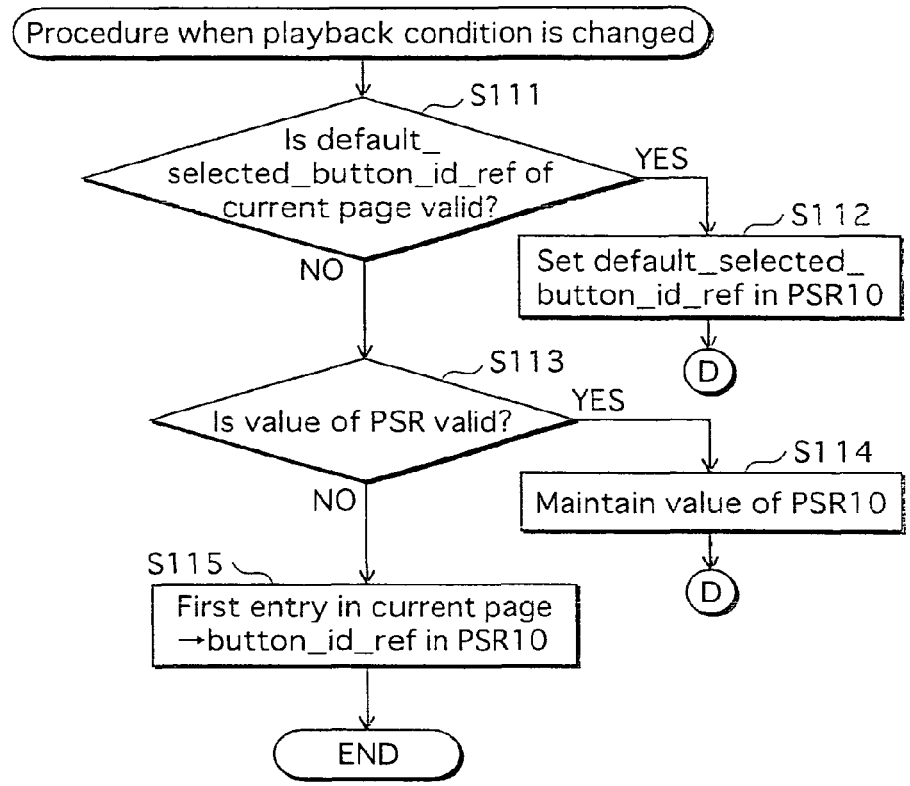
FIG. 37A is a flowchart of "procedure when playback condition is changed", performed with respect to a PSR 10.

FIG. 37A is a flowchart of the "procedure when playback condition is changed", performed with respect to the PSR 10.

In step S111, a judgment is made as to whether the default_selected_button_id_ref field value associated with the current page is valid. If the judgment in the step S111 results in YES, the default_selected_button_id_ref field value is set to the PSR 10 (step S112).

If the default_selected_button_id_ref field value is invalid, it is then judged whether the PSR 10 holds a valid value (step S113). If the PSR 10 is valid, the PSR 10 remains unchanged so that the currently held value is maintained (step S114). On the other hand, if the PSR 10 is invalid, the PSR 10 is set to the button_id_ref field value identifying the first button_info structure of the current page (step S115).

Figure 37B:
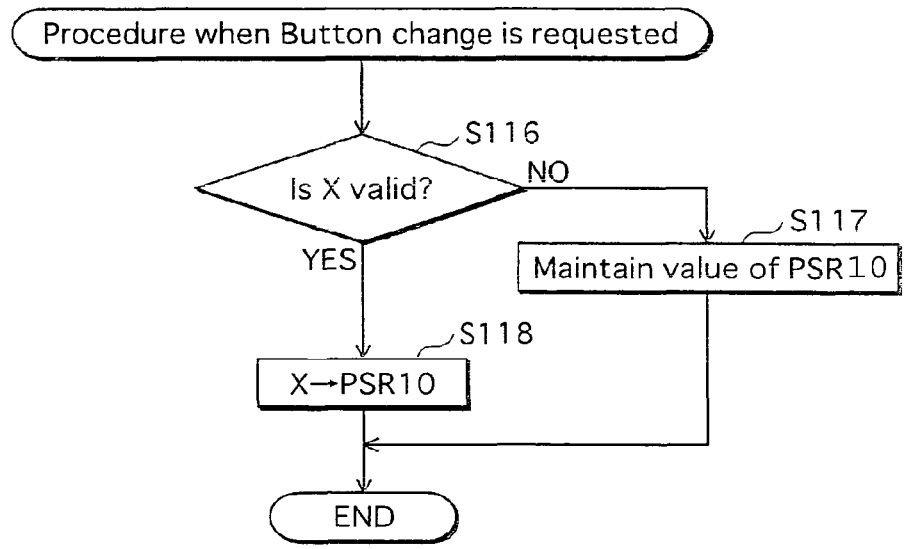
FIG. 37B is a flowchart of "procedure when change is requested", performed with respect to the PSR 10.

FIG. 37B is a flowchart of the "procedure when change is requested", performed with respect to the PSR 10. Suppose that a user operation is made and a button having the button number X is requested to be selected. In response to the user operation, the status controller 23 judges whether X is a valid button_id field value (step S116). If X is a valid value, the PSR 10 is set to the value of X (step S118). If X is an invalid value, the PSR 10 remains unchanged and thus the currently held value is maintained (step S117). The above-described procedures ensure that the PSRs 10 and 11 hold current values at all times. This completes the description about the internal structure of playback apparatus.

The I-Graphics decoder 9 in the present embodiment has a graphics controller 37. The graphics controller 37 updates the display composition in accordance with changes in the values of the PSR 10 or the PSR 11 in the PSR set 16, the timeout of the timers 18-21, or a user operation received by the operation reception unit 22. The procedures performed by the graphics controller 37 are shown in detail in FIGS. 38-45.

Figure 38:
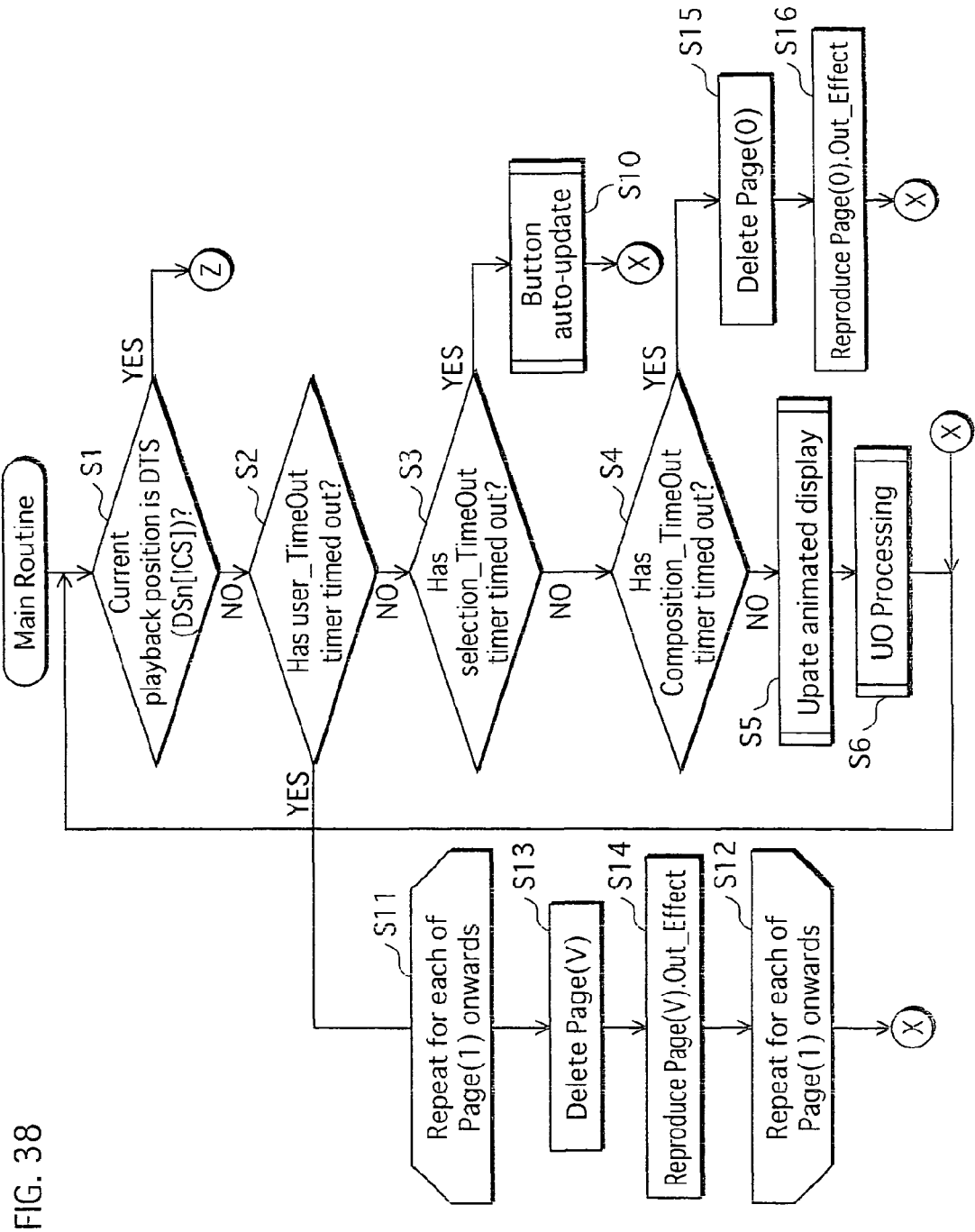
FIG. 38 is a flowchart of the main routine of the procedure performed by a graphics controller 37.

FIG. 38 is a flowchart showing processing that is a main routine in the processing of the graphics controller 37.

At the start of the processing shown in the flowchart, the graphics controller 37 is not outputting the storage content of the interactive graphics plane 10 to the CLUT unit 20. This state of not outputting storage content to the interactive graphics plane 10 and not displaying a page is called a turned-off state.

The flowchart shows processing that is the main routine. In the main routine, steps S1-S6 form a loop. In each iteration of the loop, judgments are made as to whether specific events have occurred (steps S1-S4), a display composition of the Multi-Page Menu is updated to a subsequent display composition for animated presentation (step S5), and processing is performed according to a user operation (UO (User Operation processing); step S6). If any of the judgments in the steps S1-S4 results in YES, corresponding steps are performed and the processing returns to the main routine.

Figure 39:
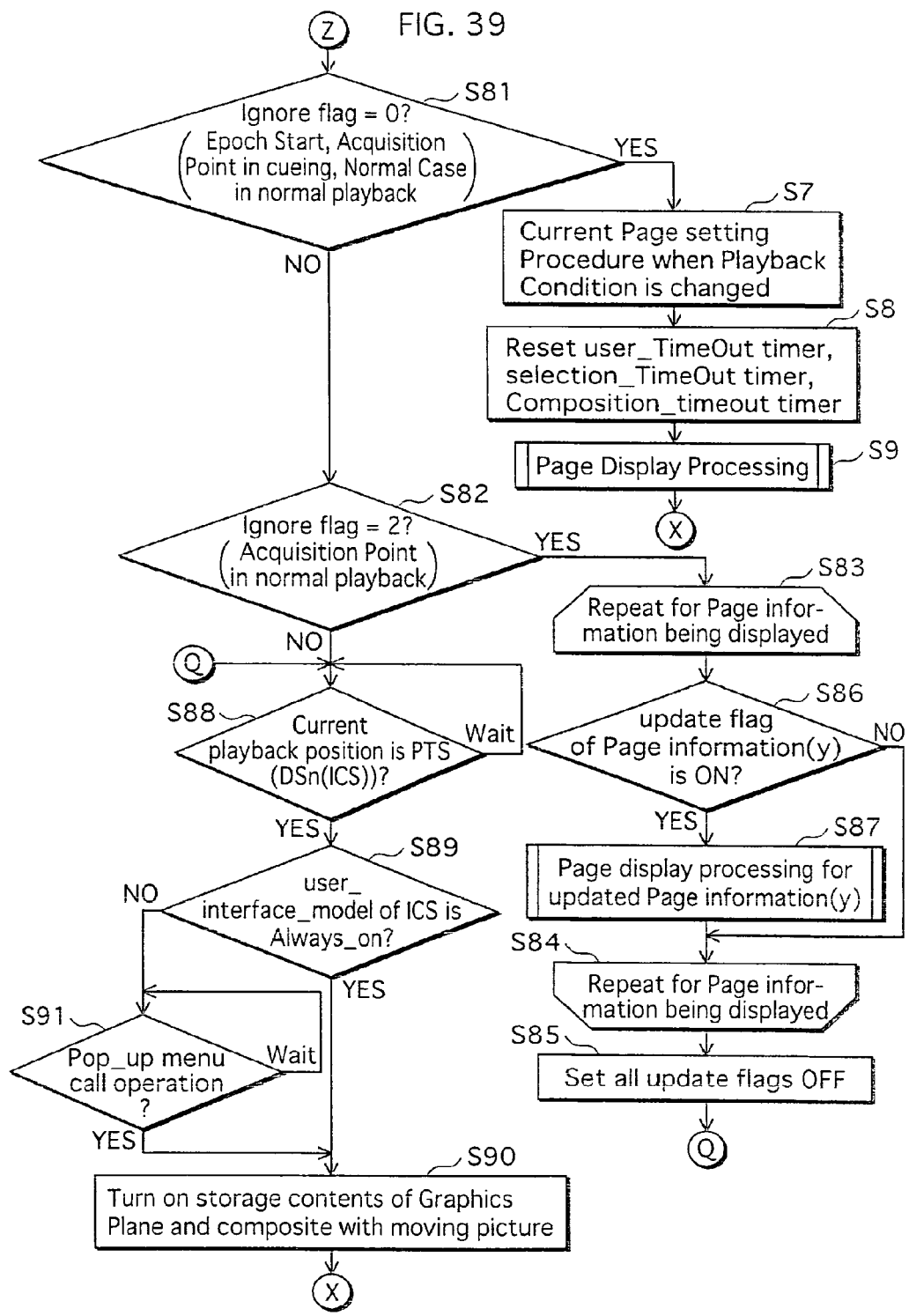
FIG. 39 is a flowchart showing the procedure for re-display when page information in a composition buffer 36 has been updated.

In the step S1, a judgment is made as to whether the current playback point has reached the point specified by the PTS (DSn[ICS]). If the judgment in the step S1 results in YES, the flowchart of FIG. 39 is executed. FIG. 39 is a flowchart showing the procedure for re-presentation processing when page information in the composition buffer 36 has been updated.

In the flowchart, first it is judged whether or not the ignore flag is set to "0" (step S81). As described in FIG. 15, the value of the ignore flag changes depending on the composition_state field in the ICS and whether or not an ICS exists in the composition buffer 36. In step S81, it is judged whether the ignore flag is set to "0". In other words, it is judged whether the composition_state field is one of an Epoch Start, an Acquisition Point in cueing, and a Normal Case in normal playback. If the ignore flag is set to "0", the "procedure when playback condition is changed" is executed. After setting page[0], which is the first page, as the current page (step S7), the User_TimeOut timer 18, the Selection_TimeOut timer 19, and the Composition_TimeOut timer 20 are reset (step S8), the current page is displayed (step S9), and the processing returns to the loop processing of step S1 to step S6.

If the ignore flag is not set to "0", it is judged whether or not the ignore flag is set to "2" (step S82). The ignore flag is set to "2" when an Acquisition Point is to be read in normal playback. If the ignore flag is set to "2", the processing in step S83 to step S85 is repeated. This processing from step S83 to step S85 is performed with respect to each piece of page information being displayed. Specifically, it is judged whether or not the update flag in the page information(y) is set to ON (step S86), and if the update flag is set to ON, performing page display processing with respect to the updated page information(y) (step S87). As a result of repeating this processing, all update flags are set to OFF (step S85). The processing then moves to step S88.

In step S88, when the current playback position reaches the time specified by PTS(DSn[ICS]), it is judged whether or not the user_interface_model in the ICS is set to Always-OnU/I (step S89). If the user_interface_model in the ICS is set to Always-OnU/I, the interactive graphics plane 10 is put into the turned-on state, and the page stored in the interactive graphics plane 10 is output to the CLUT unit 15 and composited with the moving picture (step S90).

If the user_interface_model is set to Pop-upU/I, the graphics controller 37 maintains the turned-off state of the interactive graphics plane 10. In other words, the page stored in the interactive graphics plane 10 is not composited with the moving picture, and not displayed. While this turned OFF state is maintained, the graphics controller 37 waits for a Pop-up_On operation from the user. If a Pop-up_On operation is made by the user (YES in step S91), the page stored in the interactive graphics plane 10 is output to the CLUT unit 15 and composited with the moving picture (step S90). This control for having the storage content of the interactive graphics plane 10 output to the CLUT unit 15 and composited with the moving picture is referred to as putting the interactive graphics plane 10 into a "turned-on state". Display of a pop-up menu is achieved by this turning off and turning on. The processing subsequently returns to the loop processing in steps S1-S6. According to the described processing, updated page information is re-presented at the time specified by the PTS(DSn [ICS]).

In the step S2, a judgment is made as to whether the user_timeout timer 18 has timed out. If the judgment in the step S2 results in YES, a loop of steps S11-S14 is performed. In each iteration of the loop, an arbitrary page[j] of the Multi-Page Menu is removed from the screen (step S13), followed by playback of an out_effect animation provided for page[j] (step S14). The loop is repeated for each page from page[0] onward, defined within the ICS (steps S11 and S12).

In the step S3, the judgment is made as to whether the selection_timeout timer 19 has timed out. If the judgment in the step S3 results in YES, a button on the current page is automatically activated (auto-activate: step S10). Then, the processing returns the loop of steps S1 to S6.

In the step S4, the judgment is made as to whether the composition_timeout timer 20 has timed out. If the judgment in the step S4 results in YES, Page[0], which is the first page of the Multi-Page Menu, is removed from the screen (step S15), followed by playback of the out_effect animation provided for Page[0] (step S16). Then, the processing returns to the loop of steps S1 to S6.

Figure 40:
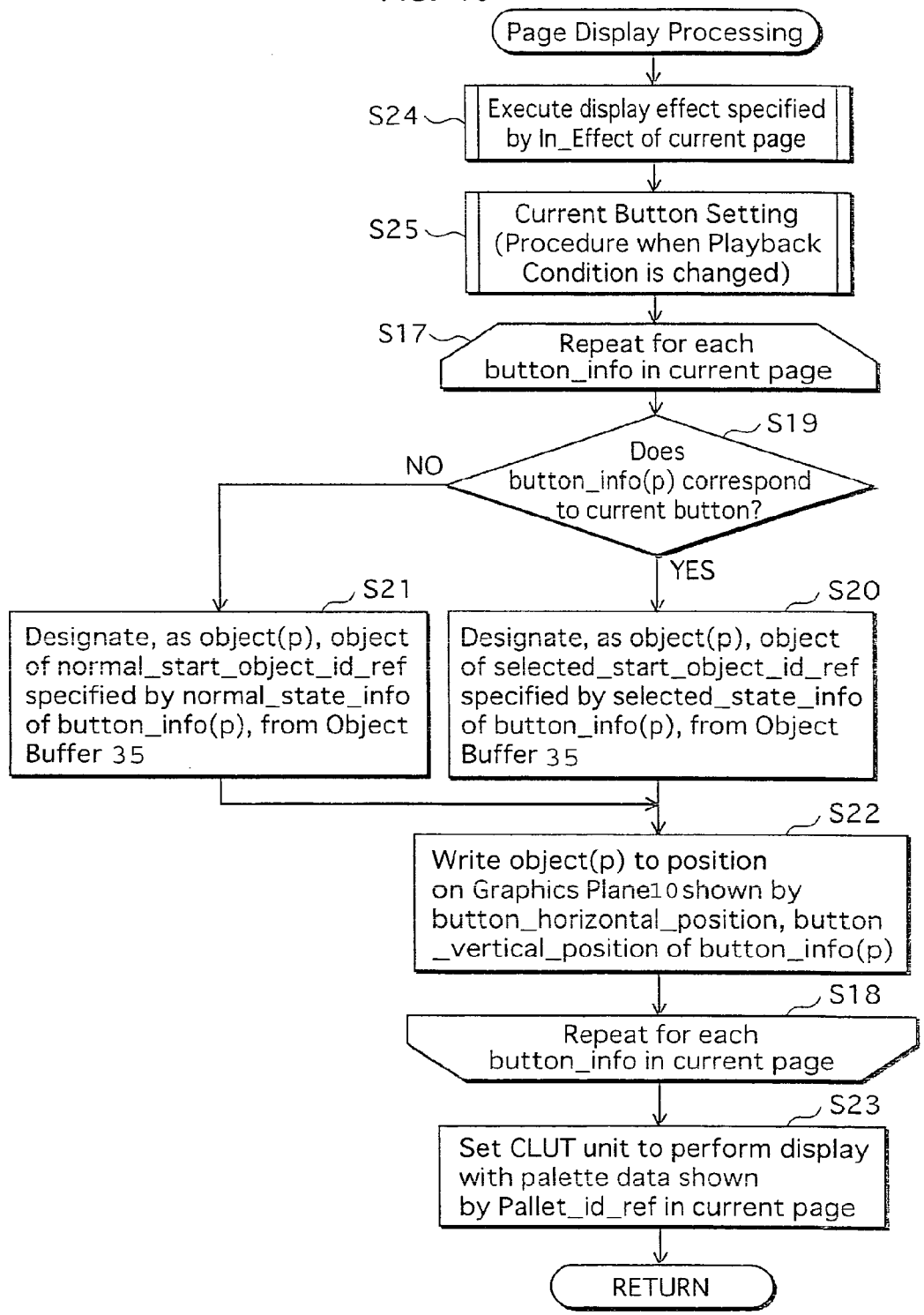
FIG. 40 is a flowchart of the procedure for the first presentation.

Page presentation processing in the described main routine is realized by the processing procedure of FIG. 40.

FIG. 40 is a flowchart showing a display procedure for displaying page information. In step S24, the display effect specified by the in_effect of the current page is executed. After executing the display effect, processing to set the current button is performed (step S25). Since the current button is specified in the PSR 10, this processing in step S25 is the execution of the "procedure when playback condition is changed" with respect to the PSR10. When the current button has been determined according to step S25, the processing moves to steps S17-S22.

The steps S17 and S22 form a loop which is repeated for each button_info structure provided in the current page (steps S17 and S18). The button_info structure to be processed in the current iteration of the loop is designated as button_info (p).

In the step S19, a judgment is made as to whether the button_info (p) is associated with the current button. If the judgment in the step S19 results in YES, the step S20 is performed next. If not, the step S21 is performed next.

In the step S21, among the graphics objects on the object buffer 35, one specified by the normal_start_object_id_ref field value is designated as the graphics object (p).

In the step S20, among the graphics objects on the object buffer 35, one specified by the selected_start_object_id_ref field value is designated as the graphics object (p).

Once the graphics object (p) is designated in the step S20 or S21, the graphics object (p) is rendered to the interactive graphics plane 10 at the position specified by the button_horizontal_position and button_vertical_position field values (step S22). By repeating the above steps for each button_info structures provided in the current page, among a plurality of graphics objects associated with each button state, the first graphics object is rendered for each button to the interactive graphics plane 10. After repeating the above steps, the CLUT unit 14 is set so as to present the current page using the pallet data specified by the pallet_id_ref field value of the current page (step S23). This completes the description of the flowchart shown in FIG. 40.

The procedure shown by the flowchart of FIG. 40 is executed when reading an Acquisition Point DS, only with respect to page information whose page_version_number has changed. In other words, if page information whose page_version_number has changed is being presented in an Acquisition Point DS (step S124 of step S16), the processing of FIG. 40 is executed with respect to the page information being presented. This processing results in the page being re-presented based on the updated page information.

Figure 41:
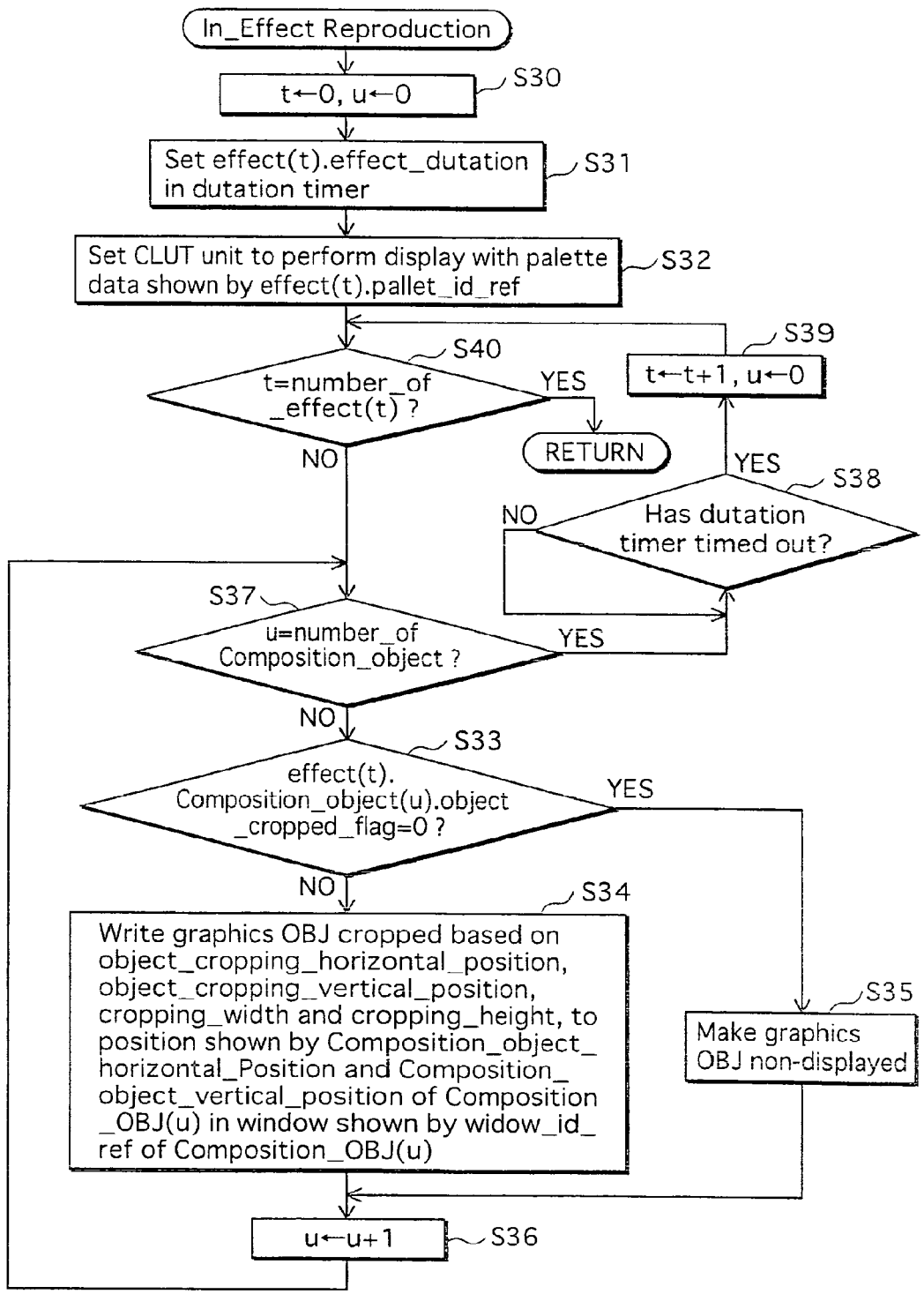
FIG. 41 is a flowchart of the procedure for playback of an in_effect animation.

FIG. 41 is a flowchart of the procedure for playback of an in_effect animation. In the flowchart, a variable t denotes an arbitrary one of display compositions within the effect_sequence defined for the in_effect. In addition, a variable u denotes an arbitrary one of composition_object structures used for the effect(t). As shown in the flowchart, first of all, the variables t and u are initialized to "0" (step S30). Then, the effect_duration_timer 21 is set to the value of the effect(t) .effect_duration field (step S31), and the CLUT units 14 and 15 are set so as to use the pallet data identified by the effect (t).pallet_id_ref field value for presentation (step S32). Then, a loop of steps S33-S40 is performed. The loop is a two-level loop. The first-level loop (steps S33-S37) uses the variable u as a control variable, whereas the second-level loop (step S33-S40) uses the variable t as a control variable.

In the first-level loop, a judgment is made as to whether the object_cropped_flag field provided within the composition_object(u) structure associated with the effect(t) is set to "0" (step S33). If the field is set to "0", no graphics object is presented on screen for composition_object(u) (step S35). If the field is set to "1", on the other hand, the object is cropped according to the object_cropping_horizontal_position, object_cropping_vertical_position, cropping_width, and cropping_height fields of the composition_object(u). The cropped part of the graphics object is then rendered within the window identified by the window_id_ref field of the composition_object(u), at the position specified by the composition_ object_horizontal_position and the composition_object_vertical_position fields within the composition_object (u) (step S34). Then, the variable u is incremented by "1". The first-level loop is repeated until the variable u is equal to the number_of_composition_object field value.

In the second-level loop, for each iteration of the first-level loop (steps S33-S37), the following steps are performed. After the effect_duration times out (step S38), the variable t is incremented by "1", and the variable u is initialized to "0" (steps S39). The second-level loop is repeated until the variable t is equal to the number_of_effect (t) field value (step S40). This completes the description of the procedure for presentation of the in_effect. Note that no description is given of the procedure for presentation of an out_effect, because it is basically the same to the above-described procedure.

Immediately after presentation of the in_effect, a current page is presented and the first display is updated for animated presentation. The first display composition of the current page is presented by rendering to the interactive graphics plane 10, the graphics objects associated with the normal_start_object_id_ref and the selected_start_object_id_ref field values provided in each button_info structure. Each button is presented in animation by updating the button image on the interactive graphics plane 10 for each iteration of the loop in the main routine. Each button image is updated by overwriting the interactive graphics plane 10 with an arbitrary one of a sequence of graphics objects (g-th graphics object) associated with the button. That is to say, each button is presented in animation by rendering a sequence of graphics objects associated with the normal_state_info and selected_state_info fields provided within each button_info structure, one by one to the interactive graphics plane 10. Note that the variable q is used to specify individual graphics objects associated with the normal_state_info and selected_state_info fields provided within each button_info structure.

Figure 42:
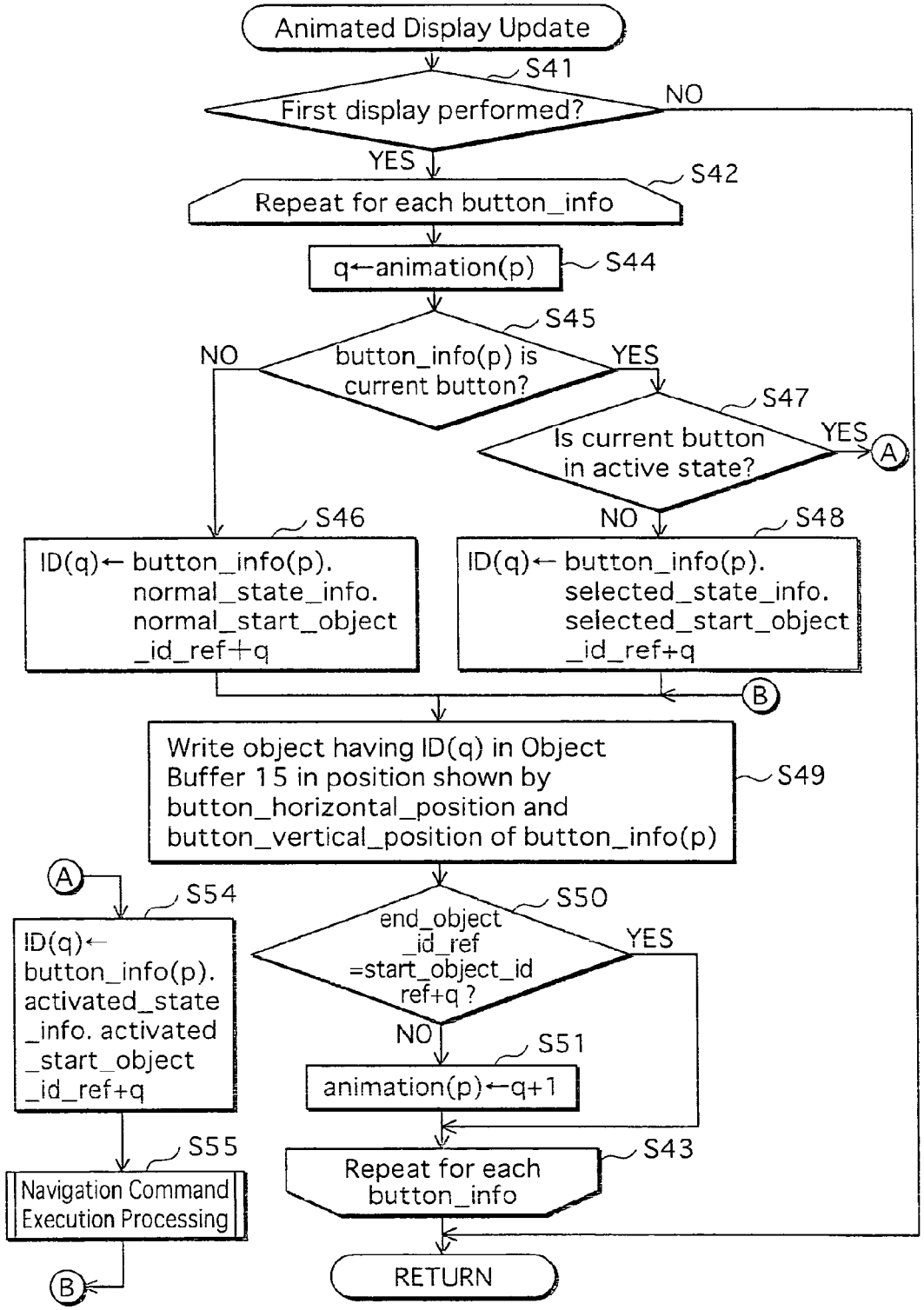
FIG. 42 is a flowchart of the update procedure for presentation buttons in animation.

Now, with reference to FIG. 42, a description is given of the procedure for display update for animated presentation.

In a step S41, a judgment is made as to whether the first display composition has been presented. If the first display composition is not yet presented, the processing returns to the main routine without performing any operation. If the first display composition has been presented, on the other hand, steps S42-S53 are performed. The steps S41-S55 form a loop in which the steps S44-S55 are repeated for each button_info structure in the ICS (steps S42 and S43).

In the step S44, the variable q is set to the value of variable animation(p) corresponding to the button_info(p) structure. As a result, the variable q represents the current frame number of the button_info(p).

In the step S45, a judgment is made as to whether the button_info(p) corresponds to the button currently in the selected state (i.e. the current button).

If the button_info(p) does not correspond to the current button, the variable q is added to the normal_start_object_id_ref in the button_info(p) to obtain an ID(q) (step S46).

If the button_info(p) corresponds to the current button, the step S47 is performed.

In the step S47, a judgment is made as to whether the current button is in the actioned state. If the judgment in the step S47 results in YES, the variable q is added to the activated_start_object_id_ref field value in the button_info(p) to obtain an ID(q) (step S54). Then, one of the navigation commands associated with the button_info(p) is executed (step S55).

On the other hand, if the current button is not in the actioned state, the variable q is added to the selected_start_object_id_ref field value in the button_info(p) to obtain an ID(q) (step S48).

Once the ID(q) is obtained, among the graphics objects stored on the object buffer 35, the one identified by the ID(q)

is rendered to the interactive graphics plane 10. The rendering position on the interactive graphics plane 10 is specified by the button_horizontal_position and the button_vertical_position fields provided in the button info(p) (step S49).

Through the loop iteration, the q-th one of the graphics objects associated with the selected (or activated) state of the current button is rendered to the interactive graphics plane 10.

In step S50, a judgment is made as to whether the sum of the normal_start_object_id_ref field value and the variable q has reached the normal_end_object_id_ref field value. If the sum has not reached the normal_end_object_id_ref field value, the variable q is incremented by "1" and the resulting variable q is set as the variable animation(p) (step S51). On the other hand, if the sum has reached the normal_end_object_id_ref field value, the processing moves to step S43. The above steps are repeated for each button_info structure within the ICS (steps S42 and S43), and then processing returns to the main routine.

Through the above-described steps of S41-S53, each button image presented on screen is updated with a new graphics object each time the main routine is performed. Thus, by repeating the main routine, the buttons images are presented in animation. When presenting the buttons in animation, the graphics controller 37 adjusts the duration for presenting each graphics object so as to maintain the animation_frame_rate_code. This completes the description of the procedure for animated presentation.

Figure 43:
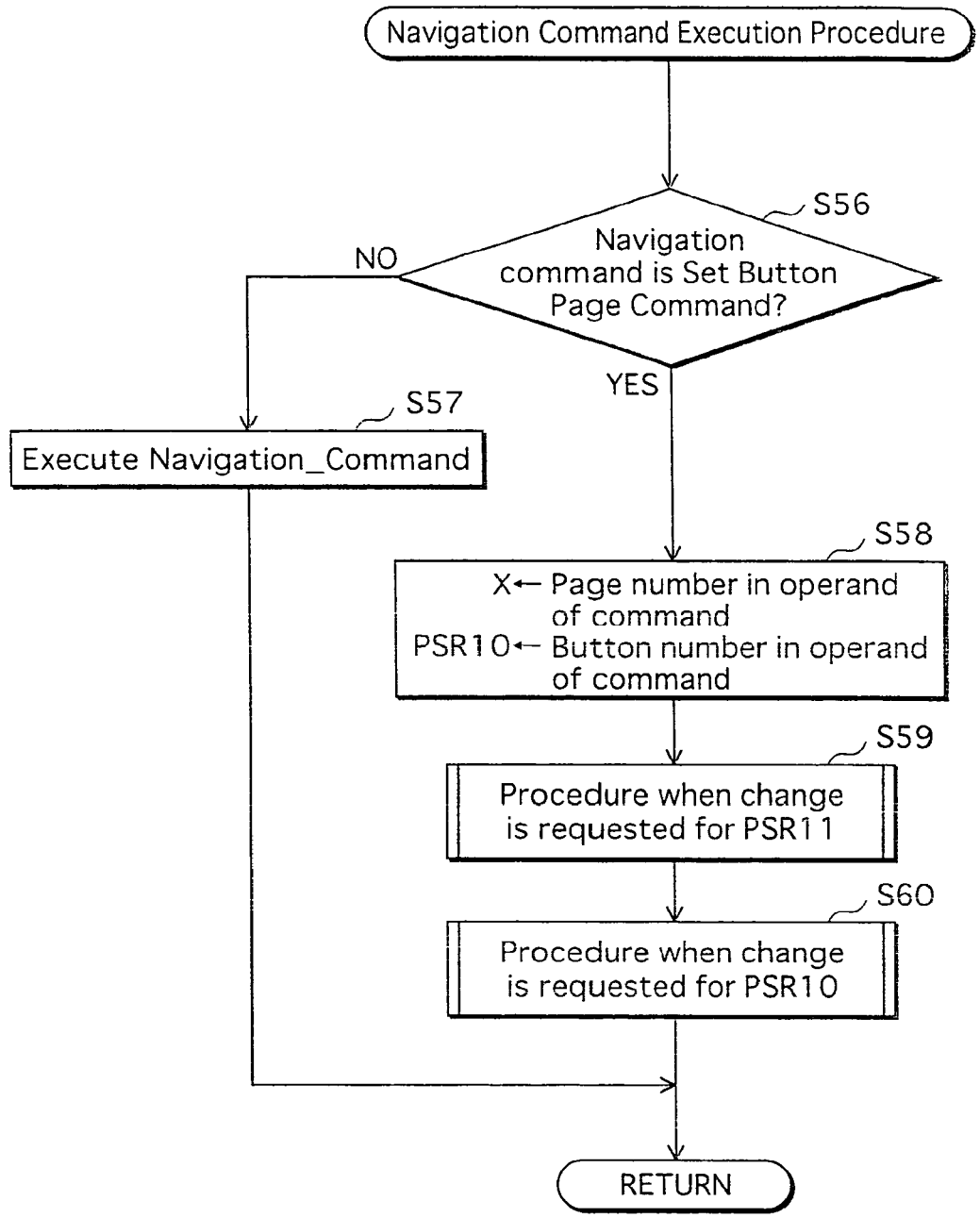
FIG. 43 is a flowchart of the procedure for executing a navigation command.

In the step S47 described above, if it is judged that the current button is in the actioned state, a navigation command associated with the current button needs to be executed in the step S55. FIG. 43 is a flowchart of the procedure for executing a navigation command. First, a judgment is made as to whether the navigation command is a SetButtonPageCommand (step S56). If the navigation command is not a SetButtonPageCommand, the navigation command is simply executed (step S57). On the other hand, if the navigation command is a SetButtonPageCommand, instructions are given to the state control unit 23 so as to designate the page number specified by the operand of the navigation command as the page number X as well as to set the button number specified by the operand of the navigation command to the PSR 10 (step S58). Then, the state control unit 23 executes the "procedure when change is requested", with respect to the PSR 11 (step S59). As mentioned above, the PSR 11 holds a value representing the currently presented page (i.e. the current page). Thus, by performing the "procedure when change is requested" with respect to the PSR 11, the current page is determined. Then, the state control unit 23 performs the "procedure when playback condition is changed", with respect to the PSR10 (step S60). This completes the description of the flowchart shown in FIG. 43.

Figure 44:
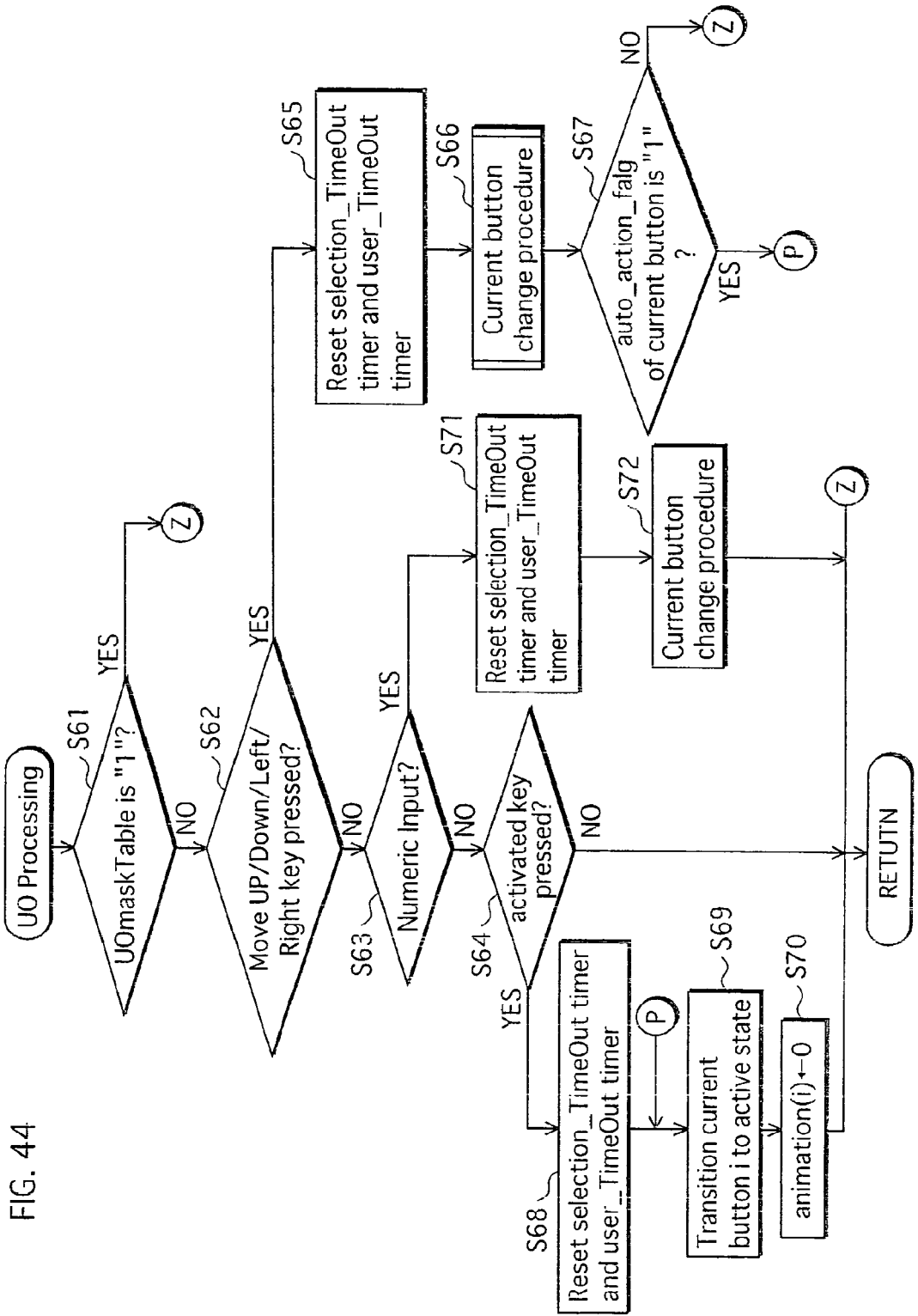
FIG. 44 shows the procedure for processing a UO.

This completes the description of the procedure for executing a navigation command. As stated above, a navigation command is executed when an associated button is in the actioned state. The button state changes are presented through the following procedure in response to a user operation (UO). FIG. 44 shows the procedure for processing a UO. As shown in the flowchart, judgments are made in steps S61-S64 as to whether specific events have occurred. An occurrence of each event requires specific steps to be performed. The processing then returns to the main routine. Specifically, in the step S61, a judgment is made as to whether the UO_mask_table field is set to "1". If the field is set to "1", the processing returns to the main routine without performing any step.

In the step S62, the judgment is made as to whether any of the Move Up, Down, Left, and Right keys on the remote controller is pushed. At a push of any of the keys, the user_timeout timer 18 and the selection_timeout timer 19 are reset (step S65). Then, another button is designated as the new current button (step S66), followed by the judgment as to whether the auto_action_flag of the newly designated current button is set to "01" (step S67). If the auto_action_flag is not set to "01", the processing returns to the main routine. On the other hand, if the auto_action_flag is set to "01", the current button(i) is put into the actioned state (step S69). Then, the variable animation(i) is set to "0" (step S70).

In the step S63, the judgment is made as to whether a numeric input is made. If a numeric input is made, the user_timeout timer 18 and the selection_timeout timer 19 are reset (step S71), and another button is designated as the new current button (step S72). The processing then returns to the main routine.

In the step S64, a judgment is made as to whether an activate key on the remote controller is pushed. At a push of the activate key, the user_timeout timer 18 and the selection_timeout timer 19 are reset (step S68), and then the current button (i) is put into the actioned state (step S69). After the button state transition, the variable animation(i) is set to "0" (step S70). Note that the step S66 of designating a new current button described above is performed by calling a subroutine shown in FIG. 45. Now, a description is given of the subroutine, with reference to the figure.

Figure 45:
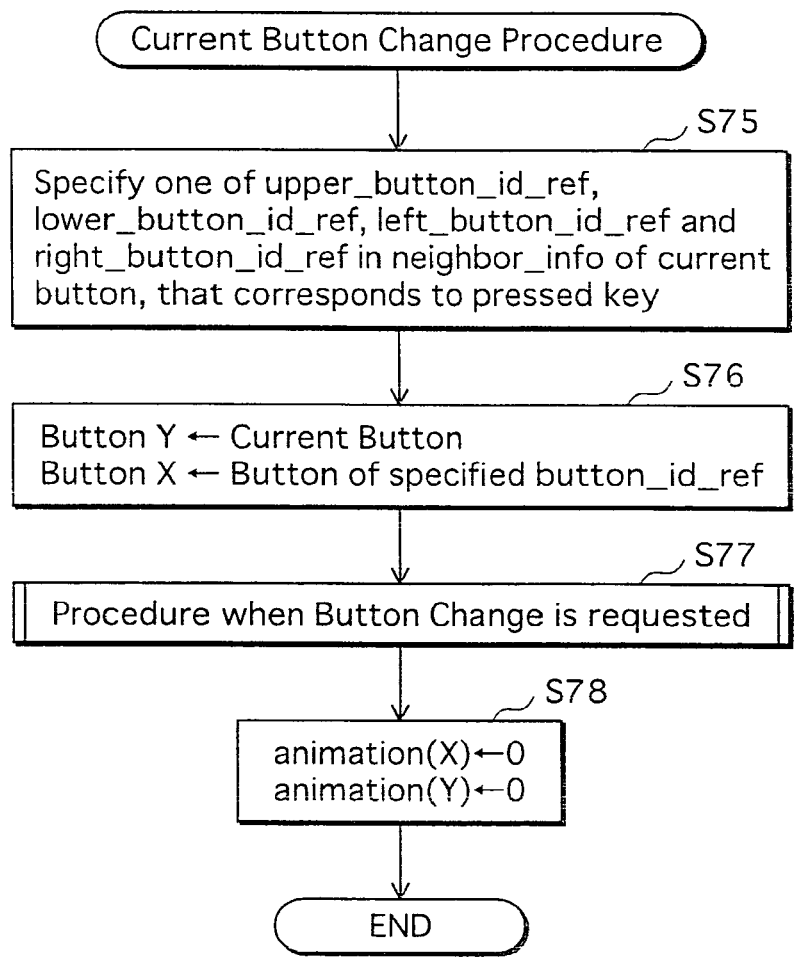
FIG. 45 is a flowchart of the current button change procedure.

FIG. 45 is a flowchart of the current button change procedure. First, it is determined which of upper_button_id_ref, lower_button_id_ref, left_button_id_ref, and right_button_id_ref fields within the neighbor_info associated with the current button corresponds to the pushed key (step S75).

Here, let a button(Y) denote the current button, and let a button X denote the button specified by the one of upper_button_id_ref, lower_button_id_ref, left_button_id_ref, and right_button_id_ref fields (step S76). Then, the state control unit 23 performs the "procedure when change is requested" with respect to the PSR 10 (step S77). As a result, the PSR 10 is set to the value X.

Thereafter, the variables animation(X) and animation(Y) are set to "0" (step S78), and returns to the main routine. Since the variable animation( ) is reset to "0" when the state of the button changes, animation display commences only when the state of the button is changed.

As has been described, the present embodiment enables button materials in a current page to be updated such that animated display is achieved, and therefore screen presentation can be designed in keeping with the image of the movie work.

Third Embodiment

While the first embodiment describes updating of page information, the present embodiment relates to an improvement in realizing updating of a graphics object belonging to the DSn. Here, update of a graphics object refers to sending denotes sending, to the stream graphics processor 14, an ODS having an identical object_id to a graphics object that exists in the object buffer 35, and then having the stream graphics processor 14 decode the ODS and write the resulting data to the object buffer 35, thereby overwriting the graphics object in the object buffer 35.

An issue when implementing such updating of a graphics object is that presentation of animation on the page may be inhibited. As described in the second embodiment, when a user performs an operation for moving focus from one button to another on the menu, the state of the relevant buttons changes from the actioned state to the selected state or from the selected state to the normal state. When the state changes from the normal state to the selected state, the ODS specified by the selected_start_object_id_ref through to the ODS specified by the selected_end_object_id_ref are presented successively (ODS 14 to 16 in FIG. 28).

Figure 28:
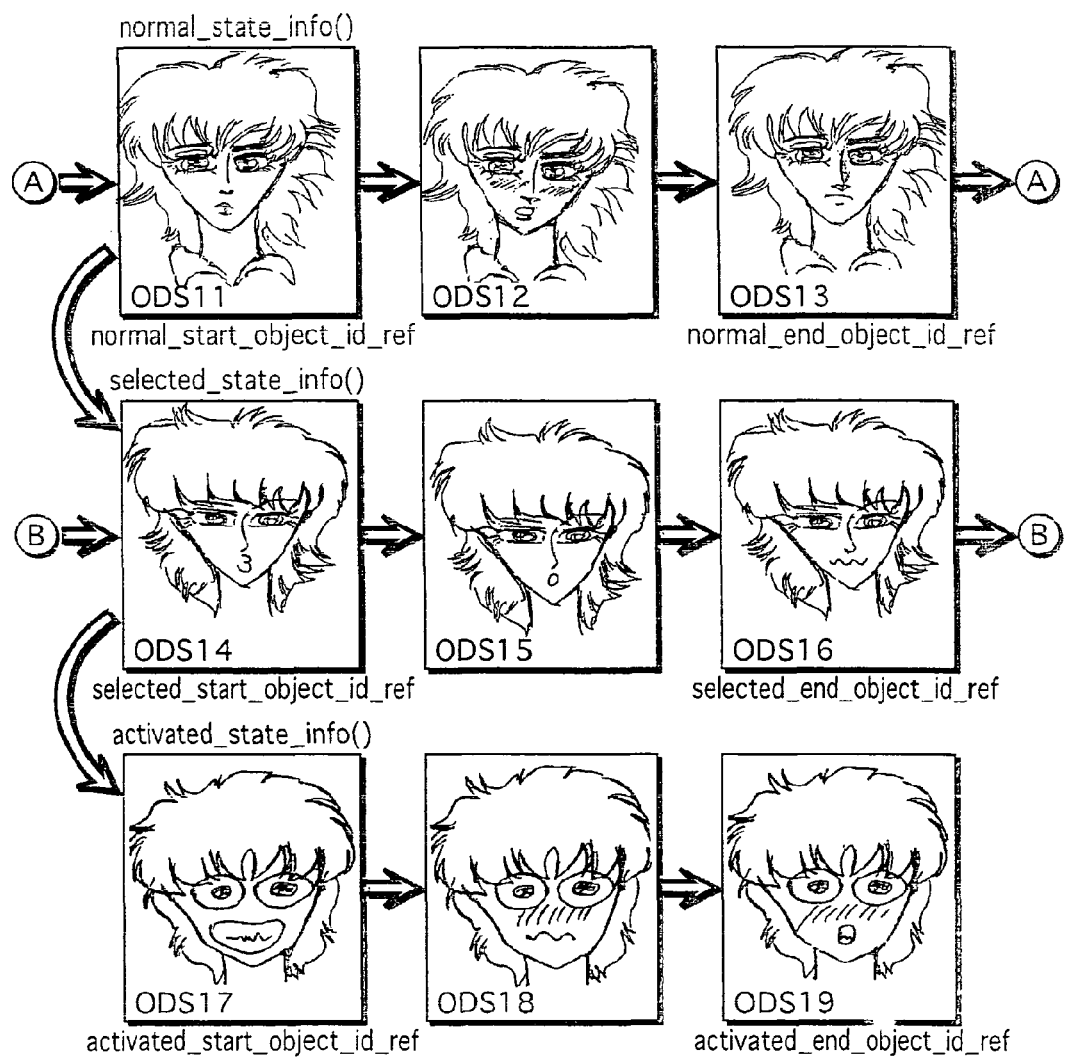
FIG. 28 shows graphical images derived from ODSs 11-19.

When the state of a button changes from the selected state to the actioned state, the ODS specified by the activated_start_object_id_ref through to the ODS specified by the activated_end_object_id_ref are presented successively (ODS 17 to 19 in FIG. 28).

This successive presentation is the animated presentation. When an update such as described above is to be performed while this animation presentation is being performed, a new graphics object identified by the same object_id is placed in the rectangular area in the object buffer 35. When the graphics object is read from the object buffer 35 to the graphics plane while animation is being presented, the graphical image of the graphics changes.

Since it is somewhat peculiar for the graphical image of the animated button to change during the animation presentation, animation presented is not executed for the duration of the updating of the graphics object.

Here, the duration for which the graphics object is updated is a duration during which re-presentation of the page is performed, and denotes the duration from DTS (DSn[ICS]) to PTS (DSn[ICS]). During this period, the graphics controller 37 prohibits the state of the buttons from being changed, and even if an operation is received for moving focus or for confirming selection of a button, the graphics controller 37 does not execute the processing corresponding to the operation. This avoids peculiar changes in animation presentation.

Fourth Embodiment

Figure 46:
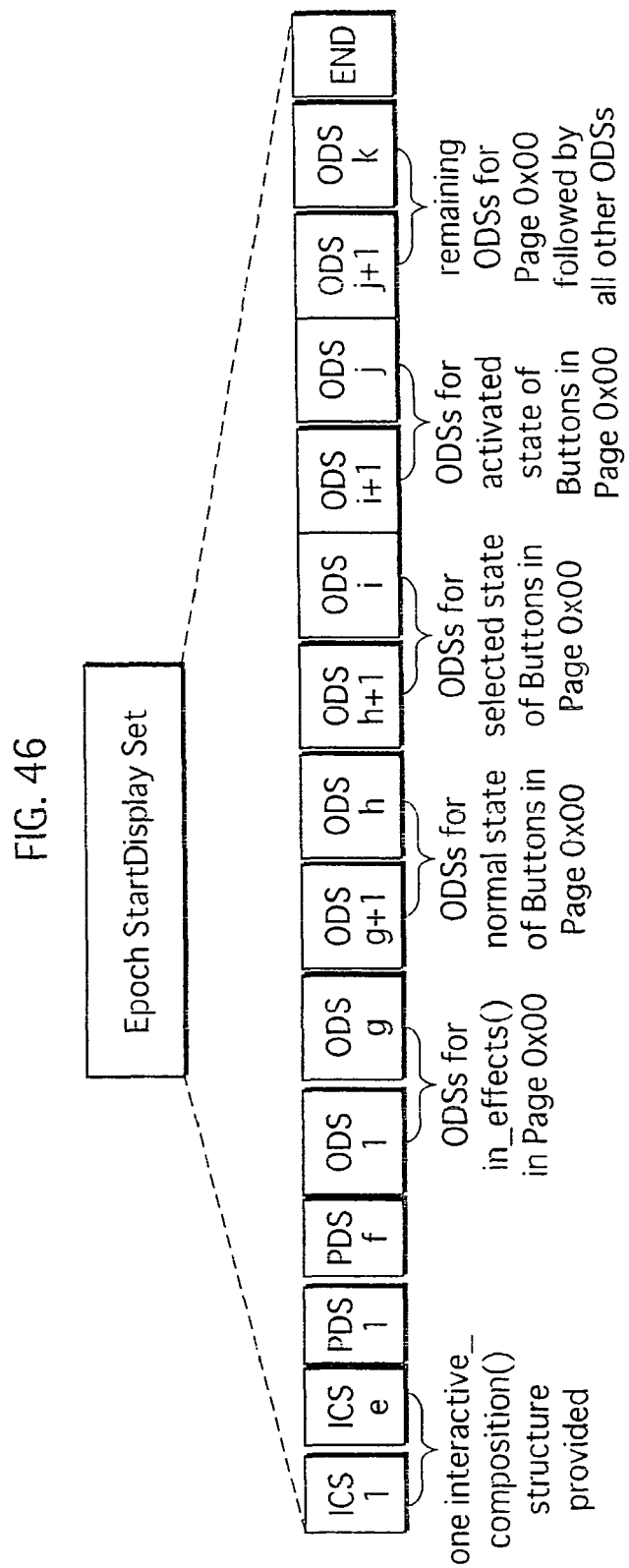
FIG. 46 shows the internal structure of an Epoch Start Display Set.
Figure 47A:
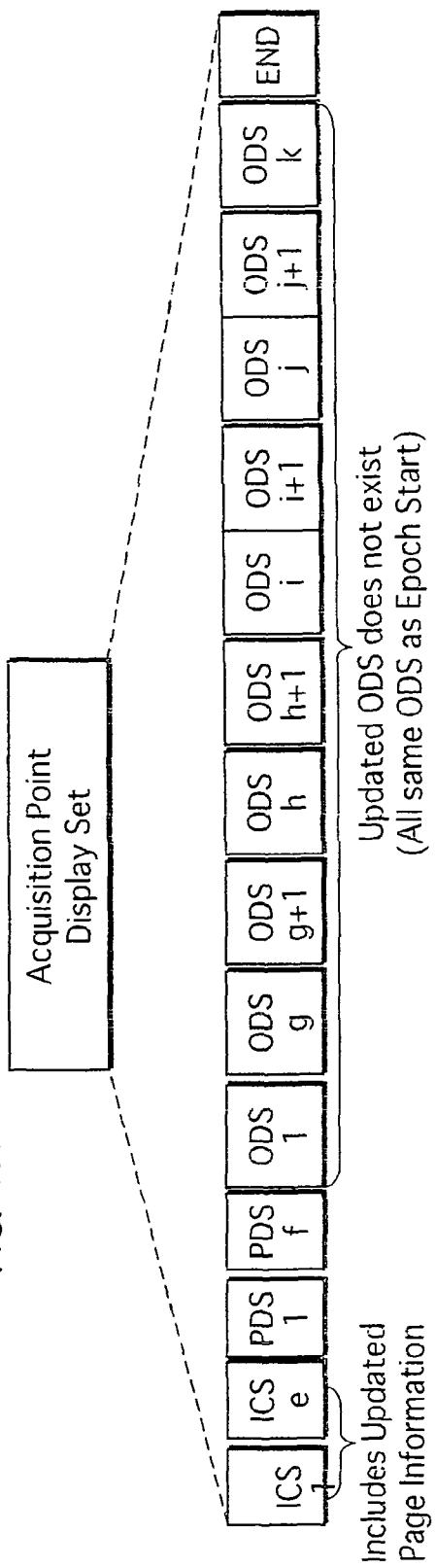
FIG. 47A shows the internal structure of an Acquisition Point Display Set.
Figure 47B:
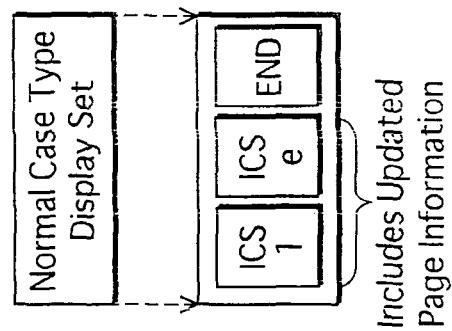
FIG. 47B shows the internal structure of a Normal Case Display Set.

The fourth embodiment relates to an improvement in arrangement of ODS of Display Sets in an Epoch. FIG. 46 and FIGS. 47A and 47B show the internal structure of displays sets of the present embodiment. FIG. 46 shows the internal structure of an Epoch Start DS, and FIG. 47A shows the internal structure of an Acquisition Point DS. FIG. 47B shows the internal structure of a Normal Case DS.

The following describes how ODS are arranged in the DSn.

ODSs 1 to g in FIG. 46 are a group of ODSs that compose the in_effect of Page[0] (in-effect group).

ODSs g+1 to h is a group of ODSs for rendering buttons in the normal state (ODSs for Normal state).

ODSs h+1 to i is a group of ODSs for rendering buttons in the selected state (ODSs for selected state).

ODSs i+1 to j is a group of ODSs for rendering buttons in the actioned state (ODSs for actioned state).

ODSs j+1 to k are a group of ODSs for expressing the out_effect field of page[0] and the in_effect fields and the out_effect fields of pages subsequent to page[1].

These groups are arranged in the following order: in_effect, normal state, selected state, actioned state, other. This order is set in this way so that ODSs that compose the first interactive display presentation are read first, and ODSs that compose an updated screen presentation are read subsequently. This is the structure of an ODS in an Epoch.

ODS groups exist only in an Epoch Start, and do not exist at all in normal case DSs (FIG. 47A). Even if ODSs existed in Acquisition Point DS, they would simple be duplicates of ODSs in Epoch Start DSs (FIG. 47B).

As can be seen from FIG. 46 and FIGS. 47A and 47B, the only ODSs that can cause a new display in an Epoch are those in the Epoch Start DS. None of the ODSs in subsequent DSs are related to updating of graphics objects. This means that updating of graphics objects in an Epoch of an ICS is prohibited.

This prohibition is, of course, only valid within each single Epoch. An ODS the completely changes the graphics object in the object buffer 35 may be provided in the DS.

This completes the description of an improvement relating to a recording medium of the present embodiment. The following describes an improvement relating to a playback apparatus of the present embodiment.

Given that the ODS groups are arranged as shown in FIG. 46, when the playback apparatus performs normal playback of an AVClip, the graphics decoder has the stream graphics processor decode the ODSs in the Epoch Start DS when the Epoch Start DS is read, and then has the resulting uncompressed graphics data stored in the object buffer 35.

Next, when subsequent DSs are read, updating of the graphics object data stored in the object buffer 35 is prohibited. In other words, since there are no ODSs in a Normal Case DS, the stream graphics processor 14 does not perform decoding when a Normal Case DS is read. Although the stream graphics processor 14 reads ODS to the coded data buffer 33 when an Acquisition Point DS is read, these ODSs are destroyed in the coded data buffer 33 without being decoded because they are duplicates of the ODSs in the Epoch Start DS.

Next, a description is given of when a skip is performed. When a skip is performed, the first DS that is read is an Acquisition Point DS. The graphics controller 37 has the stream graphics decoder 14 decode ODSs when the Acquisition Point DS is being read. Then, when subsequent DSs are read, the graphics object data is the object buffer 35 is not overwritten. This is the same as in normal playback.

Processing in this way means that animated buttons can be presented without peculiarities, regardless of when a focus move operation or a selection confirmation operation is received from the user.

With the present embodiment, decoding of ODSs and writing to the BD-ROM are performed when the first read is executed, and when subsequent ODSs are read, the graphics object data in the object buffer 35 is not overwritten. This means that the state of animated buttons can be changed without peculiarities in the buttons.

Fifth Embodiment

Figure 48:
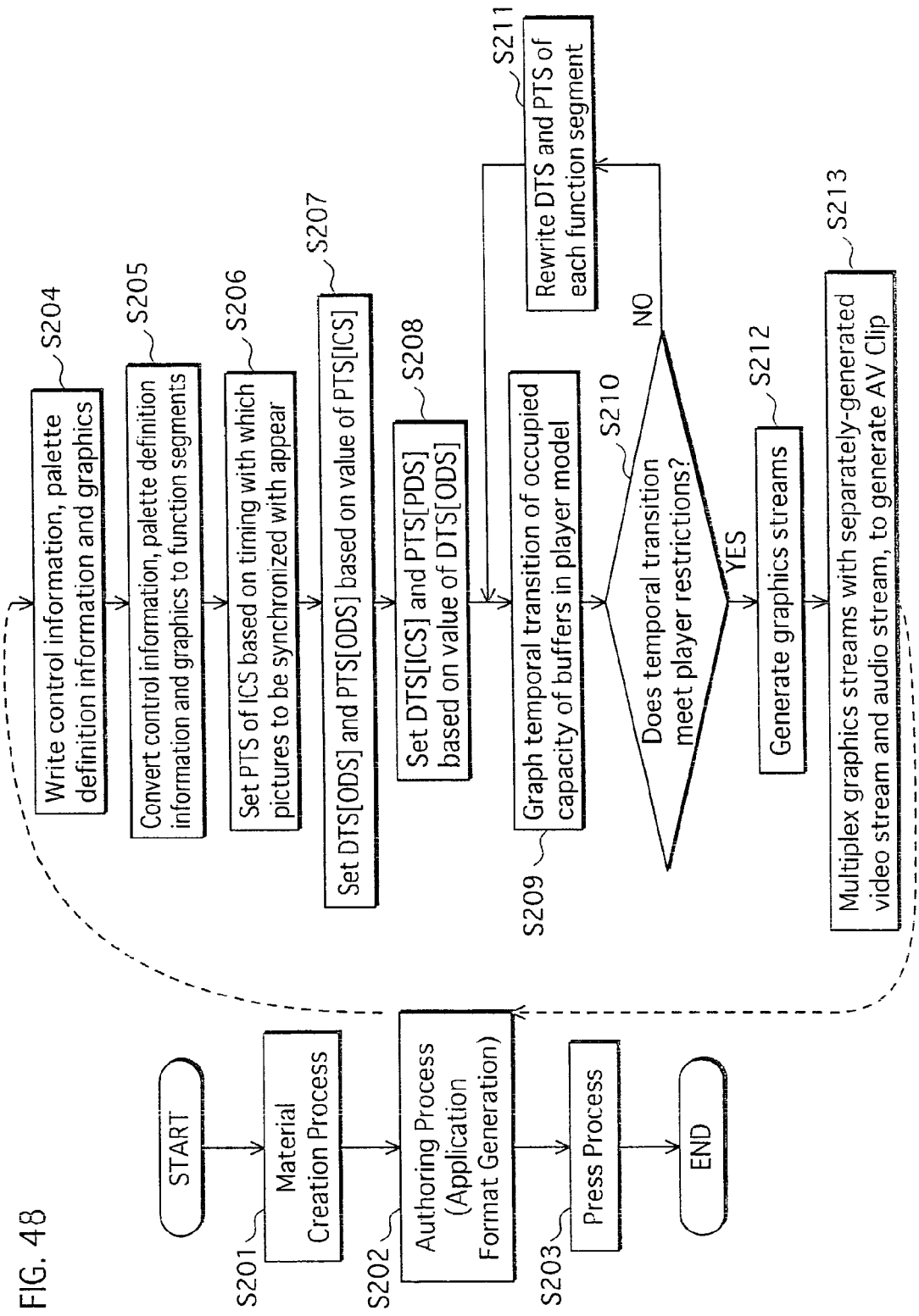
FIG. 48 is a flowchart of the manufacturing process of the BD-ROMs according to the first to fourth embodiments.

The present embodiment of the present invention relates to a manufacturing process of the BD-ROM. FIG. 48 is a flowchart of the manufacturing process of the BD-ROMs according to the first to fourth embodiments.

The manufacturing process includes a material production step of recording video, audio, and the like (step S201), an authoring step of creating an application format using an authoring device (step S202), and a pressing step of creating an original master of the BD-ROM and performing stamping and bonding to complete the BD-ROM (step S203).

The BD-ROM authoring step includes the following steps S204-S213.

Now, a description is given of the steps S204-S213. In the step S204, control information, palette definition information, and graphics are generated. In the step S205, the control information, the palette definition information, and the graphics are converted to functional segments. In the step S206, a PTS of each ICS is set based on the display timing of a picture to be synchronized with. In the step S207, a DTS[ODS] and a PTS[ODS] are set based on the PTS[ICS]. In the step S208, a DTS[ICS] and a PTS[PDS] are set based on the DTS[ODS].

In the step S209, changes in occupancy of each buffer in the player model are graphed. In the step S210, a judgment is made as to whether the graphed changes satisfy the constraints of the player model. If the judgment results in the negative, the DTS and PTS of each functional segment are rewritten in the step S211. If the judgment results in the affirmative, a graphics stream is generated in the step S212, and the graphics stream is multiplexed with a video stream and an audio stream, which are separately generated, to form an AV Clip in the step S213. After this, the AV Clip is adapted to the Blue-ray Disc Read-Only Format, to complete the application format.

Other Remarks

Though the present invention has been described by way of the above embodiments, the present invention is not limited to those specific embodiments. The present invention may be embodied with any of the modifications (A) to (M) below. The invention recited in each of the claims of this application includes extension and generalization of the above embodiments and their modifications below. The degree of extension and generalization depends upon the state of the art in the technical field of the present invention at the time when the present invention was made.

(A) The above embodiments describe the case where the BD-ROM is used as the recording medium. Main features of the present invention, however, lie in a graphics stream recorded on the recording medium, which does not rely on physical characteristics of BD-ROMs. Therefore, the present invention is applicable to any recording medium that is capable of recording a graphics stream. Examples of such a recording medium include: an optical disc such as a DVD-ROM, a DVD-RAM, a DVD-RW, a DVD-R, a DVD+RW, a DVD+R, a CD-R, or a CD-RW; a magneto-optical disk such as a PD or an MO; a semiconductor memory card such as a CompactFlash card, a SmartMedia card, a Memory Stick card, a MultiMediaCard, or a PCMCIA card; a magnetic disk such as a flexible disk, SuperDisk, Zip, or Clik!; a removable hard disk drive such as ORB, Jaz, SparQ, SyJet, EZFley, or Microdrive, and a nonremovable hard disk drive.

(B) The above embodiments describe the case where the playback apparatus decodes an AV Clip on the BD-ROM and outputs the decoded AV Clip to the television. As an alternative, the playback apparatus may be equipped with only a BD drive, with the remaining construction elements being provided in the television. In this case, the playback apparatus and the television can be incorporated in a home network connected with an IEEE 1394 connector. The above embodiments describe the case where the playback apparatus is connected to the television, but the playback apparatus may instead be integrated with a display device. Also, the playback apparatus may include only the system LSI (integrated circuit) which carries out an essential part of the processing. The playback apparatus and the integrated circuit are both an invention described in this specification. Accordingly, regardless of whether the playback apparatus or the integrated circuit is concerned, an act of manufacturing a playback apparatus based on the internal structure of the playback apparatus described in the sixth embodiment is an act of practicing the present invention. Also, any act of assigning with charge (i.e. for sale) or without charge (i.e. as a gift), leasing, and importing the playback apparatus is an act of practicing the present invention. Likewise, an act of offering for assignment or lease of the reproduction apparatus using storefront displays, catalogs, or brochures is an act of practicing the present invention.

(C) Information processing using the programs shown in the flowcharts is actually realized using hardware resources. Accordingly, the programs which describe the procedure steps shown in the flowcharts are themselves an invention. The above embodiments all relate to the case where the programs are incorporated in the playback apparatus, but the programs can be used independently of the playback apparatus. Acts of practicing the programs include (1) an act of manufacturing, (2) an act of assigning with or without charge, (3) an act of leasing, (4) an act of importing, (5) an act of providing to the public via a bi-directional electronic communications network, and (6) an act of offering for assignment or lease using storefront displays, catalogs, or brochures.

(D) The time elements of the steps which are executed in a time series in each of the flowcharts can be regarded as the necessary elements of the present invention. This being so, a playback method shown by these flowcharts is an invention. If the processing shown in each flowchart is carried out by performing the steps in a time series so as to achieve the intended aim and the intended effect, it is considered as an act of practicing the playback method of the present invention.

(E) When recording an AV Clip on the BD-ROM, an extension header may be added to each TS packet in the AV Clip. The extension header is called a TP_extra_header, includes an arrival_time_stamp and a copy_permission_indicator, and has a data length of 4 bytes. TS packets with TP_extra_headers (hereafter "EX TS packets") are grouped in units of 32 packets, and each group is written to three sectors. One group made up of 32 EX TS packets has 6,144 bytes (=32×192), which is equivalent to a size of three sectors that is 6144 bytes (=2048×3). The 32 EX TS packets contained in the three sectors are called an "Aligned Unit".

In a home network connected with an IEEE 1394 connector, the playback apparatus transmits an Aligned Unit in the following manner. The reproduction apparatus removes a TP_extra_header from each of the 32 EX TS packets in the Aligned Unit, encrypts the body of each TS packet according to the DTCP Specification, and outputs the encrypted TS packets. When outputting the TS packets, the playback apparatus inserts an isochronous packet between adjacent TS packets. A position where the isochronous packet is inserted is based on a time shown by an arrival_time_stamp of the TP_extra_header. The playback apparatus outputs a DTCP_descriptor, as well as the TS packets. The DTCP_descriptor corresponds to a copy_permission_indicator in the TP_extra_header. With the provision of the DTCP_descriptor indicating "copy prohibited", it is possible to prevent, when using the TS packets in the home network connected via the IEEE 1394 connector, the TS packets from being recorded to other devices.

(F) The above embodiments relate to the case where an AV Clip of the Blu-ray Disc Read-Only Format is used as a digital stream, but the present invention may also be embodied with a VOB (Video Object) of the DVD-Video Format or the DVD-Video Recording Format. The VOB is a program stream that complies with the ISO/IEC 13818-1 Standard and is obtained by multiplexing a video stream and an audio stream. Also, the video stream in the AV Clip may be an MPEG4 video stream or a WMV video stream. Further, the audio stream in the AV Clip may be a Linear PCM audio stream, a Dolby AC-3 audio stream, an MP3 audio stream, an MPEG-AAC audio stream, or a dts audio stream.

(G) The movie described in the above embodiments may be one obtained by encoding an analog image signal broadcast by analog broadcasting. Also, the movie may be stream data made up of a transport stream broadcast by digital broadcasting.

Alternatively, an analog/digital image signal recorded on a videotape may be encoded to obtain content. Also, an analog/ digital image signal directly captured by a video camera may be encoded to obtain a content. A digital work distributed by a distribution server is applicable too.

(H) Graphics objects described in the above embodiments is run-length encoded raster data. Run-length encoding is used for compression/encoding of graphics objects, because the run-length encoding is suitable for compression and decompression of subtitles. Subtitles have the property that a continuous length of the same pixel value in a horizontal direction is relatively long. Therefore, by performing compression using run-length encoding, a high compression rate can be attained. In addition, run-length encoding reduces a load for decompression, and is therefore suitable for realizing decoding by software. Nevertheless, the use of run-length encoding for graphics objects is not essential to the present invention. For example, graphics objects may be PNG data. Also, graphics objects may be vector data instead of raster data. Further, graphics objects may be transparent patterns.

(I) The transfer rate Rc may be determined so that clearing and rendering of the graphics plane complete within a vertical blanking time. Suppose the vertical blanking time is 25% of 1/29.93 seconds. Then Rc is determined to be 1 Gbps. By determining Rc in this way, graphics can be displayed smoothly, which achieves a significant effect on the practical use.

Also, writing in sync with line scan can be used together with writing within a vertical blanking time. This ensures smooth presentation if the transfer rate Rc is 256 Mbps.

(J) The above embodiments relate to the case where the playback apparatus is provided with the graphics plane. Alternatively, the playback apparatus may include a line buffer for storing uncompressed pixels of one line. Since conversion to an image signal is performed for each horizontal row (line), conversion to an image signal can equally be performed with the line buffer.

(K) In the case of a merge point of multiple playback paths, a different button needs to be selected as default depending on a playback path having been taken. Thus, it is desirable to define such playback control in the static scenario that a value unique to each playback path is stored to a register of the playback apparatus at the time when the playback path is actually taken. The playback procedure may be set to put the button specified by the register value to the selected state. In this way, a different button is put to the selected state depending on a playback path having been taken.

(L) The graphics plane described in the above embodiments preferably has a double buffer structure. If the graphics plane has a double buffer structure, even when large-sized graphics data needs to be rendered, which requires a time corresponding to several frames, each display composition may be instantaneously presented by switching between two buffers. Thus, a double buffer structure is effective when the menu of a full-screen size needs to be presented.

(M) The first embodiment describes an example of updating page information in an interactive_composition structure. However, a page_version_number may exist in each piece of page information in a Normal Case DS in an interactive_composition structure also. This page_version_number can be used to indicate changes in content of each piece of page information.

INDUSTRIAL APPLICABILITY

The playback apparatus according to the present invention is suitable for a personal use, for example in a home theater system. Since the above embodiments of the present invention disclose the internal structure, playback apparatuses having the internal structure can be produced on a large scale. Thus, the playback apparatus according to the present invention is industrially usable in its quality and has industrial applicability.

What is claimed is:

1. A playback apparatus comprising:
a video decoder operable decode a video stream, to obtain a moving picture; and
a graphics decoder operable to decode a graphics stream, to obtain a menu presentation that is to be composited with the moving picture,
wherein the graphics stream includes a plurality of Display Sets that constitute the menu presentation, and
the graphics decoder includes:
a composition buffer operable to store a composition segment, the composition segment including page information that corresponds to pages in the menu presentation; and
a write control unit operable to
when a new Display Set is read in accordance with progression of playback of the video stream, compare a page version number in each piece of page information in the read Display Set with a page version number in a corresponding piece of page information stored in the composition buffer, to detect whether contents of the piece of page information have been updated, and
when contents of a piece of page information have been updated, use the updated piece of page information to overwrite the corresponding piece of page information in the composition buffer.

2. The playback apparatus of claim 1, further comprising:
a display control unit,
wherein, if a piece of page information is overwritten, a page, among the plurality of pages in the menu display, corresponding to the rewritten piece of page information is represented.

3. The playback apparatus of claim 2, further comprising:
a graphics plane operable to store uncompressed graphics that compose the menu presentation,
wherein the graphics decoder further includes:
a processor operable to decode graphics included in any one of the Display Sets; and
an object buffer operable to store uncompressed graphics obtained by the processor, and
re-presenting of a page is performed by reading, from among the uncompressed graphics in the object buffer, uncompressed graphics referred to by the piece of page information stored as a result of the overwriting, and writing the read uncompressed graphics to the graphics plane.

4. The playback apparatus of claim 3, wherein
the graphics stream is recorded on the recording medium multiplexed with a video stream,
the page information is stored in a packet, the packet including a presentation time stamp that shows an arbitrary point in time on a playback time axis of the video stream, and
the writing to the graphics plane by the display control unit is complete before a current playback position with respect to the video stream reaches the point in time shown by the presentation time stamp.

5. The playback apparatus of claim 4, wherein
the display control unit has the re-presented menu composited with the moving picture at a point at which (i) the current playback position reaches the point in time and (ii) an operation to call a popup menu is has been performed by a user.

6. The playback apparatus of claim 4, wherein the display control unit has the re-presented menu composited with the moving picture at a point at which the current playback position reaches the point in time.

7. The playback apparatus of claim 4, wherein the packet that stores the page information includes a decode time stamp in addition to the presentation time stamp, the writing from the object buffer to the graphics plane is performed in a duration starting at a point in time shown by the decode time stamp and ending at the point in time shown by the presentation time stamp, the uncompressed graphics written to the graphics plane constitute graphical button materials on a page, and the display control unit prohibits any change in a state of the button materials for the duration.

8. The playback apparatus of claim 1, wherein the graphics decoder includes a processor operable to decode graphics data included in the Display Set, and have stored, in the object buffer, uncompressed graphics data obtained as a result of the decoding, and the processor writes uncompressed graphics to the object buffer when a first Display Set is read, and when each successive Display Set is read, suppresses overwriting of the uncompressed graphics in the object buffer.

9. A method of recording to a recording medium, comprising:

a step of generating application data; and a step of recording the generated application data to the recording medium, wherein the application data includes a video stream and a graphics stream, the video stream constitutes a moving picture, and the graphics stream constitutes a plurality of menu presentations to be composited with the moving picture, and includes a plurality of Display Sets that constitute respective menu presentations, each menu presentation being composed of one or more pages, and each Display Set including version information that shows whether or not content of each of the pages in the Display Set has changed with respect to a previous Display Set.

10. A non-transitory computer-readable recording medium storing a program for causing a computer to execute playback processing, the program comprising:

program code operable to cause the computer to perform processing to decode a video stream to obtain a moving picture; and program code operable to cause the computer to perform processing to decode the graphics stream to obtain menu presentations to be composited with the moving picture, wherein graphics stream includes a plurality of Display Sets that constitute the menu presentations, and in the decoding of the graphics stream, the computer is caused to perform processing to, when a new Display Set is read in accordance with progression of playback of the moving picture, compare a page version number in each piece of page information in the read Display Set with a page version number in a corresponding piece of page information stored in a buffer in the computer, to detect whether contents of the piece of page information have been updated, and when contents of a piece of page information have been updated, use the updated piece of page information to overwrite the corresponding piece of page information in the composition buffer.

11. A playback method comprising the steps of:

decoding a video stream to obtain a moving picture; and decoding a graphics stream to obtain a menu presentation, and compositing the menu presentation with the moving picture, wherein the decoding of the graphics stream includes a procedure to cause a computer to perform processing to, when a new Display Set is read in accordance with progression of playback of the moving picture, compare a page version number in each piece of page information in the read Display Set with a page version number in a corresponding piece of page information stored in a buffer in the computer, to detect whether contents of the piece of page information have been updated, and when contents of a piece of page information have been updated, use the updated piece of page information to overwrite the corresponding piece of page information in the composition buffer.

* * * * *